US012699500B2

(12) United States Patent (10) Patent No.: US 12,699,500 B2
Rahman et al. (45) Date of Patent: Aug. 4, 2026

(54) USER INTERFACES FOR COLLECTIONS OF CONTENT SERVICES AND/OR APPLICATIONS

(71) Applicant: Apple Inc., Cupertino, CA (US)

(72) Inventors: Nabila Rahman, Corona Del Mar, CA (US); Josiah Kenneth Slifer, San Jose, CA (US); John Nicholas Vidnovic, San Francisco, CA (US); Bryan James Wegman, Boulder Creek, CA (US); Mona Azarians, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 65 days.

(21) Appl. No.: 18/668,662

(22) Filed: May 20, 2024

(65) Prior Publication Data

US 2024/0310976 A1 Sep. 19, 2024

Related U.S. Application Data

(63) Continuation of application No. 17/352,802, filed on Jun. 21, 2021, now Pat. No. 11,995,289.

(60) Provisional application No. 63/078,226, filed on Sep. 14, 2020, provisional application No. 63/041,987, filed on Jun. 21, 2020.

(51) Int. Cl.
*G06F 3/048* (2013.01)
*G06F 3/0482* (2013.01)
*G06F 3/0484* (2022.01)
*G06Q 20/12* (2012.01)

(52) U.S. Cl.
CPC .......... *G06F 3/0482* (2013.01); *G06F 3/0484* (2013.01); *G06Q 20/127* (2013.01)

(58) Field of Classification Search
CPC ... G06F 3/0482; G06F 3/0484; G06Q 20/127; G06Q 20/102; G06Q 20/123; H04N 21/42224; H04N 21/2543; H04N 21/41265; H04N 21/47211
See application file for complete search history.

(56) References Cited

U.S. PATENT DOCUMENTS

| | | | |
|---|---|---|---|
| 6,323,846 B1 | 11/2001 | Westerman et al. | |
| 6,570,557 B1 | 5/2003 | Westerman et al. | |
| 6,677,932 B1 | 1/2004 | Westerman | |
| 7,614,008 B2 | 11/2009 | Ording | |
| 7,633,076 B2 | 12/2009 | Huppi et al. | |

(Continued)

FOREIGN PATENT DOCUMENTS

| | | |
|---|---|---|
| WO | 2013/169849 A2 | 11/2013 |
| WO | 2014/105276 A1 | 7/2014 |

OTHER PUBLICATIONS

Final Office Action received for U.S. Appl. No. 17/352,802, mailed on Mar. 23, 2023, 16 pages.

(Continued)

*Primary Examiner* — Aleksey Olshannikov
(74) *Attorney, Agent, or Firm* — Kubota & Basol LLP

(57) ABSTRACT

In some embodiments, a subscription to a collection of content services and/or applications enables a user to access content through a plurality of content services. In some embodiments, an electronic device facilitates a process to subscribe to a collection of content services and/or applications. In some embodiments, an electronic device facilitates a process to unsubscribe from a collection of content services and/or applications.

30 Claims, 36 Drawing Sheets

(56)  References Cited

U.S. PATENT DOCUMENTS

| | | | |
|---|---|---|---|
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |
| 8,479,122 | B2 | 7/2013 | Hotelling et al. |
| 9,348,458 | B2 | 5/2016 | Hotelling et al. |
| 9,933,937 | B2 | 4/2018 | Lemay et al. |
| 2002/0015024 | A1 | 2/2002 | Westerman et al. |
| 2005/0190059 | A1 | 9/2005 | Wehrenberg |
| 2006/0017692 | A1 | 1/2006 | Wehrenberg et al. |
| 2006/0033724 | A1 | 2/2006 | Chaudhri et al. |
| 2006/0197753 | A1 | 9/2006 | Hotelling |
| 2014/0337139 | A1* | 11/2014 | Thomas ............. G06Q 30/0269 |
| | | | 705/14.66 |
| 2017/0094360 | A1 | 3/2017 | Keighran et al. |
| 2019/0028865 | A1* | 1/2019 | Raleigh ................ G06T 1/0007 |
| 2021/0397308 | A1 | 12/2021 | Rahman et al. |

OTHER PUBLICATIONS

Non-Final Office Action received for U.S. Appl. No. 17/352,802, mailed on Aug. 11, 2022, 15 pages.

Notice of Allowance received for U.S. Appl. No. 17/352,802, mailed on Jan. 31, 2024, 7 pages.

Notice of Allowance received for U.S. Appl. No. 17/352,802, mailed on Oct. 4, 2023, 8 pages.

* cited by examiner

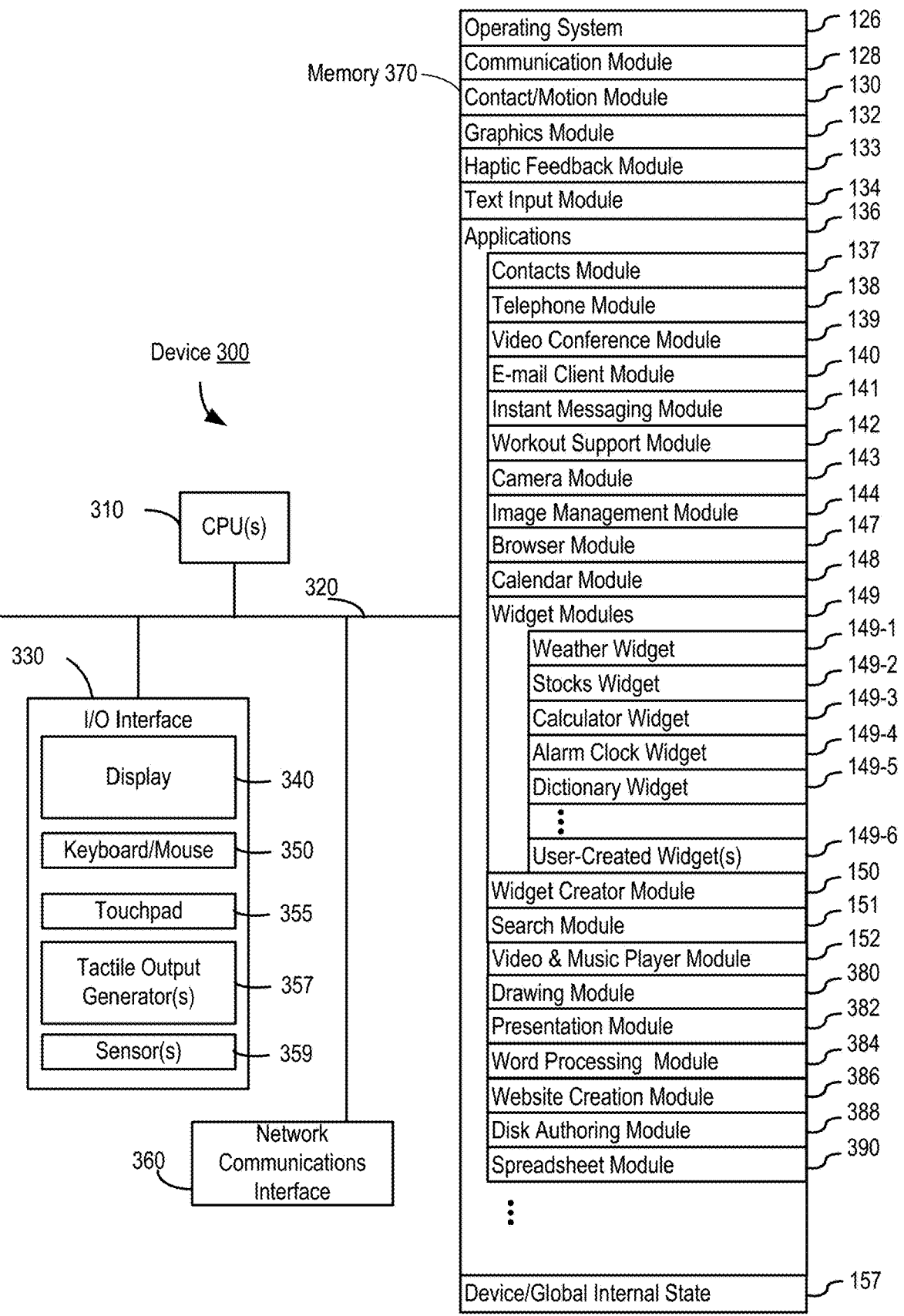

| | |
|---|---|
| Operating System | 126 |
| Communication Module | 128 |
| Contact/Motion Module | 130 |
| Graphics Module | 132 |
| Haptic Feedback Module | 133 |
| Text Input Module | 134 |
| Applications | 136 |
| Contacts Module | 137 |
| Telephone Module | 138 |
| Video Conference Module | 139 |
| E-mail Client Module | 140 |
| Instant Messaging Module | 141 |
| Workout Support Module | 142 |
| Camera Module | 143 |
| Image Management Module | 144 |
| Browser Module | 147 |
| Calendar Module | 148 |
| Widget Modules | 149 |
| Weather Widget | 149-1 |
| Stocks Widget | 149-2 |
| Calculator Widget | 149-3 |
| Alarm Clock Widget | 149-4 |
| Dictionary Widget | 149-5 |
| User-Created Widget(s) | 149-6 |
| Widget Creator Module | 150 |
| Search Module | 151 |
| Video & Music Player Module | 152 |
| Drawing Module | 380 |
| Presentation Module | 382 |
| Word Processing Module | 384 |
| Website Creation Module | 386 |
| Disk Authoring Module | 388 |
| Spreadsheet Module | 390 |
| Device/Global Internal State | 157 |

Memory 370

Device 300

310 — CPU(s)

320

330

I/O Interface

Display — 340

Keyboard/Mouse — 350

Touchpad — 355

Tactile Output Generator(s) — 357

Sensor(s) — 359

360 — Network Communications Interface

*FIG. 3*

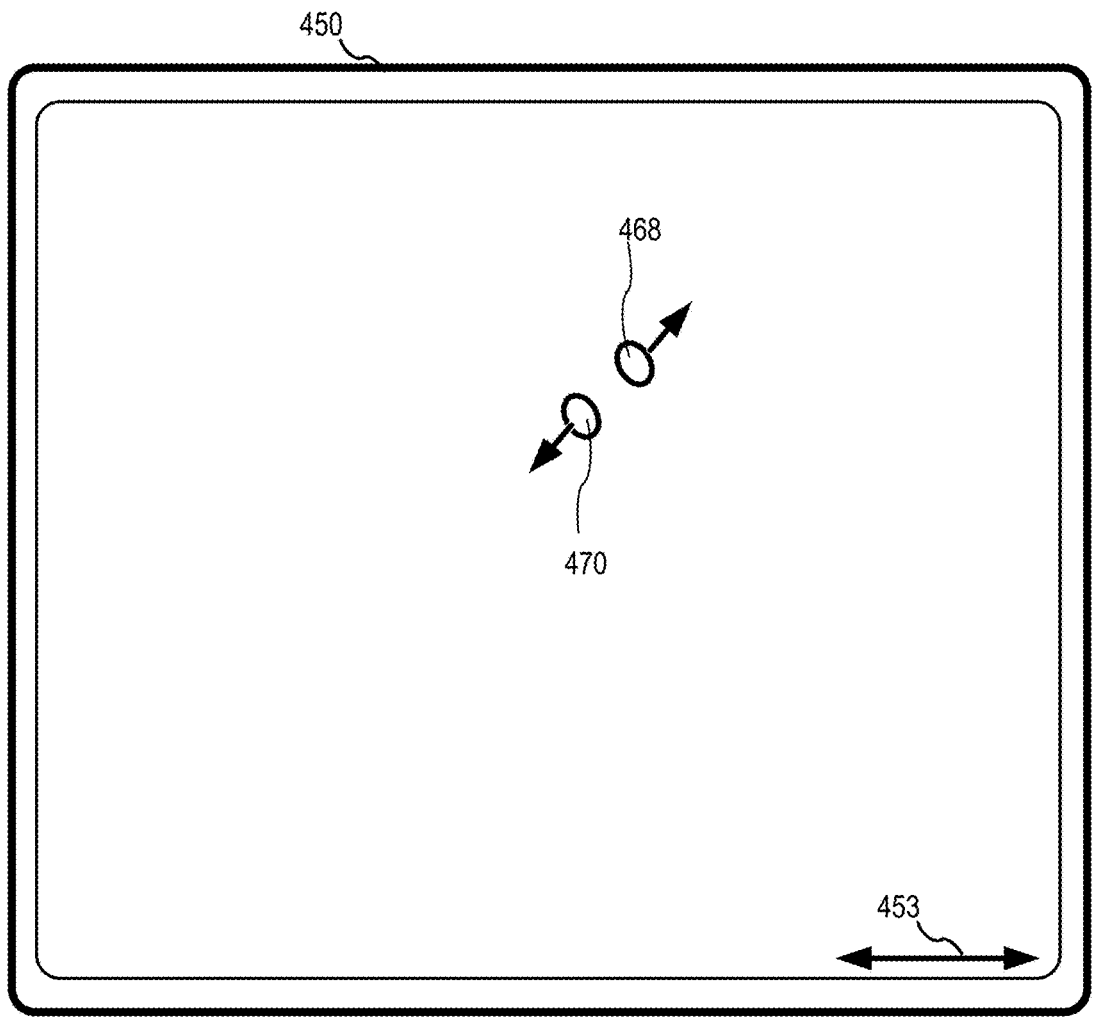
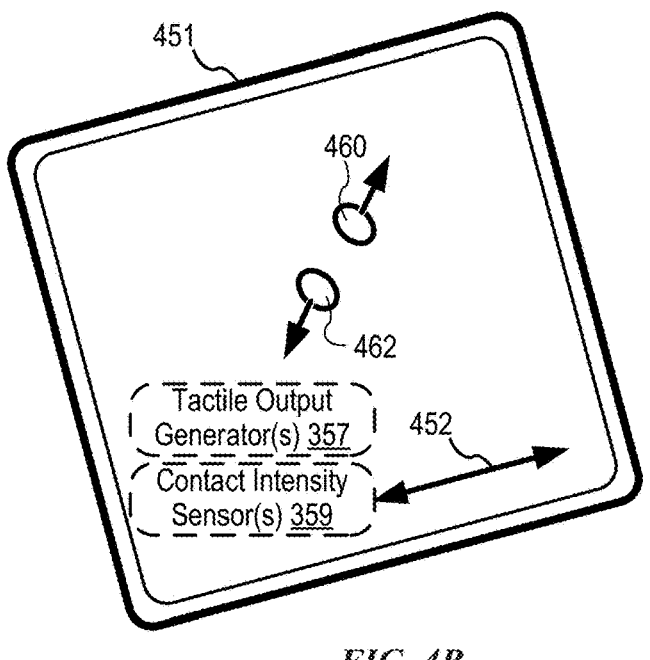
*FIG. 4B*

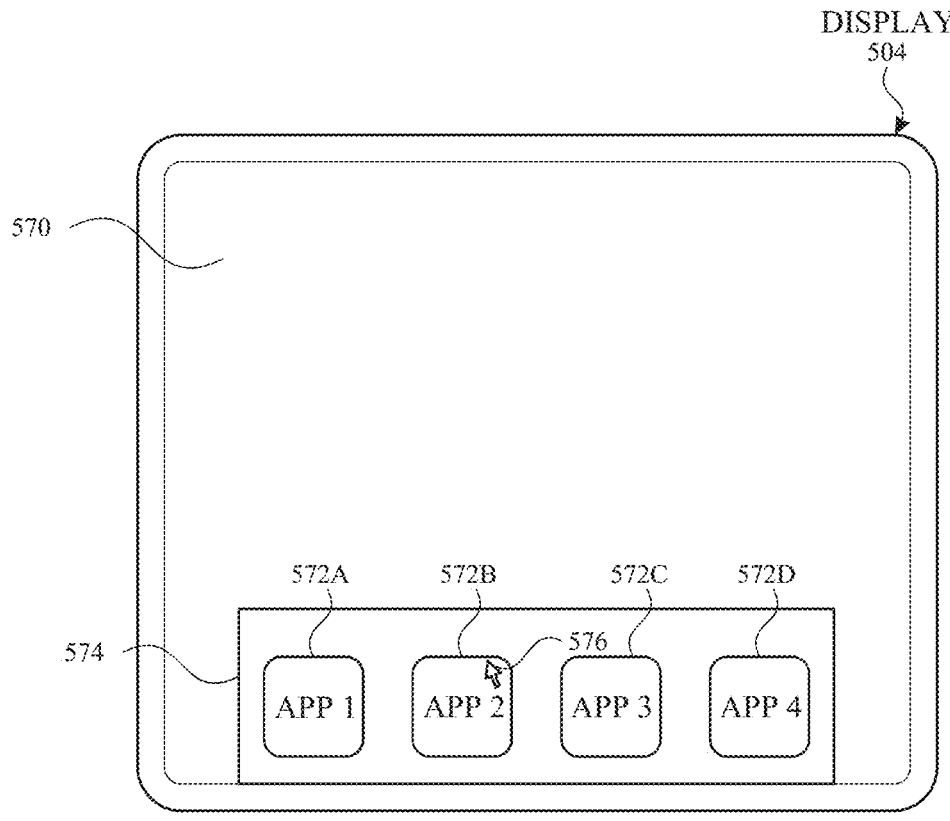
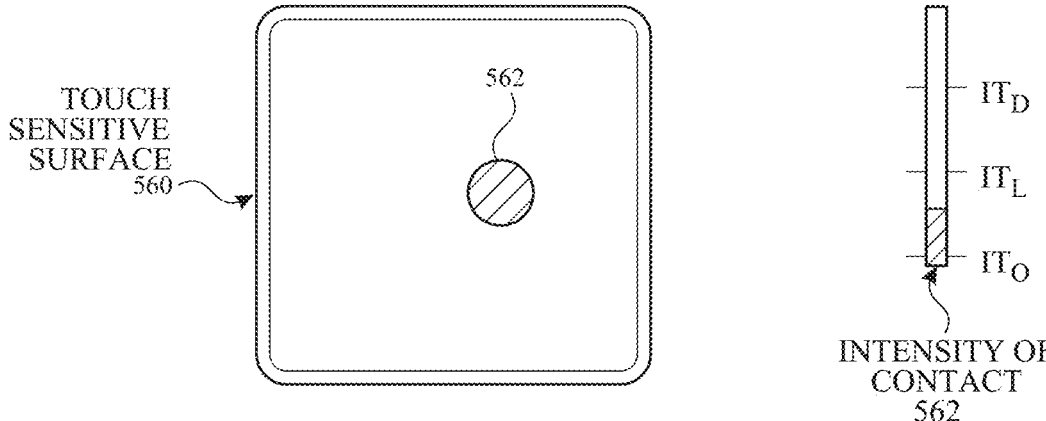
*FIG. 5E*

Subscribed to: A, B, M

Subscribed to: A, B, M

Subscribed to: A, B, M

Subscribed to: A, B, M

Subscribed to: A, B, G

Subscribed to: A, B, G

Subscribed to: A, B, G, N

Subscribed to: A, B, G, N

Subscribed to: A, B, G, T, M

Subscribed to: A, B, G, T

Subscribed to: A, B, Bundle (G, T, M, S)

Subscribed to: A, B, Bundle (G, T, M, S)

Subscribed to: M(P), M(C)

Subscribed to: A, B, S

Subscribed to: M(P), M(C)

Subscribed to: M(P), M(C)

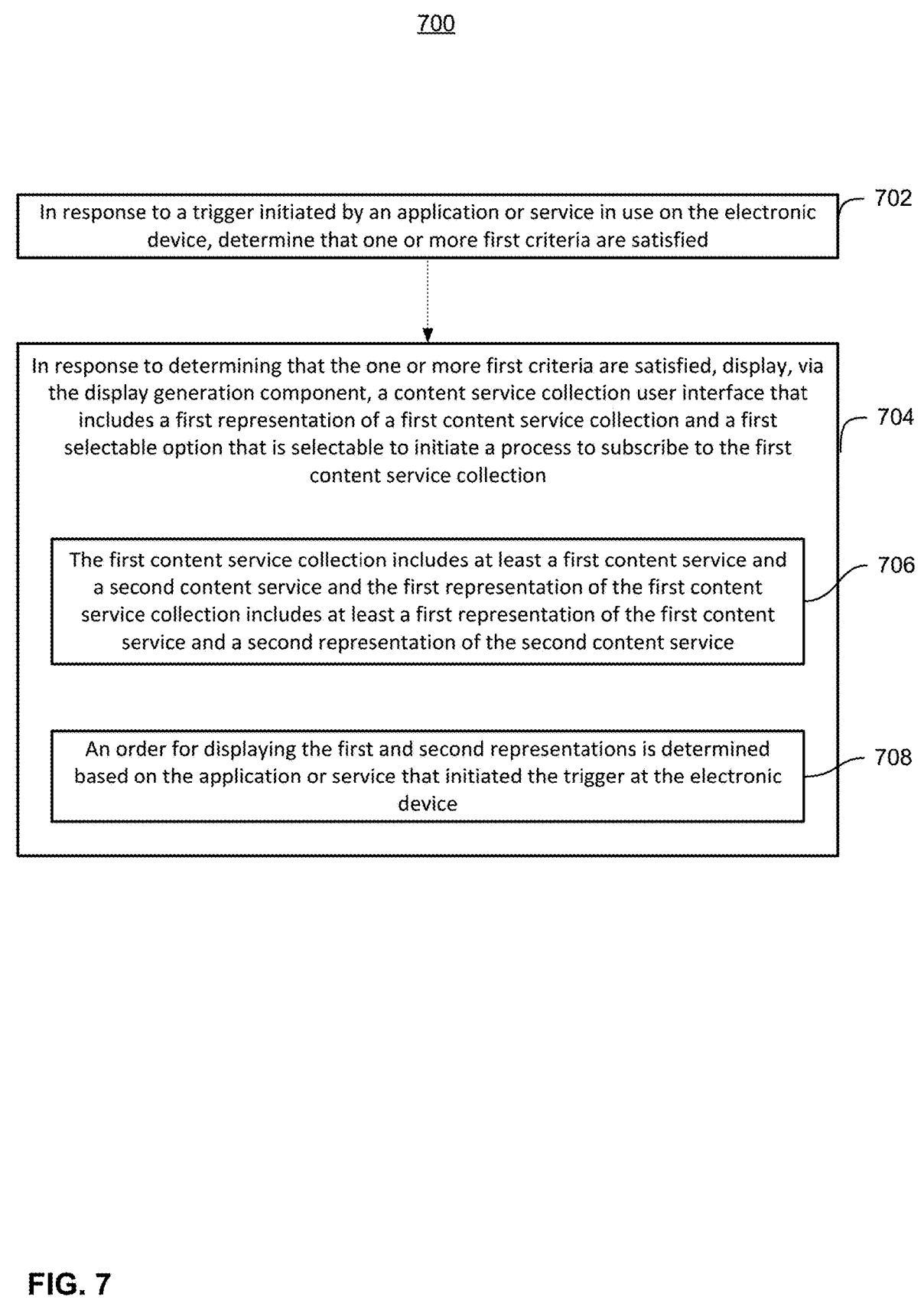

700

In response to a trigger initiated by an application or service in use on the electronic device, determine that one or more first criteria are satisfied — 702

In response to determining that the one or more first criteria are satisfied, display, via the display generation component, a content service collection user interface that includes a first representation of a first content service collection and a first selectable option that is selectable to initiate a process to subscribe to the first content service collection — 704

The first content service collection includes at least a first content service and a second content service and the first representation of the first content service collection includes at least a first representation of the first content service and a second representation of the second content service — 706

An order for displaying the first and second representations is determined based on the application or service that initiated the trigger at the electronic device — 708

FIG. 7

Subscribed to: S, B, Bundle (G, T, M, S)

Subscribed to: S, B, Bundle (G, T, M, S)

Subscribed to: S, Bundle (G, T, M, S)

Subscribed to: S, Bundle (G, T, M, S)

Subscribed to: S, Bundle (G, T, M, S)

Subscribed to: S, Bundle (G, T, M, S)

Subscribed to: G, T, S

Subscribed to: S, Bundle (G, T, M, S)

Subscribed to: Bundle (G, T, M, S), B

Subscribed to: Bundle (G, T, M, S), B

Subscribed to: Bundle (G, T, M, S), B

Subscribed to: Bundle (G, T, M, S), B

900

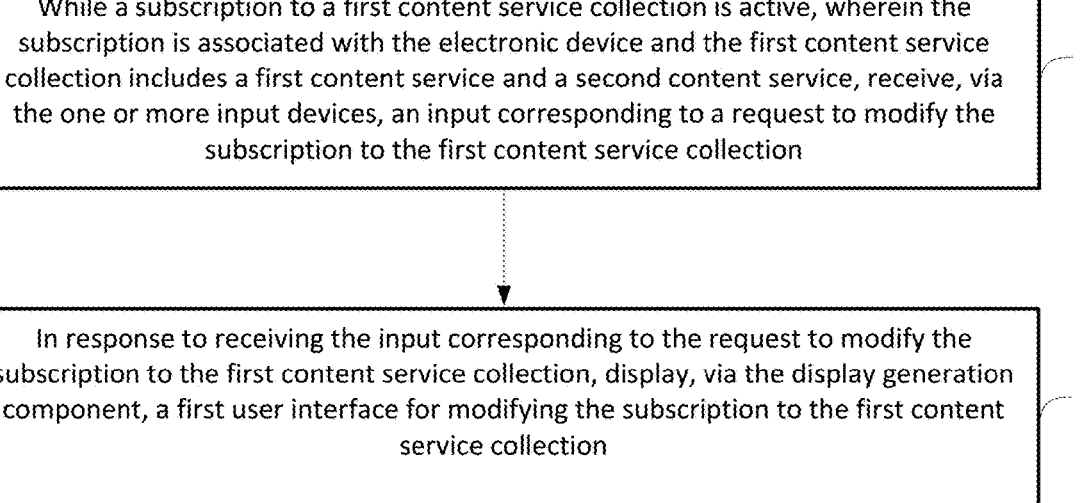

While a subscription to a first content service collection is active, wherein the subscription is associated with the electronic device and the first content service collection includes a first content service and a second content service, receive, via the one or more input devices, an input corresponding to a request to modify the subscription to the first content service collection    ⌐ 902

In response to receiving the input corresponding to the request to modify the subscription to the first content service collection, display, via the display generation component, a first user interface for modifying the subscription to the first content service collection    ⌐ 904

⌐ 906

The first user interface includes:

⌐ 908

A first selectable option that is selectable as part of a process to activate a first respective subscription associated with the electronic device to the first content service independent of the subscription to the first content service collection

⌐ 910

A second selectable option that is selectable as part of a process to activate a second respective subscription associated with the electronic device to the second content service independent of the subscription to the first content service collection

FIG. 9

USER INTERFACES FOR COLLECTIONS OF CONTENT SERVICES AND/OR APPLICATIONS

CROSS-REFERENCE TO RELATED APPLICATIONS

This application is a continuation of U.S. application Ser. No. 17/352,802, filed Jun. 21, 2021, and published on Dec. 23, 2021 as U.S. Publication No. 2021-0397308, which claims the benefit of U.S. Provisional Application No. 63/041,987, filed Jun. 21, 2020, and U.S. Provisional Application No. 63/078,226, filed Sep. 14, 2020, the contents of which are incorporated herein by reference in their entirety for all purposes.

FIELD OF THE DISCLOSURE

This specification relates generally to electronic devices that interact with subscription content services, and user interactions with such devices.

BACKGROUND

User interaction with electronic devices has increased significantly in recent years. These devices can be devices such as computers, tablet computers, televisions, multimedia devices, mobile devices, and the like. In some circumstances, users wish to use electronic devices to access content provided via subscription services.

SUMMARY

Some embodiments described in this disclosure are directed to ways of subscribing to collections of content services and/or applications. Some embodiments described in this disclosure are directed to ways of unsubscribing from collections of content services and/or applications. Enhancing these interactions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 3 is a block diagram of an exemplary multifunction device with a display and a touch-sensitive surface in accordance with some embodiments.

FIG. 4B illustrates an exemplary user interface for a multifunction device with a touch-sensitive surface that is separate from the display in accordance with some embodiments.

FIGS. 5E-5H illustrate exemplary components and user interfaces of a personal electronic device in accordance with some embodiments.

FIG. 7 is a flow diagram illustrating a method of subscribing to a collection of content services and/or applications in accordance with some embodiments of the disclosure.

FIG. 9 is a flow diagram illustrating a method of unsubscribing from a collection of content services and/or applications in accordance with some embodiments of the disclosure.

DETAILED DESCRIPTION

Description of Embodiments

Figure 1A:
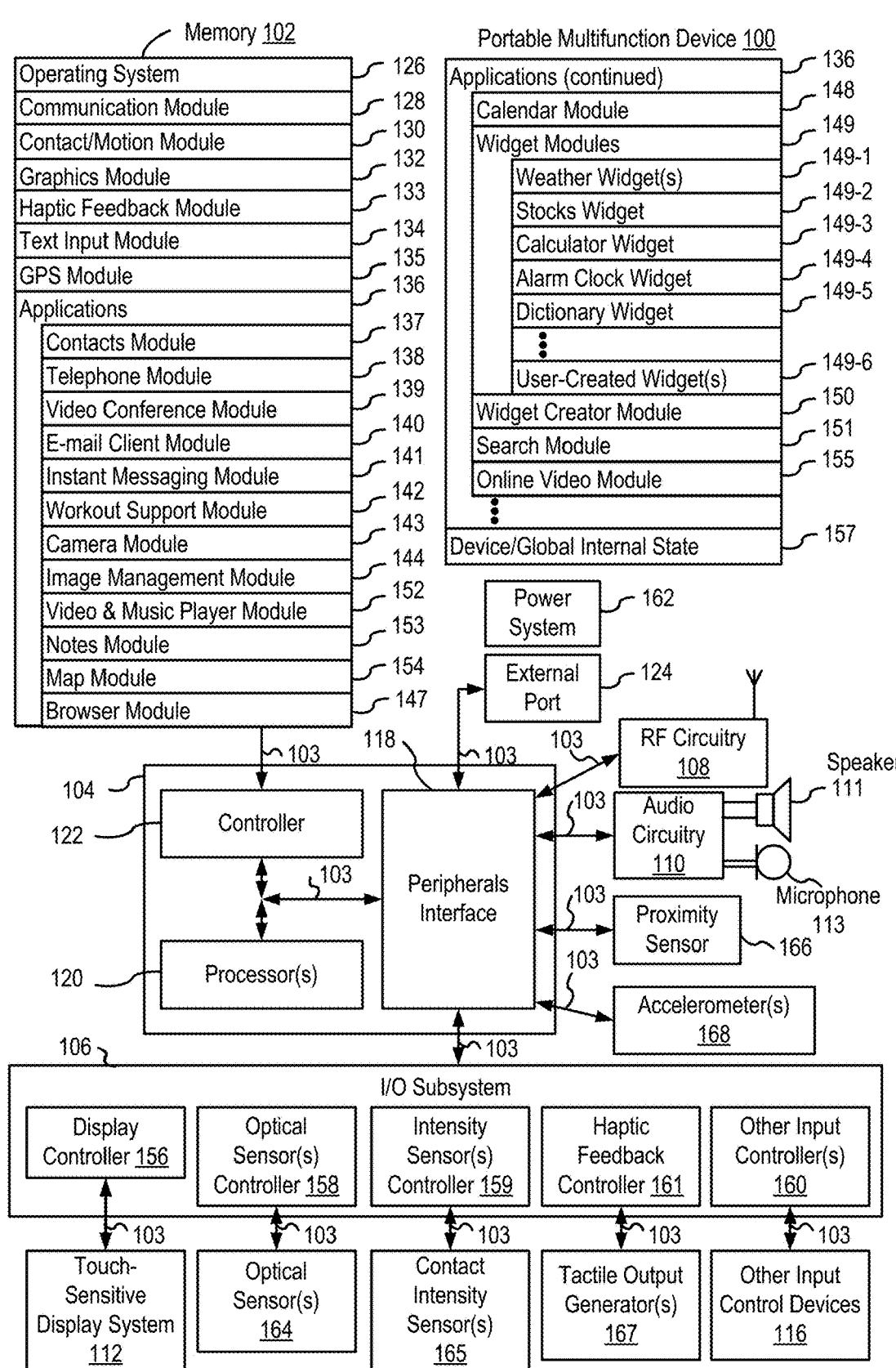
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

In some implementations, an example electronic device initiates and performs one or more processes for subscribing to content service collections. For example, the electronic device optionally automatically presents user interfaces for subscribing to content service collections in response to particular usage of the device and/or in response to a request to subscribe to a single content service. Such techniques can reduce the cognitive burden on a user who uses an example electronic device and streamline a process for subscribing to multiple content services at once. In some implementations, an example electronic device initiates and performs one or more processes for unsubscribing from content service collections. For example, the electronic device optionally allows for quick and efficient manner of indicating a subset of the content services included in the canceled content service collection to persist after the cancellation. Such techniques can reduce the cognitive burden on a user who uses an example electronic device and streamline the process for unsubscribing from multiple content services at once. Further, these techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch-pads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described.

It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller (s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions)

136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;

Calendar module 148;

Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail module 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
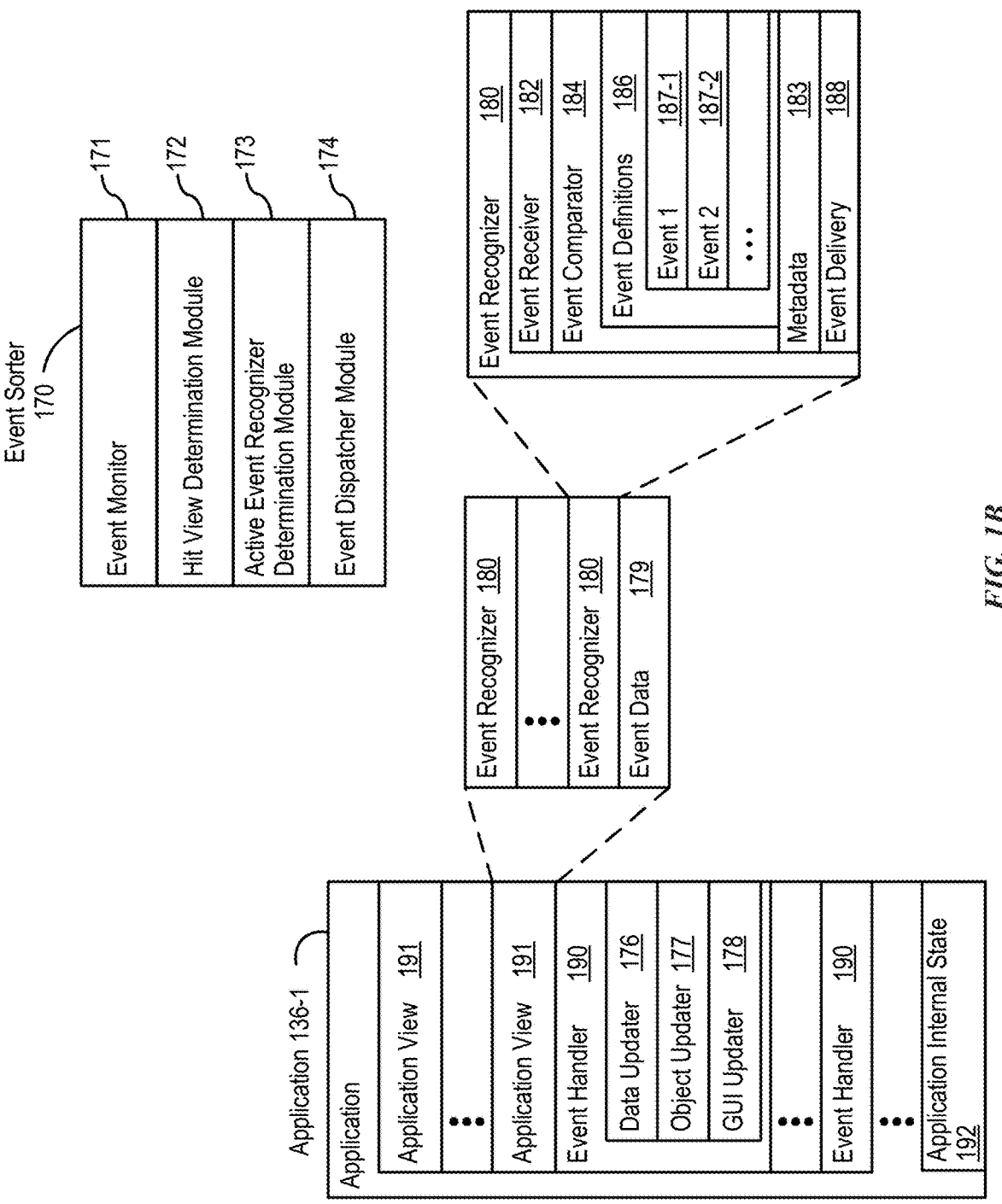
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
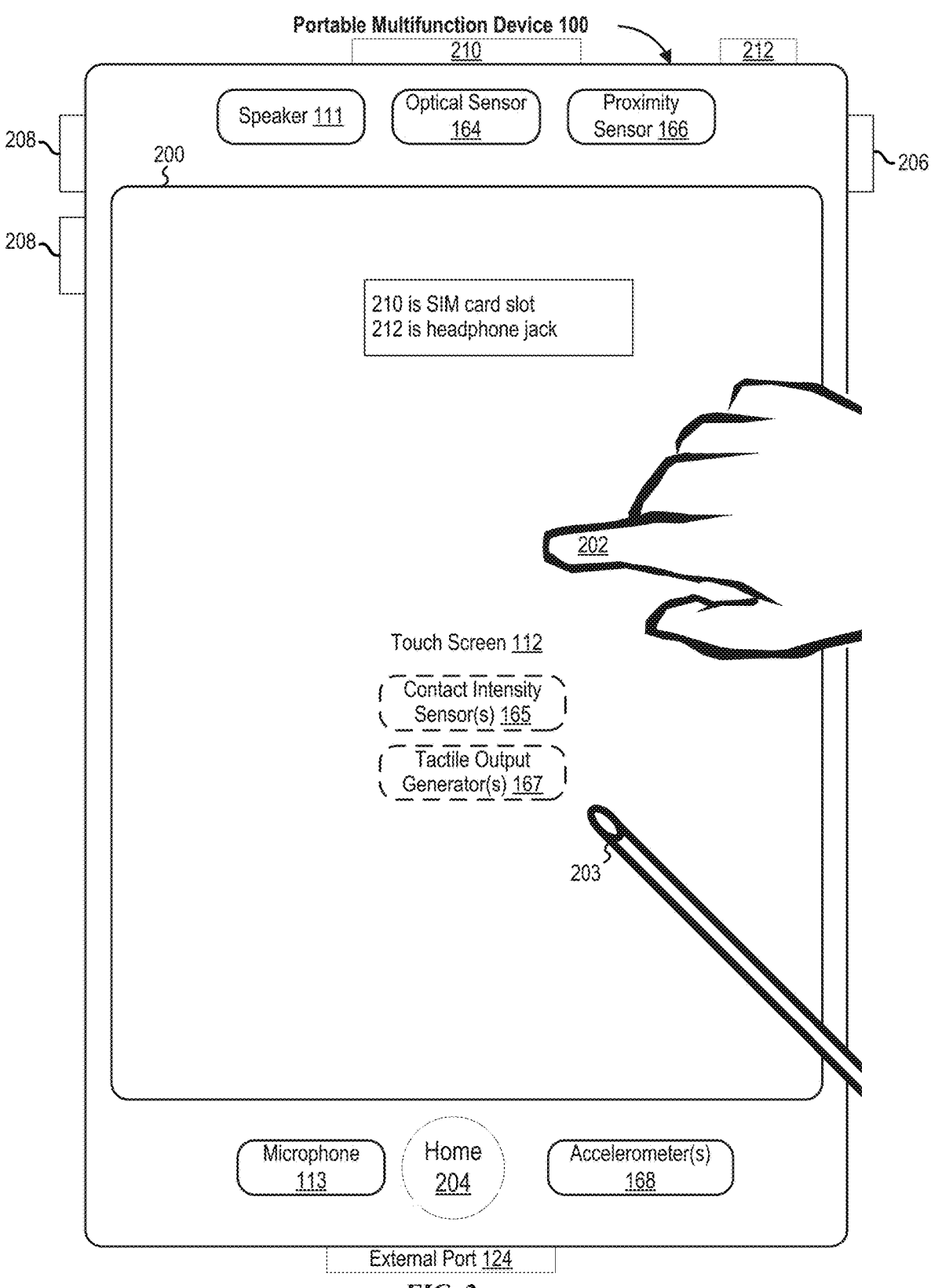
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
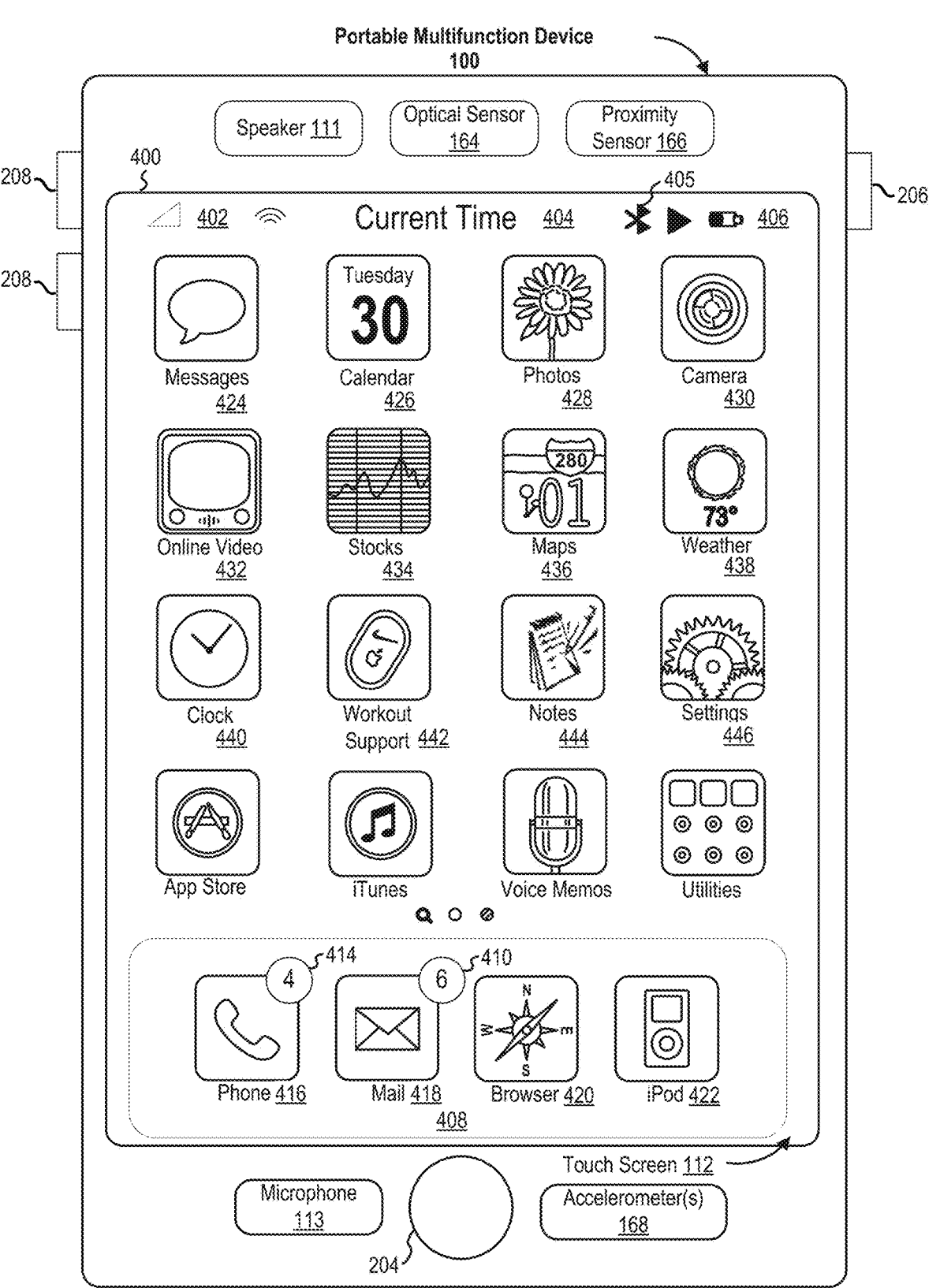
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
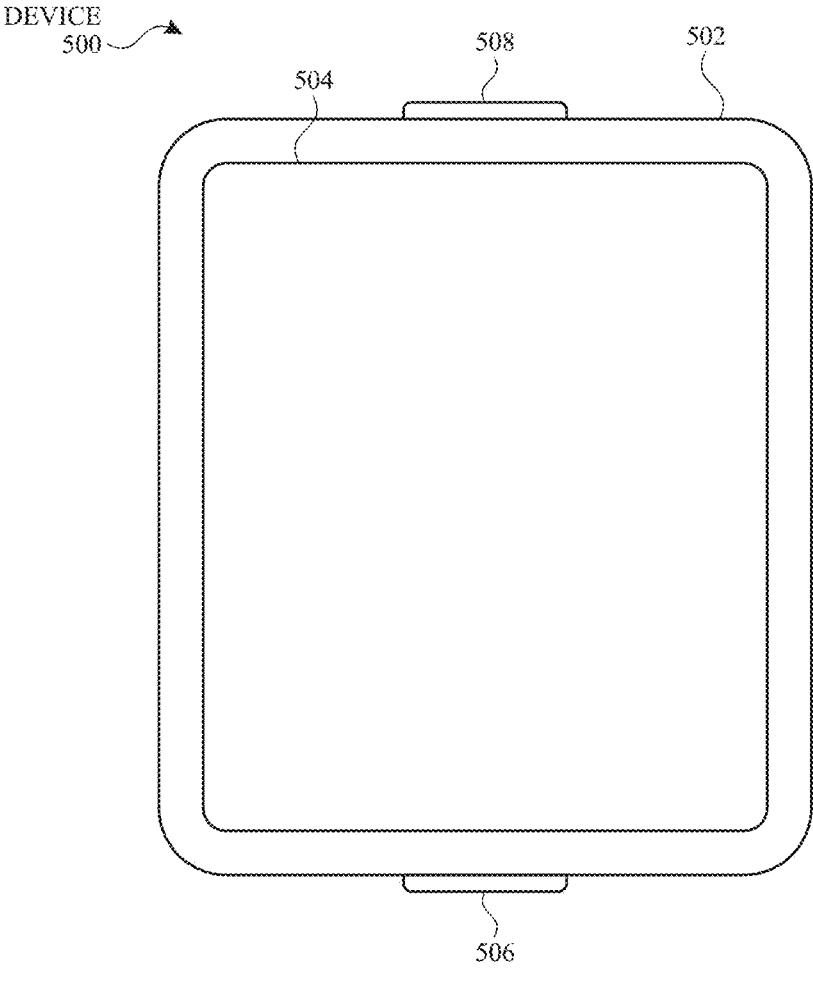
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
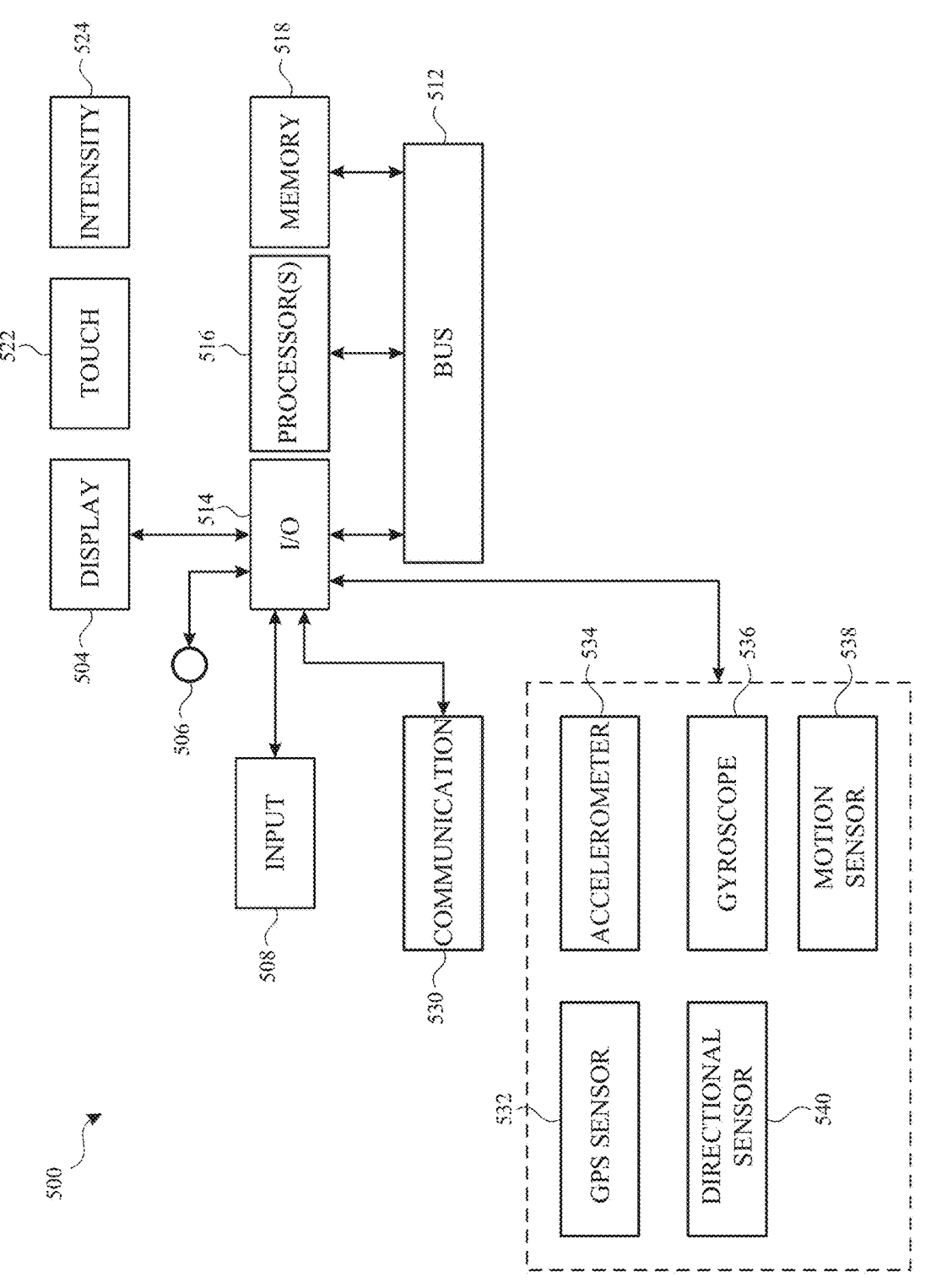
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7 and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
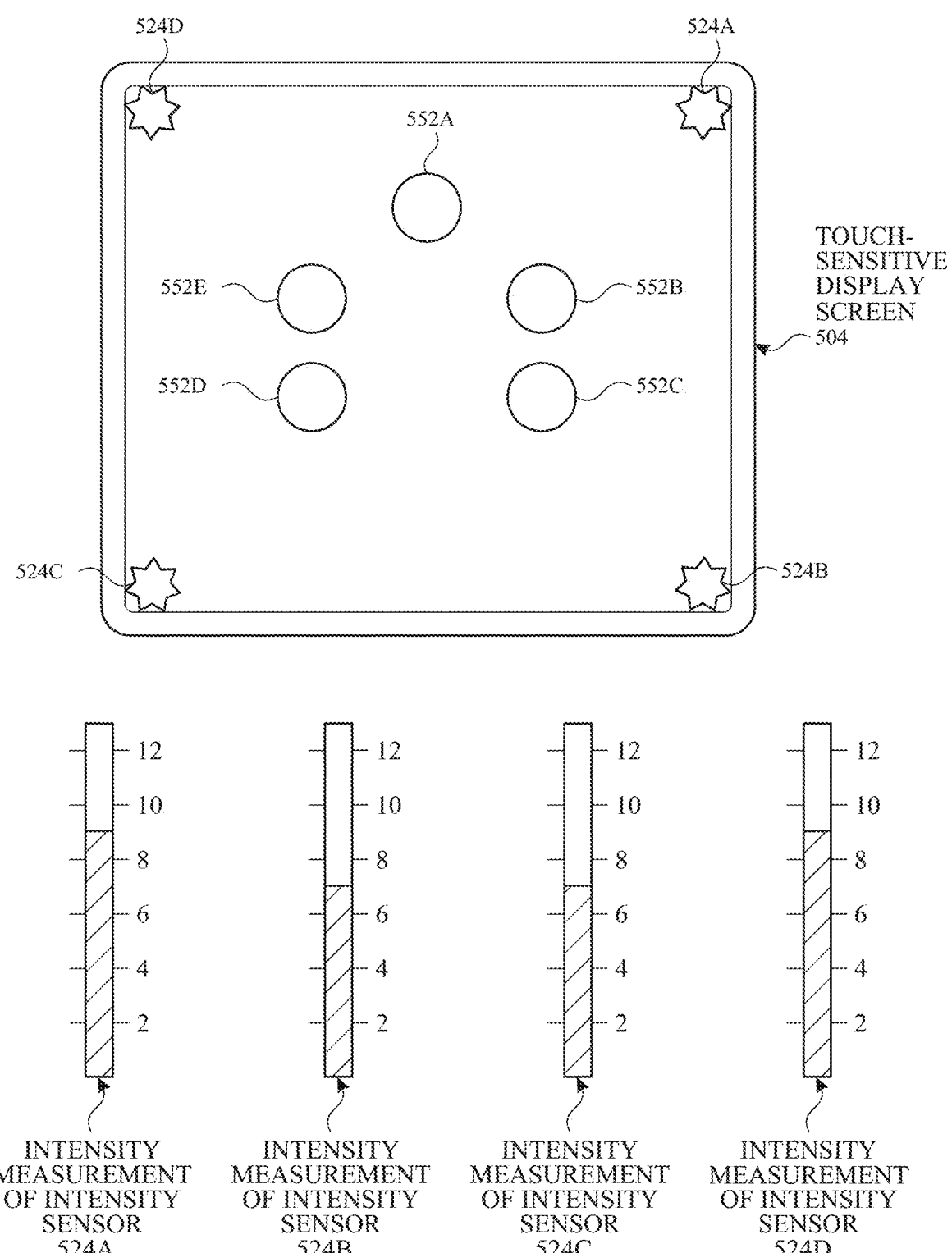
FIGS. 5C-5D illustrate exemplary components of a personal electronic device having a touch-sensitive display and intensity sensors in accordance with some embodiments.
Figure 5D:
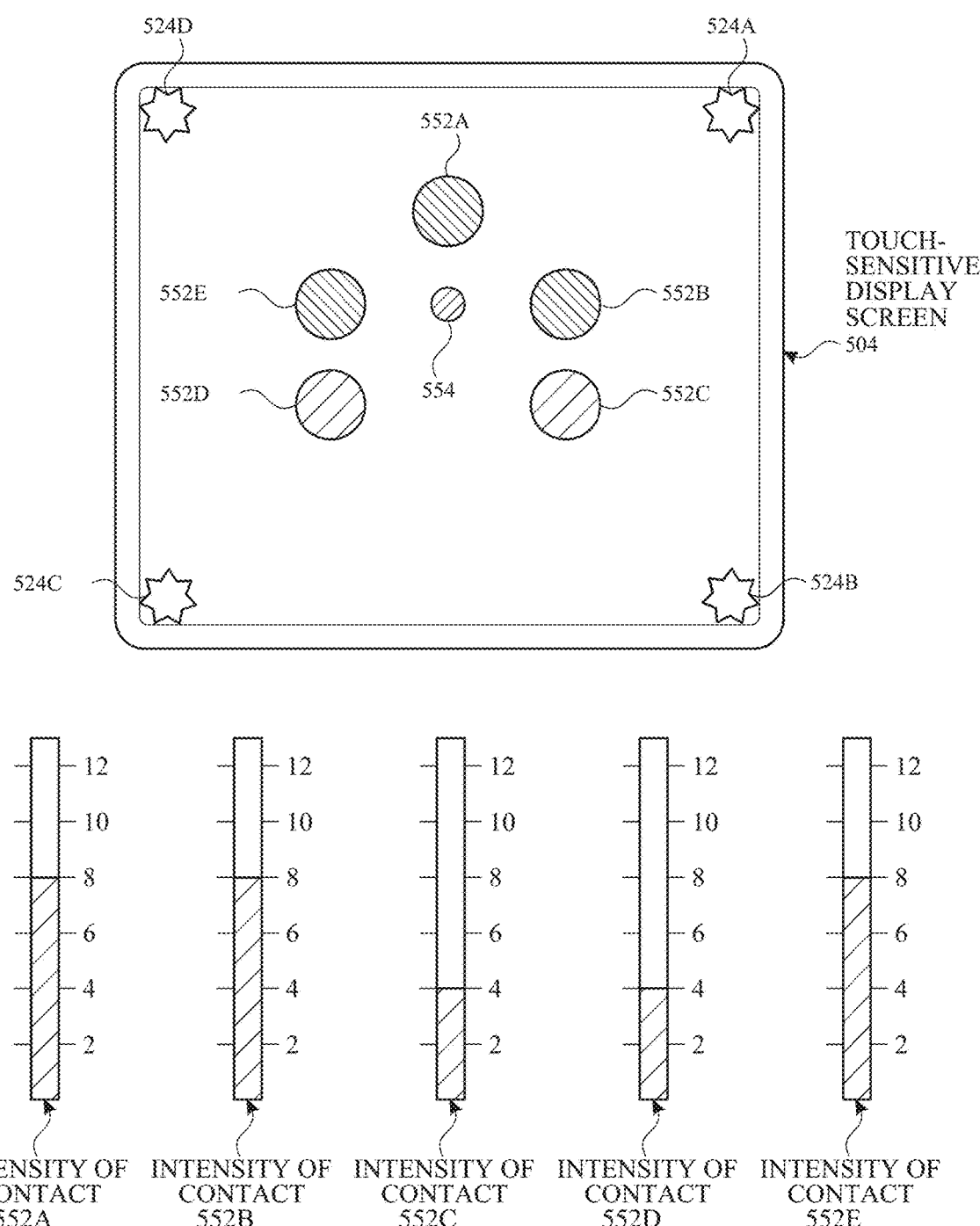

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5F:
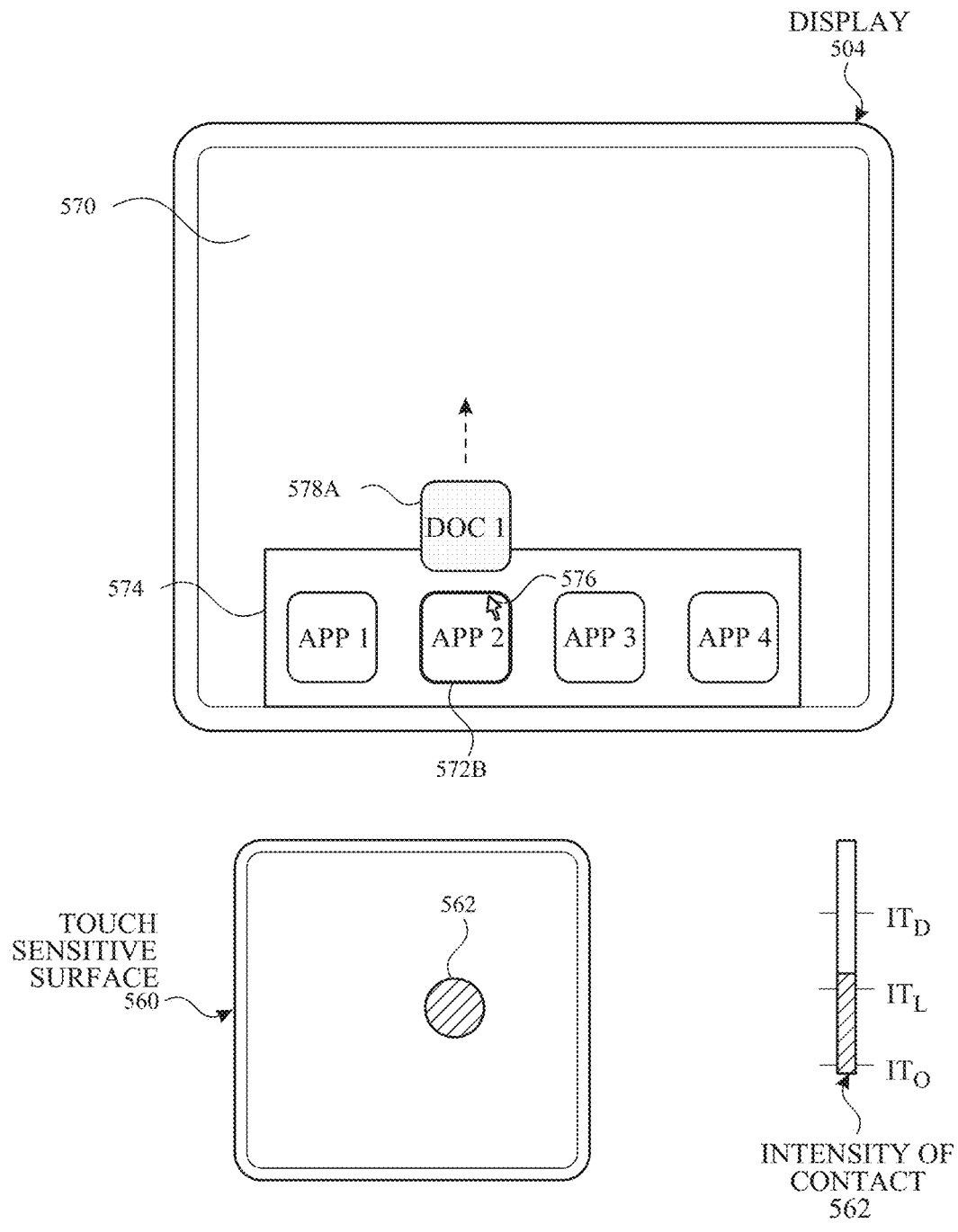
Figure 5G:
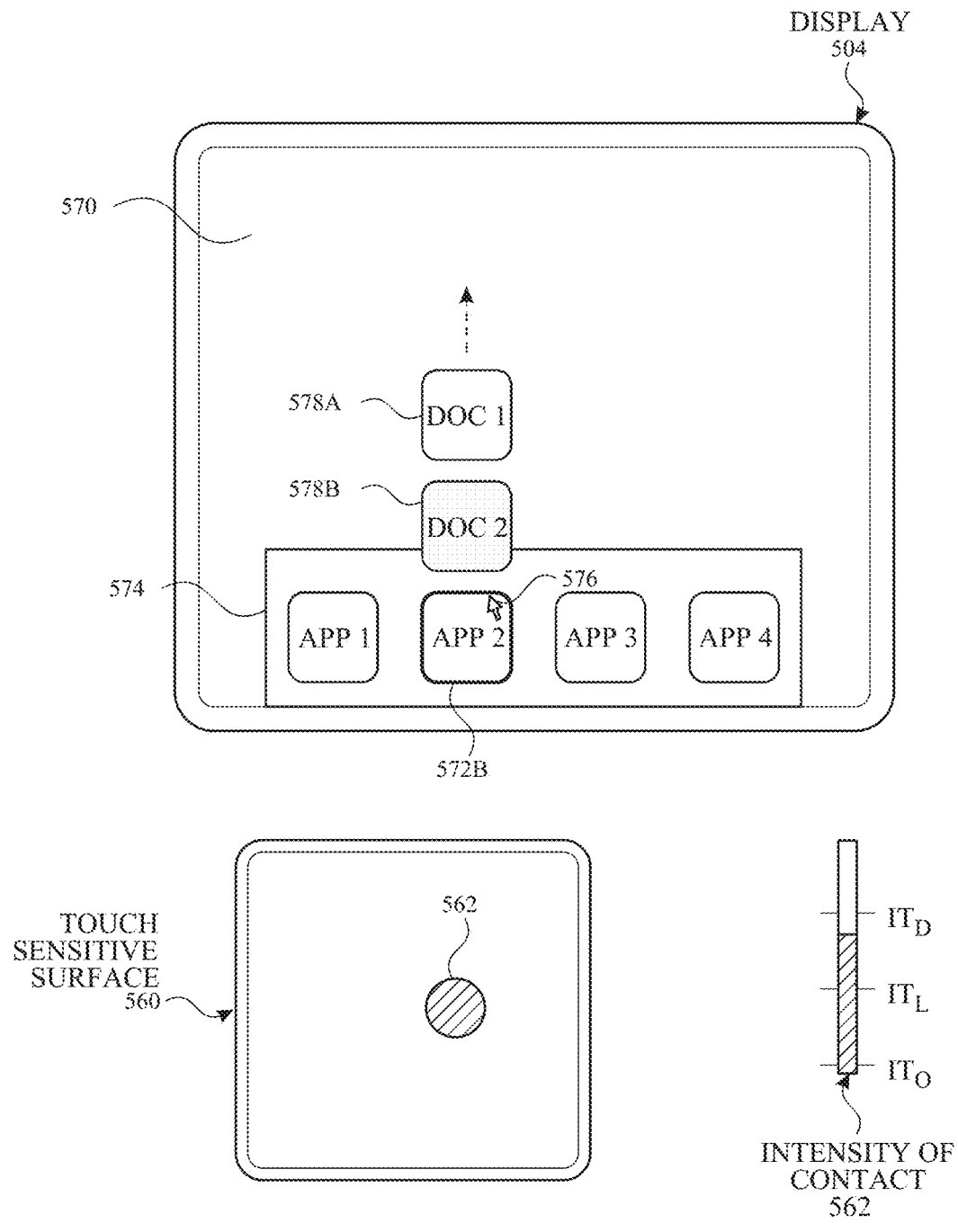
Figure 5H:
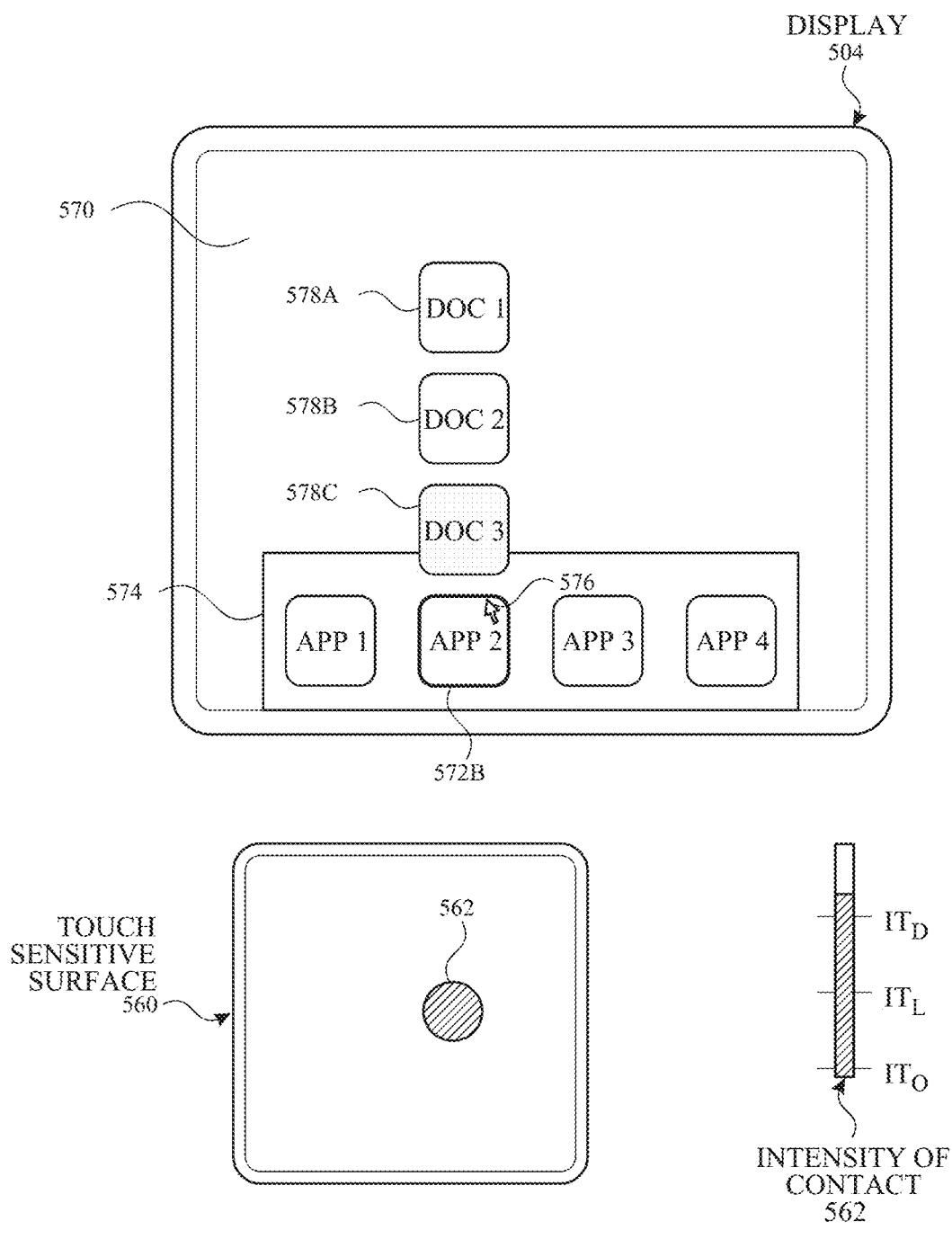

FIGS. 5E-5H illustrate detection of a gesture that includes a press input that corresponds to an increase in intensity of a contact 562 from an intensity below a light press intensity threshold (e.g., "ITL") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A and 578B move upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-

578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state

157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

User Interfaces for Subscribing to Content Service Collections

Users interact with electronic devices in many different manners, including using electronic devices to interact with content provided through one or more content services. The embodiments described below provide ways in which an electronic device performs a process to subscribe to a collection of content services and/or applications including access to a plurality of content services. Providing efficient manners of subscribing to collections of content services and/or applications enhances interactions with a device, thus reducing the amount of time a user needs to subscribe to a plurality of content services and reducing the power usage of the device, which increases battery life for battery-powered devices. It is understood that people use devices. When a person uses a device, that person is optionally referred to as a user of the device.

Figure 6B:
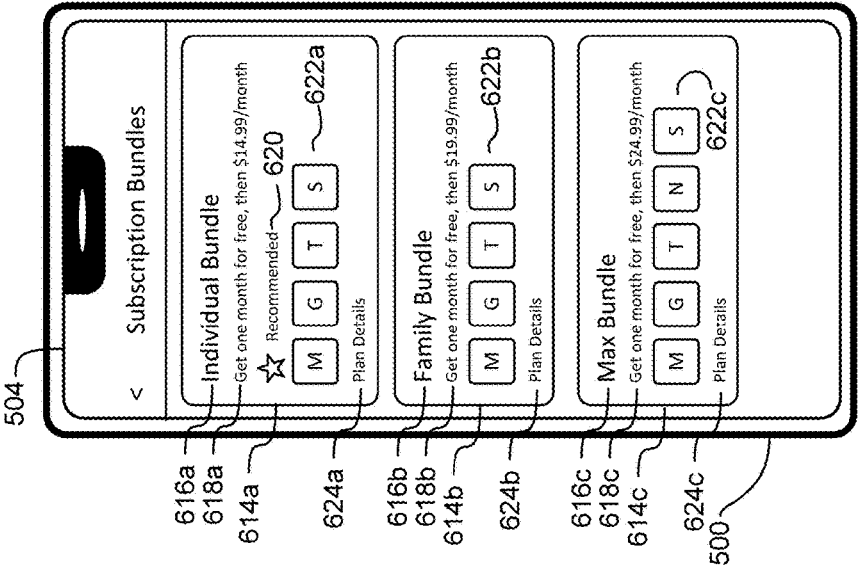
FIGS. 6A-6Y illustrate exemplary ways in which an electronic device 500 facilitates subscribing to a content service collection in accordance with some embodiments.
Figure 6A:
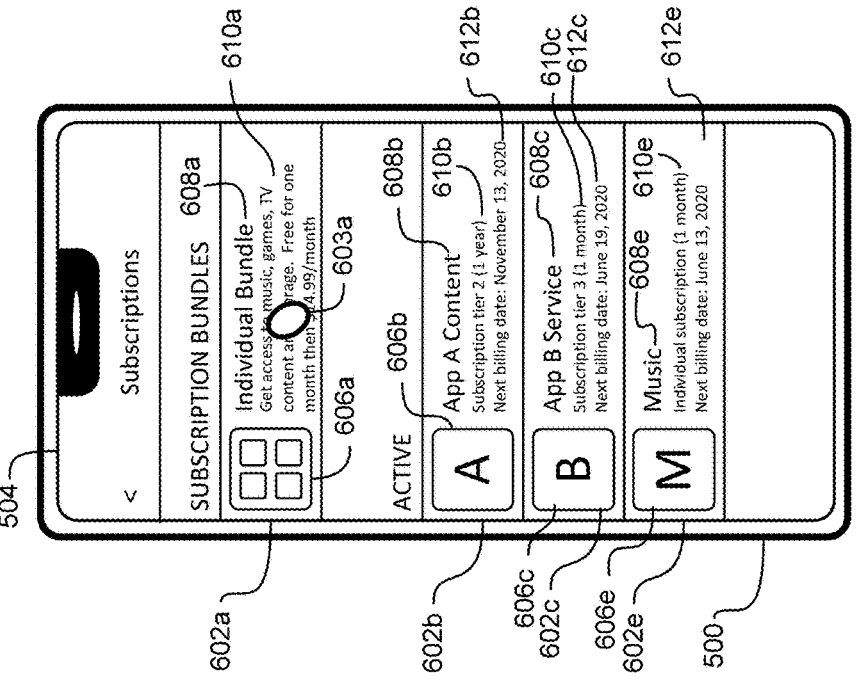
Figure 6D:
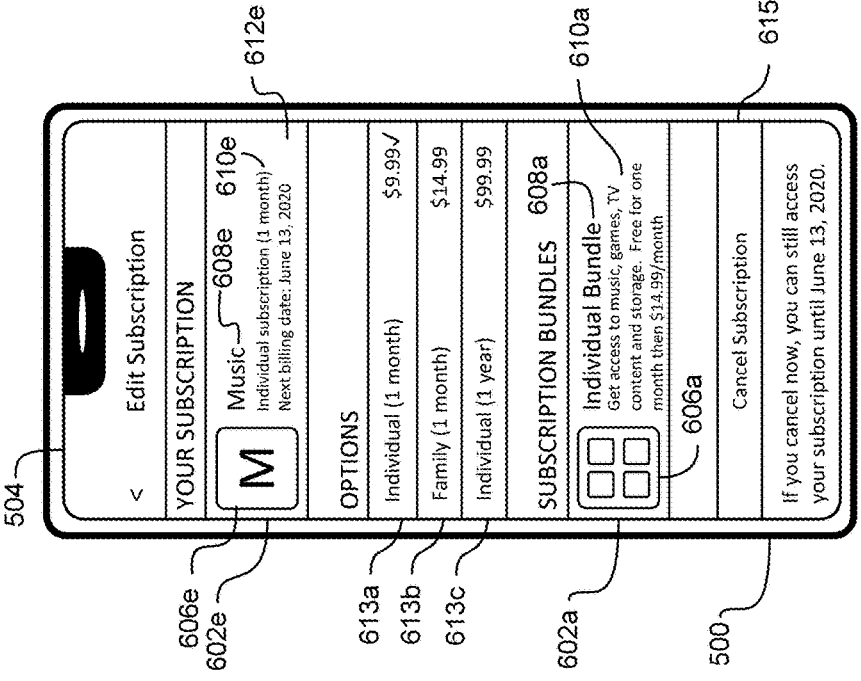
Figure 6C:
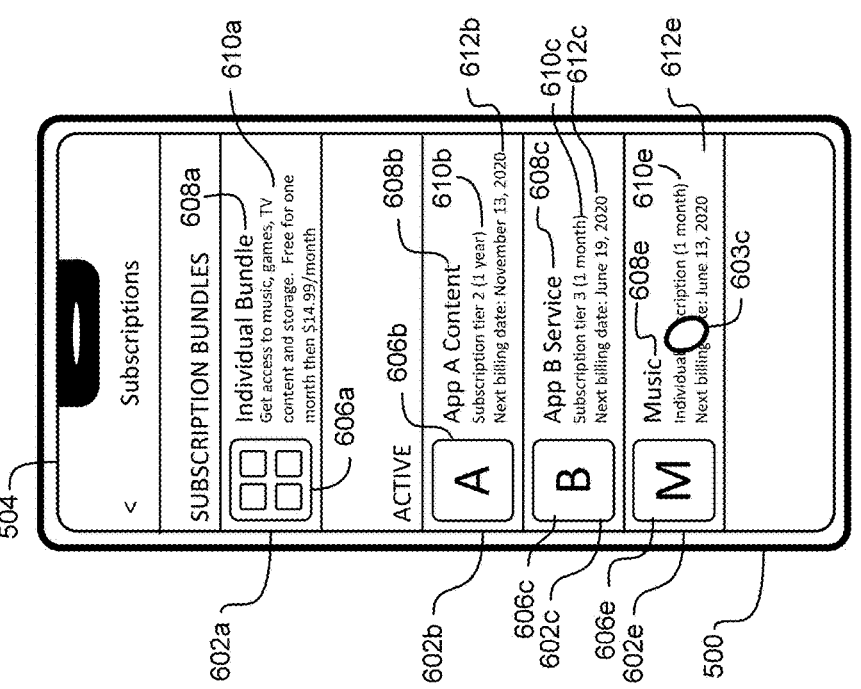
Figure 6F:
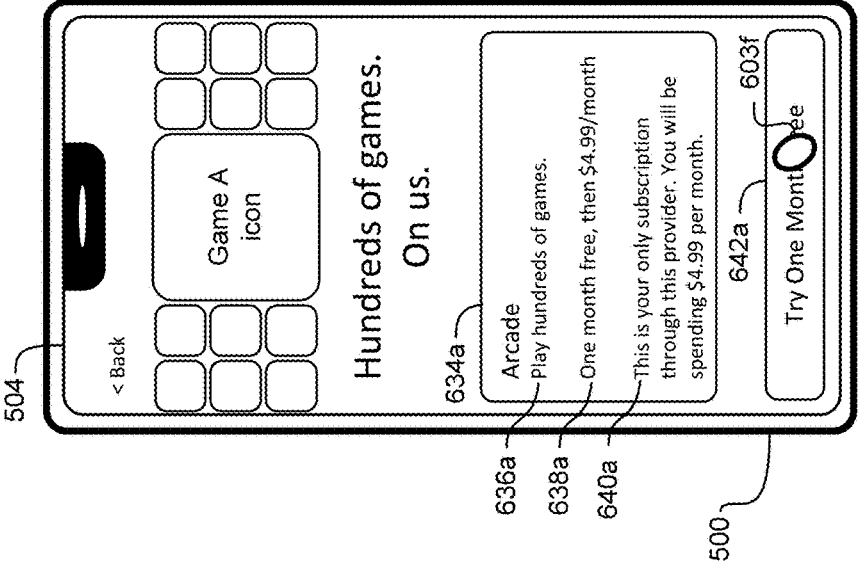
Figure 6E:
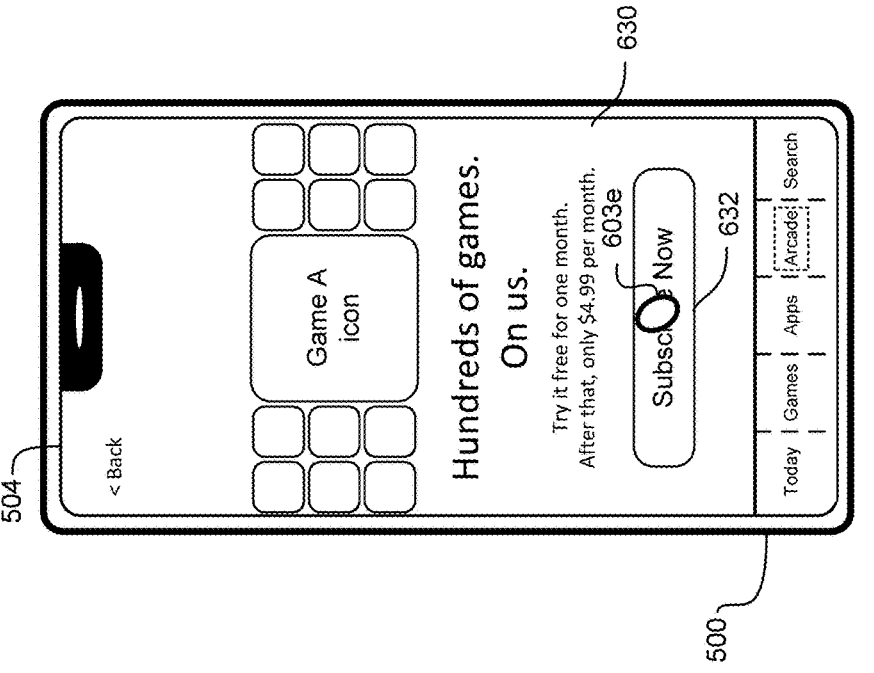
Figure 6H:
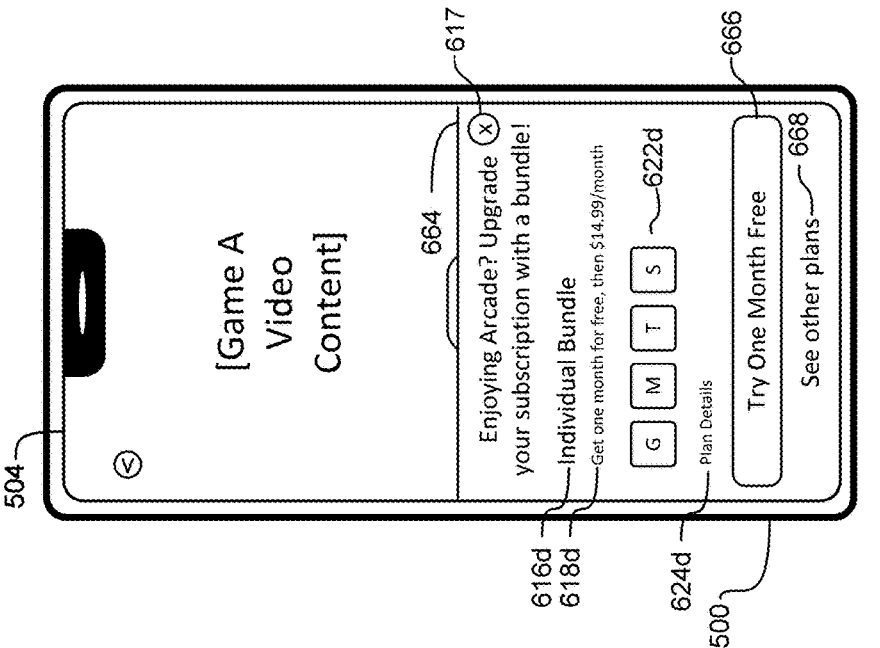
Figure 6G:
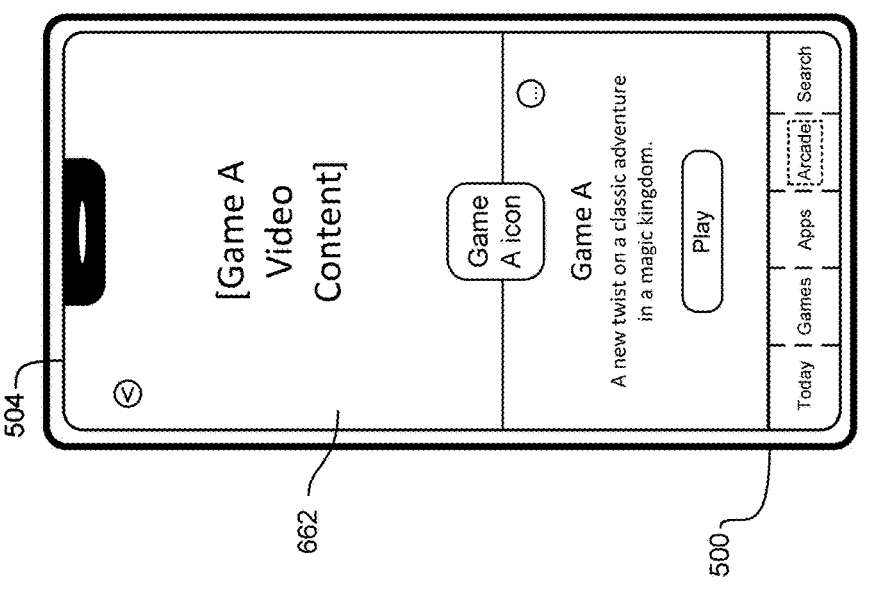
Figure 6J:
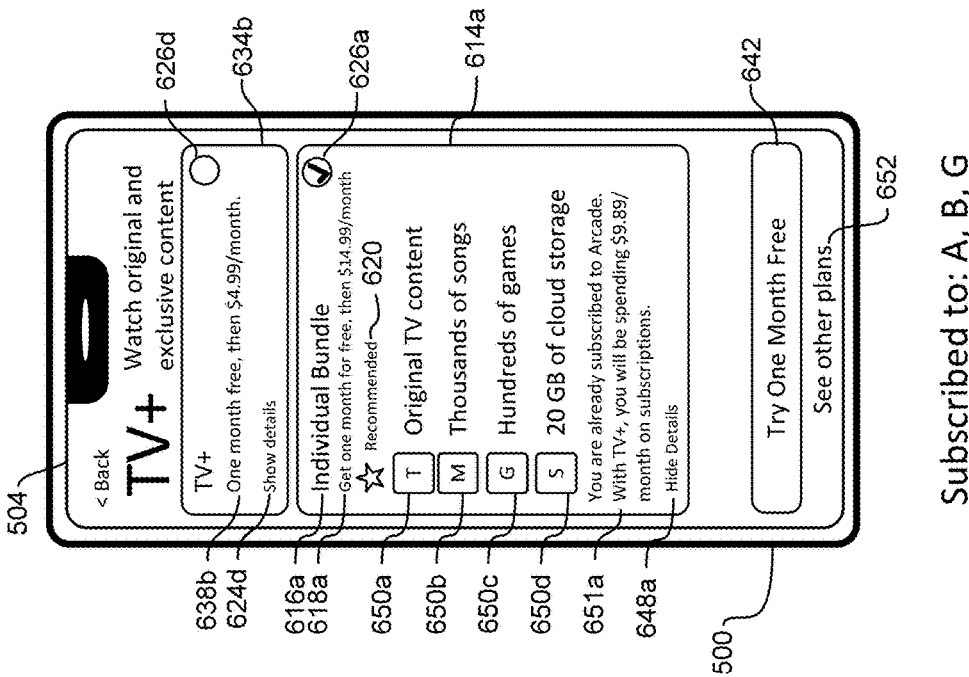
Figure 6I:
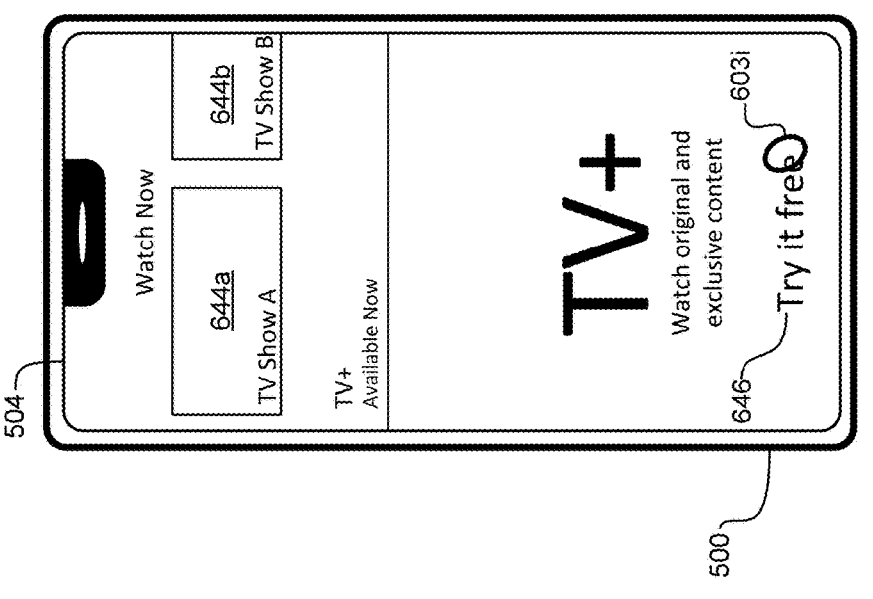
Figure 6L:
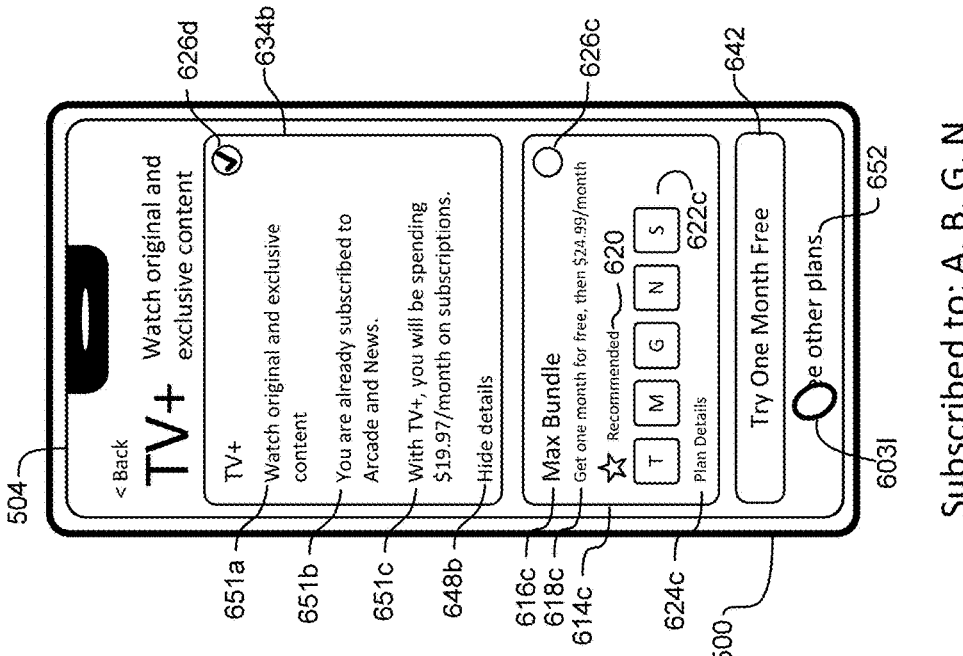
Figure 6K:
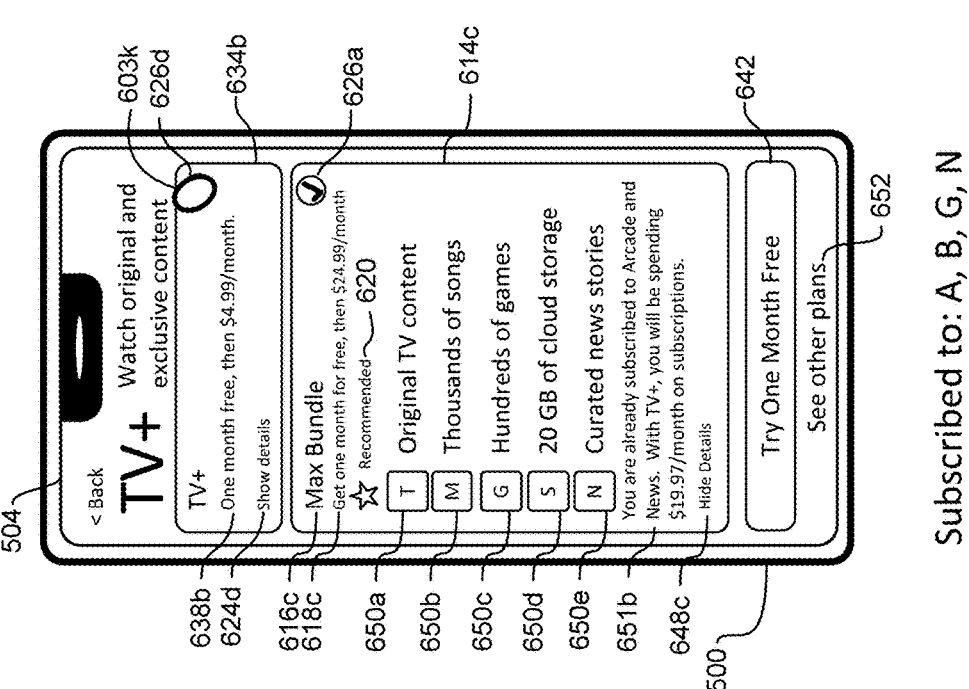
Figure 6N:
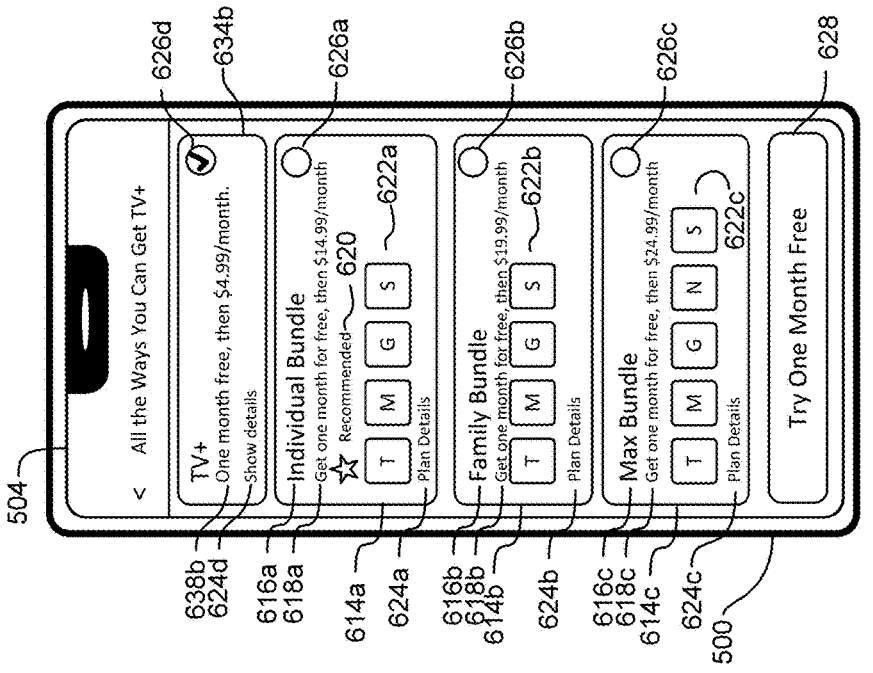
Figure 6M:
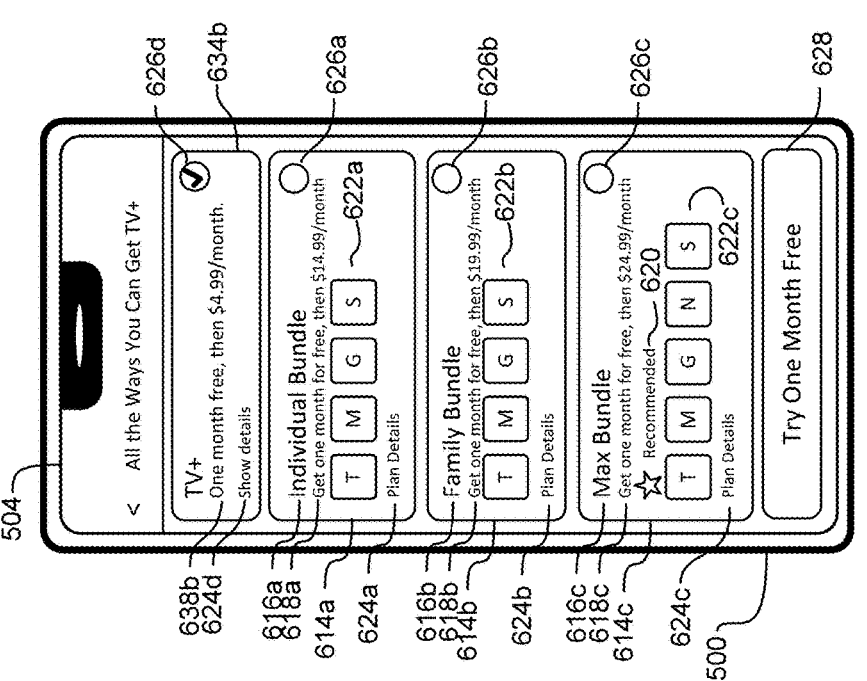
Figure 6P:
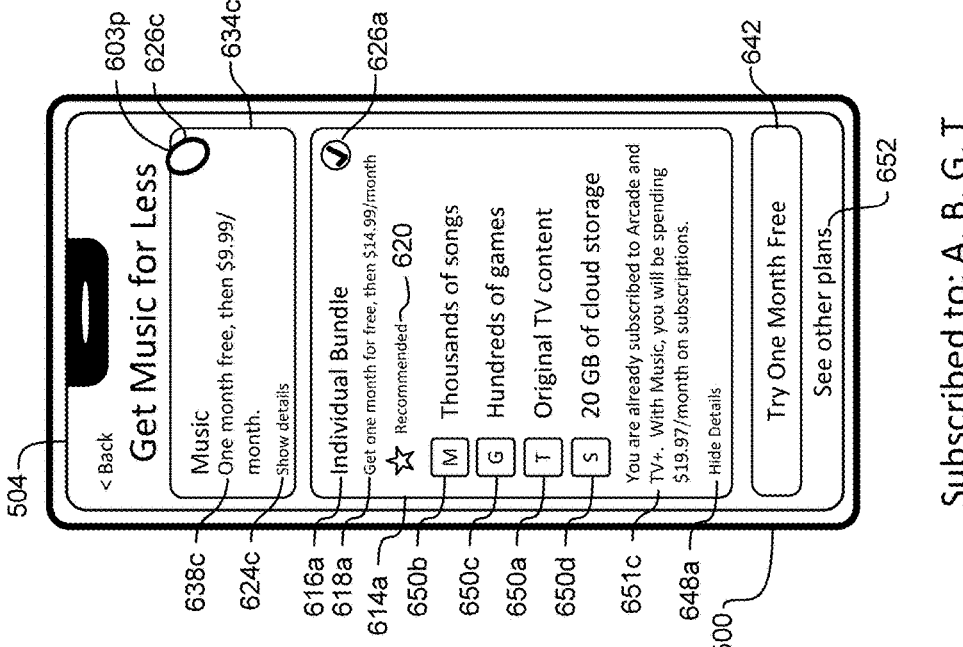
Figure 6O:
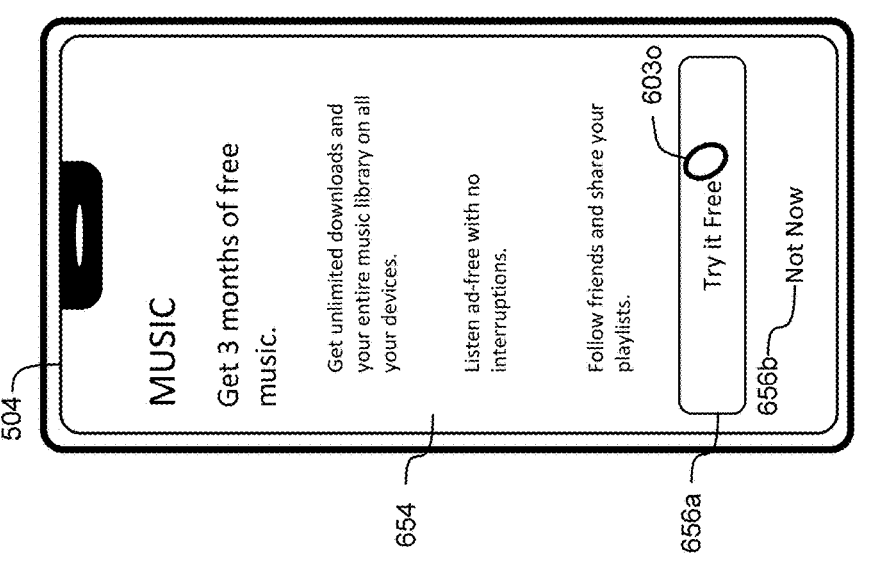
Figure 6R:
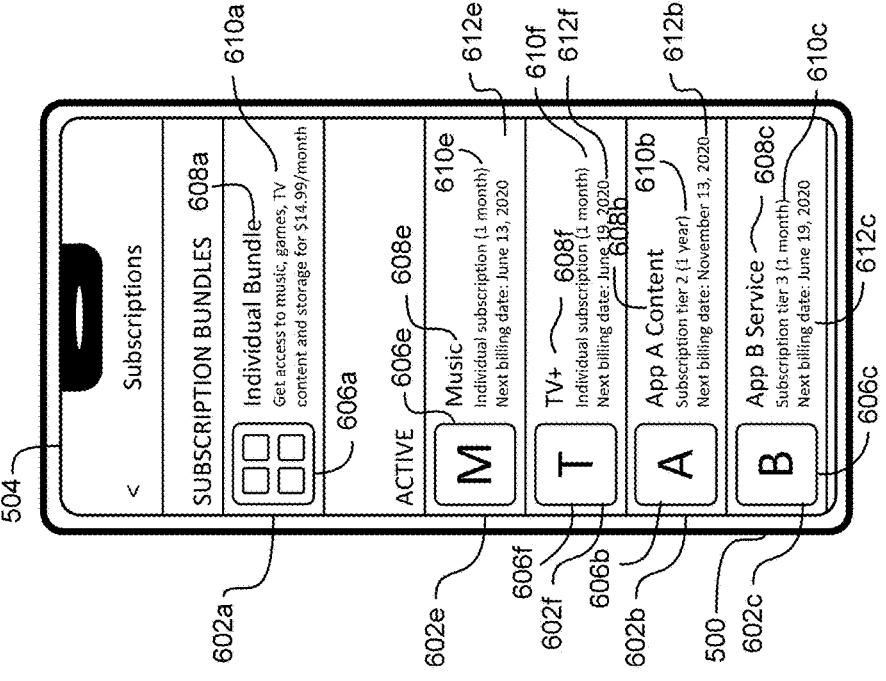
Figure 6Q:
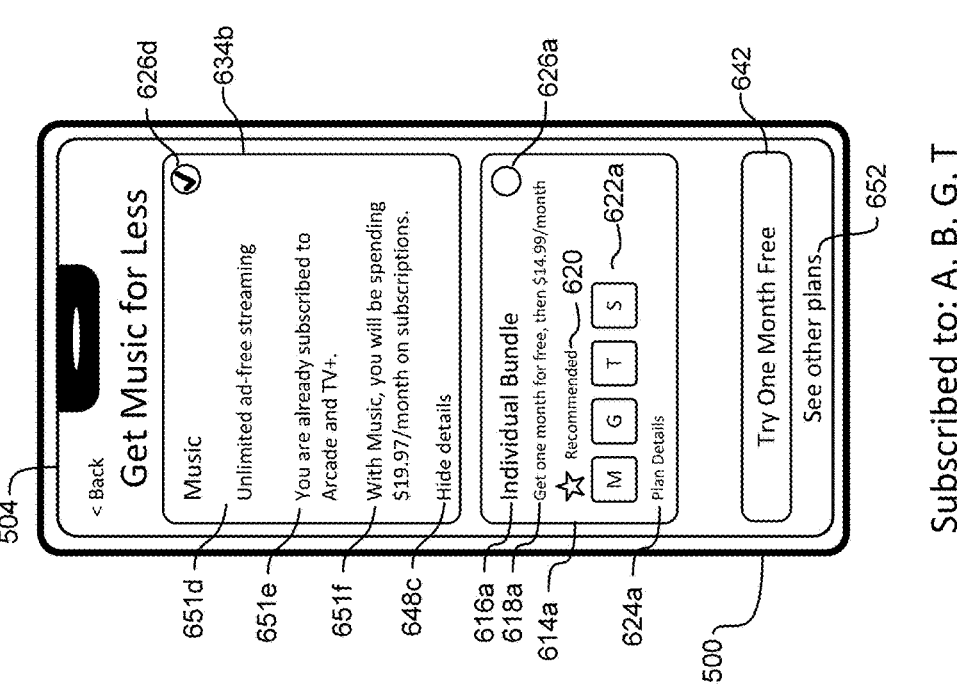
Figure 6T:
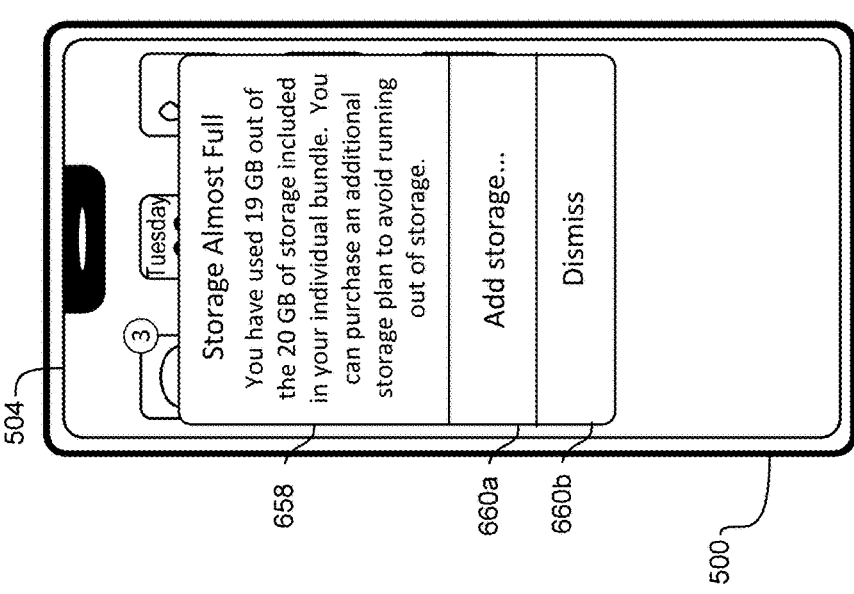
Figure 6S:
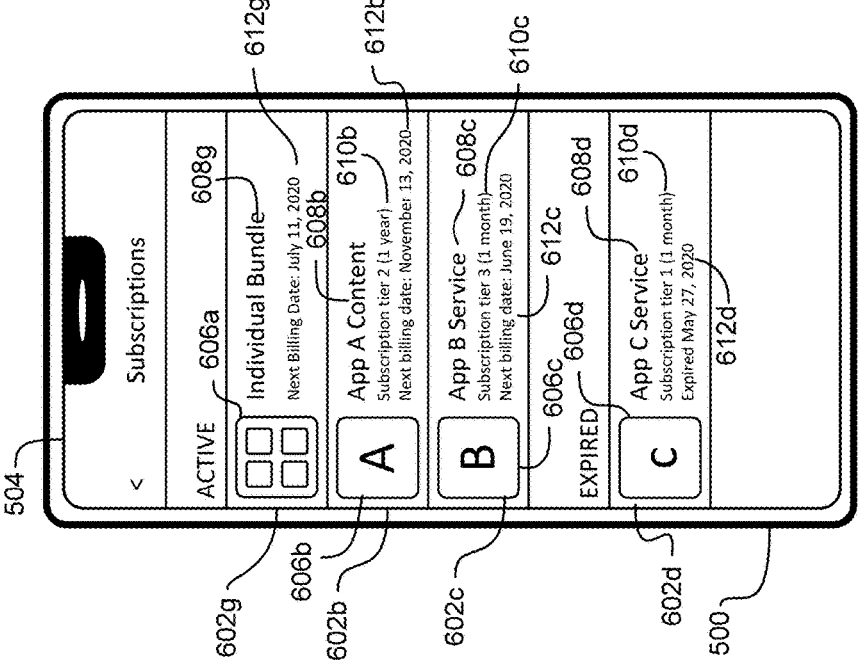
Figure 6V:
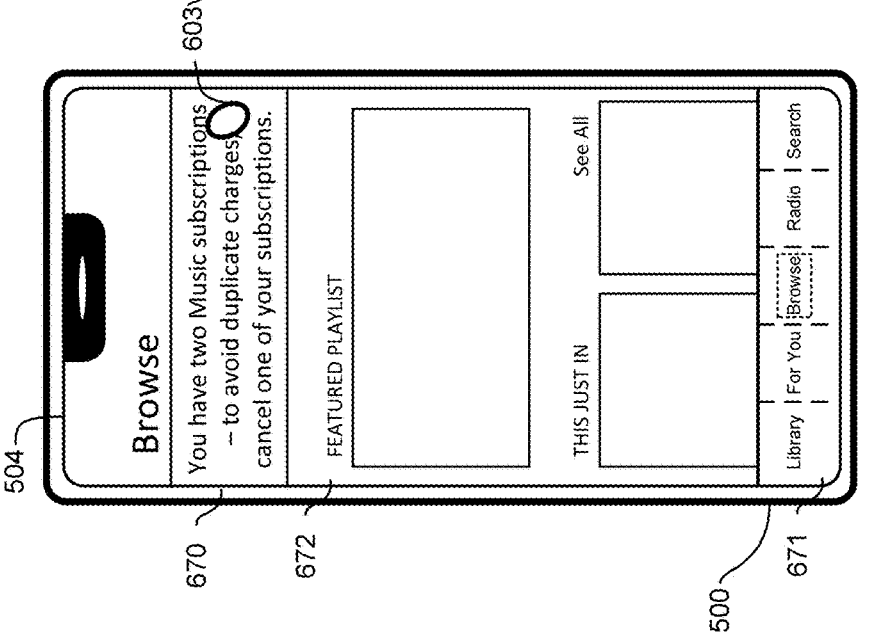
Figure 6U:
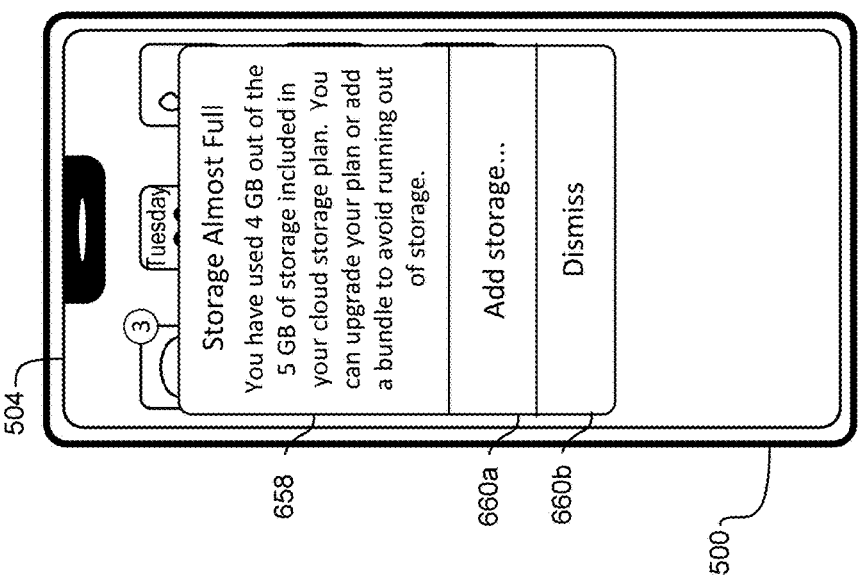
Figure 6X:
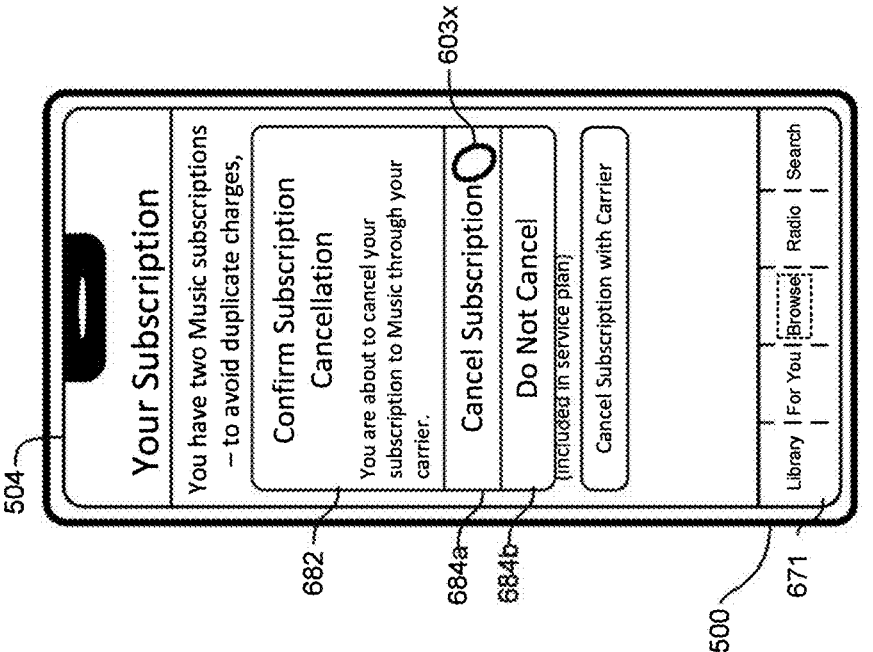
Figure 6W:
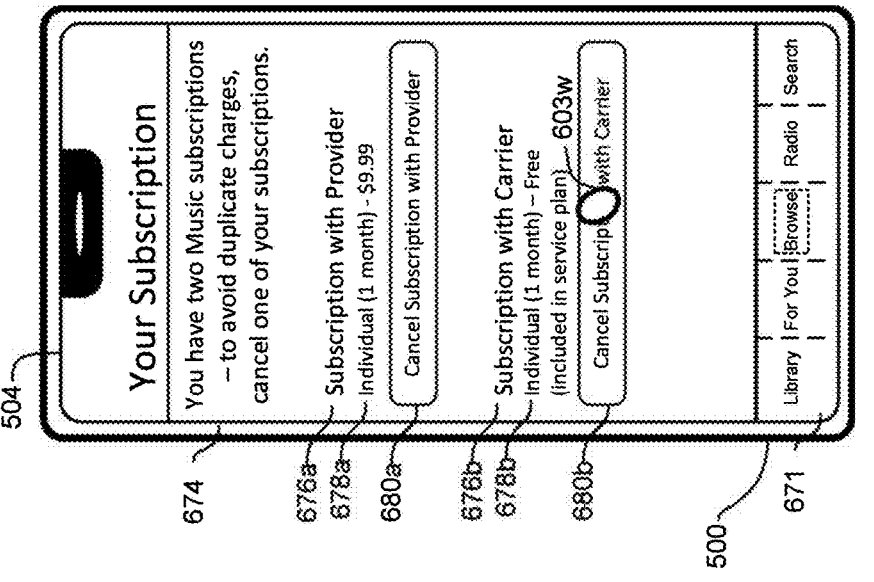
Figure 6Y:
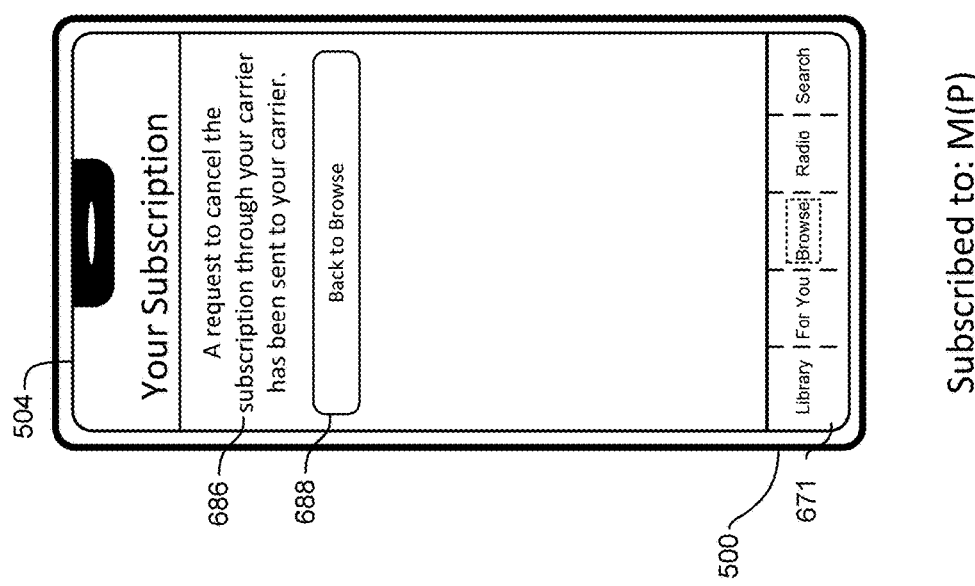

FIGS. 6A-6Y illustrate exemplary ways in which an electronic device 500 facilitates subscribing to a content service collection in accordance with some embodiments. The embodiments in these figures are used to illustrate the processes described below, including the processes described with reference to FIG. 7. Although FIGS. 6A-6Y illustrate various examples of ways an electronic device is able to perform the processes described below with reference to FIG. 7, it should be understood that these examples are not meant to be limiting, and the electronic device is able to perform one or more processes described below with reference to FIG. 7 in ways not expressly described with reference to FIGS. 6A-6Y.

In some embodiments, an electronic device is able to access various content items via subscription services. For example, a subscription to a video content streaming service entitles the user to stream video content using the electronic device. In some embodiments, a respective content provider is associated with a plurality of subscription services. For example, a music streaming service, a video content streaming service, a game application streaming service, a news article service, and/or a cloud storage service are available through a respective provider. In some embodiments, the electronic device is able to access a plurality of services available through a respective provider by subscribing to a collection of content services and/or applications that includes access to a plurality of services.

FIG. 6A illustrates an exemplary subscription management user interface. In some embodiments, the electronic device presents the subscription management user interface in response to detecting an input selecting an option to display the subscription management user interface. In some embodiments, the option to display the subscription management user interface is accessible from a user account settings user interface in a settings application of the electronic device 500.

In some embodiments, the subscription management user interface includes a representation 602a of a subscription service that includes subscriptions to various services and/or applications included in a collection of services. The representation 602a can include an indication 608a of the name of a recommended tier of the collection of services, information 610a about the subscription to the collection of services and/or applications, and an image 606a corresponding to the collection. The information 610a can include a list of services included in the collection and the price of the collection subscription.

In some embodiments, the subscription management user interface illustrated in FIG. 6A further includes representations 602b, 602c, and 602e of subscription services to which the user is subscribed. For example, representation 602b of one of the subscriptions can include the name 608b of the subscription, an indication 610b of the tier and renewal period of the subscription, an indication 612b of the renewal date of the subscription, and an image 606b corresponding to the application associated with the subscription. Representation 602b may include details to identify an application or service for which the subscription provides access or features. The subscription can enable the user to access one or more features of the application or service, such as premium content, extra storage, or removal of advertisements, to name a few examples. Representations 602c and 602e can include similar components to the components of representation 602b.

Although not shown in FIG. 6A, in some embodiments, the subscription management user interface can further include indications of subscriptions for applications and/or services to which the user used to be subscribed but is no longer subscribed, including expired subscriptions (e.g., subscriptions to which the user no longer has access because the subscription period has ended without paying for renewal) and inactive subscriptions (e.g., subscriptions that will not renew at the end of the subscription period to which the user still has access until the end of the subscription period is reached).

As shown in FIG. 6A, the representation 602a of the collection of services can be displayed while the user is not currently subscribed to the collection of applications and/or services. Thus, the electronic device provides an efficient way for the user to view information about and/or subscribe to a collection of applications and/or services while reviewing the services and applications to which the user is already subscribed and, optionally, services and applications to which the user was previously subscribed. The user can select (e.g., with contact 603a) the representation 602a of the collection of applications and/or services. In response to the user's selection in FIG. 6A, the electronic device 500 can present a user interface with more information about collections of applications and/or services, as shown in FIG. 6B.

FIG. 6B illustrates an exemplary user interface including representations 614a-c of collections of subscriptions. In some embodiments, the user interface illustrated in FIG. 6B is displayed in response to the user's selection in FIG. 6A.

As shown in FIG. 6B, in some embodiments, the electronic device 500 displays representations 614a-c of collections of services and/or applications to which the user is able to subscribe. For example, a representation 614a of an "individual bundle" can include the name 616a of the collection, an indication 618a of the subscription price of the collection, representations 622a of the applications and/or services included in the collection (e.g., "M" represents a music subscription, "G" represents a games subscription, "T" represents a TV content subscription, and "S" represents a storage subscription), and a selectable option 624a that, when selected, causes the electronic device 500 to present additional information about the collection. For example, in response to detecting selection of option 624a, the electronic device updates representation 614a illustrated in FIG. 6B to be similar to representation 614a as described below with reference to FIG. 6J. In some embodiments, representations 622a included in the collection can appear in a default order. As will be described in more detail below, in some embodiments, when electronic device 500 displays a representation of a collection of content services and/or applications, e.g., a subscription bundle, in a user interface associated with a respective content service included in the collection, the electronic device 500 displays the representation of the respective content service first in the list of representations of content services included in the collection of content services and/or applications. For example, in a horizontal list, the representation of the respective content service is displayed in the leftmost position for languages read left to right or in the rightmost position for languages read from right to left. In a vertical list, for example, the representation of the respective content service is displayed in the topmost position in the list. For example, while displaying one or more representations 614a-c in a user interface associated with a video content subscription service (e.g., represented by the "T" icon), electronic device 500 displays the "T" icon first in the lists 622a-c of icons corresponding to services and/or applications included in the bundle.

In some embodiments, one of representations 614a-c, e.g., representation 614a, is displayed with an indication, e.g., indication 620, that the collection associated with the representation is recommended to the user. In some embodiments, the recommendation is based on the services and/or applications to which the user is already subscribed, whether or not the user is part of a family group of other user accounts, and, optionally, other criteria. For example, because the user is subscribed to the music service included in the collection of services with an individual subscription, the electronic device 500 recommends the individual bundle corresponding to representation 614a. In some embodiments, the representation 602a of the collection of services displayed in FIG. 6A is a representation of the recommended collection of services. Because the individual bundle is recommended to the user, the representation 602a included in the subscriptions user interface illustrated in FIG. 6A corresponds to the individual bundle. If, instead, a different collection, e.g., subscription bundle, was recommended to the user, representation 602a included in the user interface illustrated in FIG. 6A would correspond to the other, recommended collection and that collection would be displayed first in the user interface illustrated in FIG. 6B.

The electronic device 500 can display representations 614*b* and 614*c* of other collections that include elements similar to the elements of representation 614*a* described above. For example, representation 614*b* corresponds to a collection of services that can include the same services as representation 614*a*, but provides access to the services to multiple user accounts that are in the same family group, instead of only providing access to an individual user account, as may be the case for the collection corresponding to representation 614*a*. As another example, representation 614*c* corresponds to a collection of services that can include access to a service (e.g., a news service represented by "N") not included in the collection corresponding to representation 614*a*.

In some embodiments, in response to detecting selection of one of the representations 614*a-c* of, electronic device 500 initiates a process to subscribe to the collection corresponding to the respective representation 614*a-c* selected by the user.

In some embodiments, electronic device 500 displays information about one or more collections of content services and/or applications in a user interface for editing a subscription to an individual service that is included in a collection of content services and/or applications, as will be described below with reference to FIGS. 6C-6D.

FIG. 6C illustrates the exemplary subscriptions user interface described above with reference to FIG. 6A. In FIG. 6C, the user may select (e.g., with contact 603*c*), a representation 602*e* of a music subscription. In some embodiments, the music subscription is included in one or more collections of content services and/or applications. In the example illustrated in FIG. 6C, the user can be subscribed to the music service without being subscribed to a collection of content services and/or applications, e.g., a subscription bundle, that includes the music service. The user may select (e.g., with contact 603*c*) t representation 602*e* of the music service. In response to the user's selection, electronic device 500 can display a user interface for editing the music subscription, such as the user interface described below with reference to FIG. 6D.

FIG. 6D illustrates an exemplary subscription management user interface for a music subscription service. In some embodiments, the user interface illustrated in FIG. 6D can be displayed in response to the user's selection in FIG. 6C. The user interface can include representation 602*e* of the music subscription service, multiple options 613*a-c* for other ways (e.g., other subscription tiers) to obtain a music subscription service, representation 602*a* of a subscription bundle, and a selectable option 615 for canceling the music subscription.

In some embodiments, representation 602*e* of the music service can include an image 606*e* corresponding to the music service, name 608*e* of the service, an indication 610*e* of the subscription tier and subscription period of the subscription to which the user is subscribed, and an indication 612*e* of the date upon which the subscription will automatically renew and a charge will be applied. As shown in FIG. 6D, option 613*a* corresponds to the tier of the subscription to which the user is subscribed and is displayed with a check mark indicating that the user is subscribed. Options 613*b-c* corresponding to the other subscription tiers are optionally displayed without check marks. When one of the options, e.g., options 613*b-c*, is selected, electronic device 500 initiates a process to update the user's subscription to the service from the current tier to the tier corresponding to the selected option. Additional examples of subscription management user interfaces are described below with reference to FIGS. 8A-9.

As described above with reference to FIGS. 6A-6B, the collection of content services and/or applications corresponding to representation 602*a* can be the collection of content services and/or applications that is recommended to the user based on the subscriptions to which the user is already subscribed, whether or not the user account is included in a family group of accounts, and other criteria. In the example of FIG. 6D, the individual bundle is the collection of content services and/or applications recommended to the user, so the representation 602*a* included in the subscription management user interface illustrated in FIG. 6D may correspond to the individual bundle. If, instead, a different collection of content services and/or applications was recommended to the user, electronic device 500 would display a representation corresponding to the other collection that is recommended to the user in the user interface illustrated in FIG. 6D. In some embodiments, in response to detecting selection of representation 602*a* of the collection of services, electronic device 500 displays the user interface described above with reference to FIG. 6B.

In some embodiments, electronic device 500 displays representations of collections of content services and/or applications while the user is interacting with a respective service included in one or more available collections, as will now be described with reference to FIGS. 6E-6Q.

FIG. 6E illustrates an exemplary user interface 630 associated with a games subscription service. In some embodiments, the games subscription service provides access to download a plurality of subscription games applications while the user is subscribed to the games subscription service. In some embodiments, the electronic device 500 presents information about subscription games and options to download subscription games within a user interface of an application store application that also includes information about and options to download applications not provided by the games subscription service. Thus, in some embodiments, the user interface 630 illustrated in FIG. 6E is a user interface of the application store user interface.

While the electronic device 500 displays the user interface 630 illustrated in FIG. 6E, the user is subscribed to subscription services A and B, which, in this example, are not included in any of the collections of content services and/or applications. As shown in FIG. 6E, the user may select (e.g., with contact 603*e*) a selectable option 632 to initiate a process to subscribe to the games subscription In some embodiments, when selectable option 632 is selected, electronic device 500 displays the user interface illustrated in FIG. 6F.

FIG. 6F illustrates an exemplary user interface for subscribing to a games subscription service. In some embodiments, the user interface illustrated in FIG. 6F is displayed in response to the user's selection in FIG. 6E. In some embodiments, the user interface includes a representation 634*a* of a subscription to the games subscription service. The subscription to the games subscription service does not include access to any additional content services in some embodiments. In some embodiments, because the games subscription service will be the first subscription to which the user is subscribed, the electronic device 500 forgoes displaying a representation of a collection of content services and/or applications while displaying the representation 634*a* of the games subscription service. In some embodiments, if the electronic device 500 instead displays a user interface for subscribing to a different service while the user was not yet subscribed to any other services, the electronic device 500 would display the representation of the other service without providing a representation of a collection of content services and/or applications, e.g., a subscription bundle.

In some embodiments, the representation 634a of the games subscription includes a description 636a of what is included in the subscription, an indication 638a of the price and period of the subscription, and an indication 640a that the user whether the user is subscribed to any other services included in collections of content services and/or applications, e.g., subscription bundles, and the total cost the user will spend on services included in services and/or applications once the user subscribes to the games subscription. In some embodiments, a user interface for subscribing to a different service would include similar elements corresponding to the other service.

As shown in FIG. 6F, the user may select (e.g., with contact 603f) an option 642a to subscribe to the games subscription service. In some embodiments, in response to detecting selection of the option 642a, the electronic device 500 subscribes the user to the games subscription service. Once subscribed to the games subscription service, the user account is able to download the applications included in the subscription.

In some embodiments, the electronic device 500 displays a representation of a collection of content services and/or applications while the user interacts with a user interface associated with a subscription service included in the collection, as will now be described with reference to FIGS. 6G-6H.

FIG. 6G illustrates an exemplary user interface 662 associated with the games subscription service. In some embodiments, the electronic device 500 displays the user interface 662 while the user is subscribed to services A, B, and G. For example, service G is the games subscription service associated with user interface 662 and may be included in one or more collections of content services and/or applications.

In some embodiments, as shown in FIG. 6H, while the user is viewing the user interface associated with the games subscription while subscribed to the games subscription that is included in the collection of content services and/or applications, the electronic device 500 displays information about a collection of content services and/or applications including the games subscription in a region 664 overlaid on the user interface associated with the games subscription. In some embodiments, the information is displayed after determining that one or more criteria are met, such as the user being subscribed to the games subscription for a predetermined amount of time, and/or the user having interacted with the games subscription for a predetermined amount of time, and/or the user having interacted with the games subscription a predetermined number of times.

As shown in FIG. 6H, in some embodiments, the information about the collection of content services and/or applications, e.g., the subscription bundle, can include an indication 616d of the name of a recommended collection of content services and/or applications, an indication 618d of the renewal period and price of the subscription to the collection, representations 622d of the services included in the collection, and an option 624d that, when selected, causes the electronic device 500 to display additional information about the collection of content services and/or applications. In some embodiments, in response to detecting selection of option 624d, the electronic device 500 expands the information to include more information, such as the information included in representation 616a of the content service illustrated in FIG. 6J. In some embodiments, the electronic device 500 also displays an option 666 to initiate a process to subscribe to the collection of services, an option 668 to view representations of other plans (e.g., in the user interface illustrated in FIG. 6B), and an option 617 to cease displaying the information in region 664 without subscribing to the content service collection. In some embodiments, in the list of representations 622d of content services included in the collection of content services and/or applications, the representation of the games subscription (e.g., the "G" icon) can be displayed first in the list (e.g., the leftmost position for a horizontal list in a language read from left to right). In some embodiments, if the information about the collection of content services and/or applications were displayed while the user was interacting with a different content service included in the collection, the electronic device 500 would display the representation of that content service first in the list of representations 622d of content services included in the collection.

FIGS. 6I-6N illustrate another example of the user interacting with a subscription service included in the collection of content services and/or applications. For example, the user can interact with user interfaces corresponding to a video content streaming service.

FIG. 6I illustrates an exemplary user interface associated with a video content streaming service. The user interface optionally includes representations 644a and 644b of content series accessible via the content streaming service and an option 646 that, when selected, causes the electronic device 500 to initiate a process to subscribe to the video streaming service. In this example, the electronic device 500 displays the user interface of the video content streaming service while the user is subscribed to subscription services A, B, and G. For example, services A and B are not associated with any collections of content services and/or applications, while subscription G is associated with at least one collection of content services and/or applications. As shown in FIG. 6I, the user may select (e.g., with contact 603i) the option 646 to initiate a process to subscribe to the video content streaming service. In response to the user's selection, the electronic device 500 may display a user interface including an option to subscribe to the video content streaming service without subscribing to any additional content services included in a content service collection and an option to subscribe to a content service collection that includes access to the video content streaming service, such as the user interface illustrated in FIG. 6J.

FIG. 6J illustrates an exemplary user interface for subscribing to a video content subscription service. In some embodiments, the user interface illustrated in FIG. 6J is displayed in response to the user's selection in FIG. 6I. In some embodiments, because the user is already subscribed to a service (e.g., the games subscription service) included in the collection of content services and/or applications and the video streaming service is also included in the collection of content services and/or applications, the electronic device 500 displays a representation 614a of the collection of content services and/or applications in the user interface for subscribing to the video content streaming service. The user interface may further include a representation 634b of a subscription to the video content streaming service that does not include access to other services.

In some embodiments, the representation 634b of the video content streaming service includes a checkbox 626d and the representation 614a of the collection of content services and/or applications includes checkbox 626a. While the checkbox 626a of representation 614a is selected, the selectable option 642 is selectable to initiate a process to subscribe to the collection of content services and/or applications. While the checkbox 626*d* of representation 634*b* is selected, the selectable option 642 is selectable to initiate a process to subscribe to the video streaming service without subscribing to the other content services included in the content service collection. In some embodiments, in response to detecting selection of option 646 illustrated in FIG. 6I, the electronic device 500 displays the user interface illustrated in FIG. 6J with the checkbox 626*a* of the representation 614*a* selected by default.

As shown in FIG. 6J, the representation 614*a* of the collection of content services and/or applications can be expanded to include information about each service included in the collection. The representation 614*a* includes the name 616*a* of the collection, information 618*a* about the renewal period and price of the subscription to the collection, an indication 620 that the collection is recommended to the user, representations 650*a-d* of the services included in the collection displayed in association with a description of each service, an indication 651*a* of the services included in the collection to which the user is already subscribed and the amount of money the user will be spending on services that are included in the collection if the user subscribes to the video content streaming service without subscribing to the entire collection of content services and/or applications, and an option 648*a* to hide the details of the subscription service (e.g., the descriptions of the content services included in the collection and the information 651*a* about the user's other subscriptions and the cost of the subscriptions). As shown in FIG. 6J, the indication 650*a* of the video content streaming service is displayed first in the vertical list of representations 650*a-d* of content services because the representation 614*a* of the collection of content services and/or applications is displayed in a user interface associated with the video content streaming service.

FIG. 6K illustrates another example of a user interface for subscribing to the video content streaming service. In this example, the user is subscribed to services A, B, G, and N. In some embodiments, services A and B are not included in any content service collections and services G and N are included in at least one content service collection. In some embodiments, service G is included in the "Individual Bundle" corresponding to representation 614*a* illustrated in FIG. 6J and the "Max Bundle" corresponding to representation 614*b* illustrated in FIG. 6K, while service N is included in the "Max Bundle" corresponding to representation 614*b* illustrated in FIG. 6K, but is not included in the "Individual Bundle" corresponding to the representation 614*a* illustrated in FIG. 6J. Because the user is subscribed to service N, the electronic device 500 recommends the "Max Bundle" instead of the "Individual Bundle" and displays representation 614*c* in the user interface instead of representation 614*a*. The user may select (e.g., with contact 603*k*) the checkbox 626*d* of the representation 634*b* of the video content streaming service displayed in the user interface described above with reference to FIG. 6J. In some embodiments, in response to the user's selection in FIG. 6K, the electronic device 500 may display the user interface illustrated in FIG. 6L.

FIG. 6L illustrates an example of the user interface for subscribing to the video content streaming service in response to detecting the user input illustrated in FIG. 6K. In response to the input illustrated in FIG. 6K, the electronic device 500 may select the checkbox 626*d* of the representation 634*b* of the video content streaming service, expand the representation 634*b* of the video content streaming service, and reduce the representation 614*c* of the collection of content services and/or applications. As shown in FIG. 6L, in some embodiments, the expanded representation 634*b* of the video content streaming service includes a description 651*a* of the video content streaming service, an indication 651*b* of the other subscription services to which the user is already subscribed, an indication 651*c* of the total cost per month of services included in the collection if the user subscribes to the video content streaming service, and an option 648*b* to reduce, e.g., collapse, the representation 634*b* (e.g., to cause the electronic device to display the representation 634*b* in a manner similar to the manner illustrated in FIG. 6K). The reduced representation 614*c* of the collection of content services and/or applications may include elements corresponding to the elements of representation 614*a* described in detail above with reference to FIG. 6B.

In some embodiments, in response to detecting selection of the option 648*b* to reduce the representation 634*b* shown in FIG. 6L, the electronic device 500 updates the user interface to include the representation 634*b* illustrated in FIG. 6K without unchecking check box 626*d*. In some embodiments, in response to detecting selection of the option 624*c* to expand the representation 614*c* shown in FIG. 6L, the electronic device displays representation 614*c* illustrated in FIG. 6K without checking the checkbox 626*c* included in representation 614*c*. Likewise, in some embodiments, in response to detecting selection of the option 624*d* to expand representation 634*b* shown in FIG. 6K, the electronic device 500 displays the representation 634*b* illustrated in FIG. 6L without checking the checkbox 626*d* included in representation 634*b*. In some embodiments, in response to detecting selection of the option 648*c* to reduce the representation 614*c* of the collection of content services and/or applications shown in FIG. 6K, the electronic device 500 displays the representation 614*c* of the collection of content services and/or applications shown in FIG. 6L without unchecking the checkbox 626*a* included in representation 614*c*. In some embodiments, exactly one representation (e.g., representation 634*b* or representation 614*c*) is expanded at a time. In some embodiments, it is possible for both representations 634*b* and 614*c* to be expanded or reduced at the same time.

As shown in FIG. 6L, the user may select (e.g., with contact 603*l*) a selectable option 652 that, when selected, causes the electronic device 500 to display a user interface with representations of all of the subscriptions that include access to the video content streaming subscription, such as the user interface illustrated in FIG. 6M.

FIG. 6M illustrates an exemplary user interface that includes the representation 634*b* of the video content streaming service and representations 614*a-c* of collections of content services and/or applications that include the video content streaming service. Representation 634*b* can be the same as or similar to representation 634*b* illustrated in FIGS. 6J and 6K. Representations 614*a-c* can be similar to representations 614*a-c* described above with reference to FIG. 6B, except the representations illustrated in FIG. 6M include checkboxes 626*a-c*, which provide a way for the user to select a subscription to which they wish to subscribe. The user interface may include an option 628 that, when selected, causes the electronic device 500 to initiate a process to subscribe to the subscription corresponding to the selected representation. As shown in FIG. 6M, the representation 634*b* corresponding to the subscription to the video content streaming service is selected because representation 634*b* was selected in FIG. 6L when the input to display the user interface in FIG. 6M was received. As described above, in some embodiments, because the user is subscribed to service N (among other things), the recommended collection of content services and/or applications is the collection that includes access to service N. Therefore, as shown in FIG. 6M, for example, the representation 614c of the collection of content services and/or applications that includes access to service N can be displayed with an indication 620 that it is the recommended collection of content services and/or applications for the user.

In some embodiments, if a different collection of content services and/or applications is recommended to the user, the electronic device 500 will display the indication 620 that a respective collection is recommended within the representation of the respective collection. For example, FIG. 6N illustrates the same user interface as the user interface illustrated in FIG. 6M in a situation in which a different collection of content services and/or applications is recommended to the user. As shown in FIG. 6N, the user is subscribed to services A, B, and G. As described above, in this example, services A and B are not included in any of the collections of content services and/or applications, while service G is included in multiple content service collections. Because the user is not subscribed to service N in FIG. 6N, for example, the electronic device 500 displays the indication 620 of the recommended collection of content services and/or applications within the representation 614a of the "Individual Bundle" instead of within the representation 614c of the "Max Bundle." As another example, if the user account of the user was included in a family group of user accounts, the electronic device 500 could instead display the indication 620 of the recommended collection of content services and/or applications within the representation 614b of the "Family Bundle."

In the examples described above with reference to FIGS. 6A-6N, the electronic device 500 is able to display representations of collections of content services and/or applications that, in situations in which subscribing to a collection is more expensive than subscribing to one or more services individually, do not include an indication of the relative price of the collection versus the price of one or more subscriptions without subscribing to the full collection. In some situations, it is less expensive for the user to subscribe to a collection of content services and/or applications than it would be to pay for individual subscriptions to one or more services included in the content service collections. In some embodiments, the electronic device 500 displays an indication that subscribing to the collection of content services and/or applications would save the user money in situations in which it is less expensive to subscribe to a collection than it is to pay for one or more subscriptions separately.

FIG. 6O illustrates an exemplary user interface associated with a music streaming subscription service. For example, the user interface includes a description 654 of the music streaming service, an option 656a that, when selected, causes the electronic device 500 to initiate a process to subscribe to the music streaming subscription service, and an option 656b that, when selected, causes the electronic device 500 to display a different user interface of the music application without initiating the process to subscribe to the music streaming service. In this example, while the electronic device 500 displays the user interface illustrated in FIG. 6O, the user is subscribed to services A, B, G, and T. In some examples, services A and B are not included in any of the collections of content services and/or applications, while services G and T are included in at least one collection of content services and/or applications. As shown in FIG. 6O, the user may select (e.g., with contact 603o) the option to initiate a process to subscribe to the music streaming service. In response to the user's selection, the electronic device 500 displays a user interface for subscribing to the music streaming service, such as the user interface illustrated in FIG. 6P, for example.

FIG. 6P illustrates an exemplary user interface for subscribing to a music streaming service. In some embodiments, the user interface illustrated in FIG. 6P can be displayed in response to detecting the user input illustrated in FIG. 6O. The user interface in FIG. 6P can include a representation 634c of a subscription to the music streaming service that does not include access to other content services and a representation 614a of a collection of content services and/or applications including the music subscription service. Representation 634c can be similar to representation 624b described above with reference to FIGS. 6J-6K and 6M-6N except instead of including details related to the video content streaming service, representation 634c can include details related to the music streaming service. As shown in FIG. 6P, while the electronic device 500 displays the user interface of FIG. 6P, the user of the electronic device 500 is subscribed to services A and B, which may not be included in any collections of content services and/or applications, and services G and T, which may be included in at least one collection of content services and/or applications.

In some embodiments, the user interface illustrated in FIG. 6P can further include a representation 614a of a collection of content services and/or applications recommended to the user (e.g., based on the subscriptions to which the user is already subscribed). Representation 614a shown in FIG. 6P can be similar to representation 614a illustrated in FIGS. 6J and 6K except for the differences that will now be described. As shown in FIG. 6P, in some embodiments, the representation 650b of the music streaming service is displayed first in the list of representations 650a-d of content services included in the collection of content services and/or applications because the representation 614a of the collection of content services and/or applications is displayed in a user interface associated with the music streaming service. Representation 614a includes information 651c about the other services to which the user is already subscribed, including the total cost of those subscriptions, plus the music streaming service if the user were to subscribe to all of the services separately instead of subscribing to access to the collection of content services and/or applications. In this example, the cost of the subscription to the collection of content services and/or applications is $14.99, while the total cost of the subscriptions would be $19.97 if each subscription is billed separately. Thus, for example, the top of the user interface illustrated in FIG. 6P indicates that subscribing to the collection will allow the user to access the music streaming service for less money than subscribing to the music streaming service separately.

As shown in FIG. 6P, the user may select (e.g., with contact 603p) the checkbox 626c included in the representation 634c of the music streaming service. In some embodiments, in response to the user's selection in FIG. 6P, the electronic device 500 can select the representation 634c of the subscription to the music streaming service, expand the representation 634c of the music streaming service, and reduce the representation 614a of the collection of content services and/or applications, as shown in FIG. 6Q.

FIG. 6Q illustrates an exemplary user interface displayed by the electronic device 500 in response to the user's selection in FIG. 6P. In FIG. 6Q, the representation 635b of the music streaming service can be expanded to include a description 651d of the music streaming service, an indication 651*e* of the other content services included in the collection of content services and/or applications to which the user is already subscribed (e.g., services G and T), and an indication 651*f* of the total cost per month the user will be spending on subscriptions included in the content service collection if the user subscribes to the music streaming service without subscribing to the entire content service collection. In some embodiments, the representation 614*a* of the collection of content services and/or applications displayed in FIG. 6Q can be reduced and can be the same as or similar to representations 614*a-c* described above with reference to FIGS. 6B, 6L-6N, and 6P. In some embodiments, as shown in FIG. 6Q, the representation of the music streaming service can be listed first in the list of representations 622*a* of services included in the content service collection because the representation 614*c* of the content service collection can be displayed in a user interface related to the music streaming application.

As will be described below with reference to FIGS. 6R-6S, the electronic device 500 can display representations of individual services included in the content service collection to which the user is subscribed without being subscribed to the entire content service collection in a subscriptions user interface or, if the user is subscribed to the entire content service collection, the electronic device 500 can display a representation of the content service collection without displaying representations of the individual services included in the collection in the subscriptions user interface.

FIG. 6R illustrates an exemplary subscriptions user interface while the user is subscribed to a number of services included in a collection of content services and/or applications without being subscribed to the entire collection of content services and/or applications. For example, as shown in FIG. 6R, the user is subscribed to services A and B, which may not be included in a collection of content services and/or applications, and services G, T, and M, which may be included in the collection of content services and/or applications. The subscriptions user interface illustrated in FIG. 6R may be similar to the subscriptions user interface described above with reference to FIG. 6A. Namely, the user interface includes the representation 602*a* of the collection of content services and/or applications and representations 602*b-f* of services to which the user of the electronic device is subscribed. As shown in FIG. 6R, the representations 602*e* and 602*f* of the services included in the collection of content services and/or applications include indications 612*e* and 612*f* of the dates on which the subscriptions renew. The dates on which the subscriptions renew can be different from each other because the subscriptions can be independent from each other because the user is subscribed to each service individually, rather than being subscribed to the collection of content services and/or applications.

FIG. 6S includes another example of the subscriptions user interface. In this example, the user is subscribed to services A and B, which may not be included in a collection of content services and/or applications, and to a collection of content services and/or applications (e.g., "Bundle") that includes access to services G, T, M, and S. Instead of displaying representations of each of services G, T, M and S, the electronic device 500 can display a representation 602*g* of the subscription to the collection of content services and/or applications. The representation 602*g* of the subscription to the collection of content services and/or applications can include an indication 612*g* of the date on which the subscription will be renewed and a charge will be applied. Because services G, T, M, and S can all be included in the collection of content services and/or applications, the subscriptions to all of these services can renew on the same day. FIG. 6S also includes a section of the subscriptions user interface including an expired subscription, for example. For example, the user previously had a subscription to service C, no longer subscribes to the service, and the last subscription period of the service has passed. As shown in FIG. 6S, the representation 602*d* of the expired subscription can include an indication 612*d* of the date on which the subscription expired.

In some embodiments, the electronic device 500 is able to subscribe to a cloud storage service through a separate cloud storage service subscription and/or as part of a collection of content services and/or applications. In some embodiments, it is possible for one user to be subscribed to a storage subscription through a collection of content services and/or applications and a separate subscription to the storage service at the same time. In some embodiments, in accordance with a determination that there is less than a threshold amount of unused space left in the user's cloud storage plan, the electronic device 500 can present an indication to the user that they are using almost all of their cloud storage.

FIG. 6T illustrates an example of the electronic device 500 presenting a notification 658 that the cloud storage to which the user is subscribed is almost used up. In this example, the user is subscribed to services A and B and a collection of content services and/or applications including (G, T, M, and S). Thus, the user can be subscribed to a storage plan as part of their subscription to the collection of content services and/or applications.

As shown in FIG. 6T, for example, the notification 658 includes a selectable option 660*a* that, when selected, causes the electronic device 500 to initiate a process to subscribe to an additional storage plan that is separate from the cloud storage included in the collection of content services and/or applications. In some embodiments, in response to detecting selection of option 660*a*, the electronic device 500 presents a user interface including information about available storage plans and at least one option that, when selected, causes the electronic device 500 to initiate a process to subscribe to a storage plan that is separate from the storage included in the user's subscription to the content service collection. The notification 658 can also include an option 660*b* to cease display of the notification without adding a subscription to a cloud storage service.

FIG. 6U illustrates another example of a notification 658 that a predetermined amount of storage included in a user's storage subscription is in use. In this example, the user is subscribed to services A, B, and S. Thus, in this example, the user is subscribed to a storage subscription that is not part of a collection of content services and/or applications and is not subscribed to a collection of content services and/or applications.

The notification 658 displayed in the user interface illustrated in FIG. 6U indicates that the storage is almost full and that the user is able to add more storage either by upgrading their storage plan (e.g., changing the tier of their storage subscription to a tier that includes more storage) or by subscribing to a collection of content services and/or applications including a storage service. In some embodiments, the notification 658 includes an option 660*a* that, when selected, causes the electronic device 500 to display a user interface including an option to change the tier of the storage subscription and an option to subscribe to a content service collection. For example, in response to detecting selection, the electronic device 500 can display a user interface similar to the subscription management user interface described above with reference to FIG. 6D. The notification 658 can also include an option 660b to cease display of the notification without modifying the storage subscription or adding a subscription to the content service collection.

In some embodiments, an electronic device 500 is able to access a subscription to one or more content services either via the provider of the content service or through a wireless plan carrier. For example, the wireless plan carrier may offer a subscription to the content service as part of the terms of the wireless service plan associated with the electronic device 500. In some embodiments, one user account may therefore be associated with more than one subscription to a respective content service, such as by having a subscription to the service through the provider of the content service and a subscription to the same service through a wireless plan carrier. In some embodiments, the electronic device 500 presents an indication that the user account is associated with multiple subscriptions to the same service and facilitates cancelation of one or more of the subscriptions.

FIG. 6V illustrates an exemplary user interface 672 associated with a music streaming subscription service. In some embodiments, the user interface illustrated in FIG. 6V is displayed in response to detecting selection of a "Browse" option included in the navigation bar 671 of the user interface 672 of the music streaming service application on device 500. As shown in FIG. 6V, while the electronic device 500 displays the user interface 672 of the music streaming service, the electronic device 500 is associated with a subscription to the music streaming service through the provider of the music streaming service (e.g., service M(P)) and a subscription to the music streaming service through the wireless plan carrier (e.g., service M(C)). In response to detecting that the electronic device 500 is associated with two subscriptions to the music streaming service, the electronic device 500 optionally displays an indication 670 of the duplicate subscriptions. As shown in FIG. 6V, the electronic device 500 detects selection (e.g., with contact 603v) of the indication 670. In response to the input illustrated in FIG. 6V, the electronic device 500 can display a user interface including more details about the subscriptions and options to cancel one or more of the subscriptions, such has the user interface illustrated in FIG. 6W.

FIG. 6W illustrates an exemplary user interface associated with more than one user account for accessing the same music streaming service. In some embodiments, the user interface illustrated in FIG. 6W is displayed in response to the user input illustrated in FIG. 6V. The user interface illustrated in FIG. 6W can include an indication 674 that the electronic device 500 is associated with multiple subscriptions to the music streaming service, indications 676a-b of each subscription, details 678a-b of each subscription, and selectable options 680a-b that, when selected, cause the electronic device 500 to initiate a process to cancel the subscription associated with the selected option. As shown in FIG. 6W, the user selects (e.g., with contact 603w) the option 680b to cancel the subscription to the music streaming service associated with the wireless plan carrier. In response to the user's selection, the electronic device 500 can initiate a process to cancel the subscription.

FIG. 6X illustrates an exemplary user interface including a user interface element 682 requesting confirmation to cancel a subscription. In some embodiments, the user interface illustrated in FIG. 6X is displayed in response to the input illustrated in FIG. 6W corresponding to a request to cancel a subscription to a music streaming service provided through a wireless plan carrier of the electronic device. The user interface illustrated in FIG. 6W includes a user interface element 682 requesting confirmation to cancel the subscription to the music streaming service associated with the wireless plan carrier. In some embodiments, the user interface element 682 includes a selectable option 684a that, when selected, causes the electronic device 500 to cancel the subscription and a selectable option 684b that, when selected, causes the electronic device 500 to cease display of the user interface element 682 without canceling the subscription.

In some embodiments, if the electronic device 500 instead detected selection of option 680a in the user interface illustrated in FIG. 6W, the electronic device 500 would, in response to the input, display a user interface element confirming the user's request to cancel the subscription associated with the subscription service provider. In some embodiments, the user interface element requesting confirmation to cancel the subscription associated with the content service provider is similar to the user interface element 682 illustrated in FIG. 6X.

Returning to FIG. 6X, the electronic device 500 detects selection (e.g., via contact 603x) of the option 684a to cancel the subscription. In response to the input, the electronic device 500 optionally initiates a process to cancel the subscription (e.g., including transmitting, to the wireless plan carrier, an indication to cancel the subscription) and displays a confirmation message, such as in the user interface illustrated in FIG. 6Y.

FIG. 6Y illustrates an exemplary user interface that confirms that the request to cancel the subscription to the music streaming service through the wireless plan carrier has been received. In some embodiments, the user interface illustrated in FIG. 6Y is displayed in response to the user input illustrated in FIG. 6X. In FIG. 6Y, the electronic device 500 can display a message 686 confirming that the request to cancel the subscription has been sent to the carrier and a selectable option 688 that, when selected, causes the electronic device 500 to return to the user interface illustrated in FIG. 6V. In some embodiments, when displaying the user interface illustrated in FIG. 6V in response to detecting selection of option 688, the user interface illustrated in FIG. 6V is displayed without indication 670 because the electronic device 500 is no longer subscribed to duplicate subscriptions to the music streaming service.

In some embodiments, in response to receiving confirmation of a request to cancel a subscription to the content service through the provider of the content service, the electronic device 500 displays a message that the service has been canceled (instead of a message 686 that the request to cancel the service has been sent to the wireless plan provider).

FIG. 7 is a flow diagram illustrating a method of subscribing to a collection of content services and/or applications in accordance with some embodiments of the disclosure. The method 700 is optionally performed at an electronic device such as device 100, device 300, device 500 as described above with reference to FIGS. 1A-1B, 2-3, 4A-4B and 5A-5H. Some operations in method 700 are, optionally combined and/or order of some operations is, optionally, changed.

As described below, the method 700 provides ways in which an electronic device facilitates subscribing to collections of content services and/or applications. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed at an electronic device in communication with a display generation component and one or more input devices (e.g., a mobile device (e.g., a tablet, a smartphone, a media player), a computer (e.g., a desktop computer, a laptop computer), or a wearable device (e.g., a watch, a head-mounted device), or a set-top box in communication with a display generation component (e.g., a television screen) and one or more input devices (e.g., a remote control)). In some embodiments, the display generation component is a display integrated with the electronic device (optionally a touch screen display) and/or an external display such as a monitor, projector, television, etc.

In some embodiments, such as in FIG. 6A, in response to a trigger initiated by an application or service (e.g., a service for streaming video content, a service for streaming audio content, a service for viewing articles, a service for downloading and interacting with applications, a cloud storage service, etc.) in use on the electronic device, the electronic device 500 determines (702) that one or more first criteria are satisfied. In some embodiments, the electronic device displays a user interface associated with the content service while the content service is in use. For example, the electronic device displays a user interface of an application (e.g., music application) that provides the content (e.g., music) of the content service (e.g., music subscription service). In some embodiments, the one or more first criteria are satisfied when the user has not yet seen (e.g., the device has not yet displayed or presented) a visual indication of a subscription bundle that includes a subscription to the content service, and has interacted with the content service a predetermined number of times, for a predetermined period of time, and/or has been subscribed to the content service for a predetermined period of time. In some embodiments, the one or more criteria are satisfied in response to detecting a request to subscribe to the content service while the user is already subscribed to one or more other content services included in a subscription bundle including the respective content service.

In some embodiments, such as in FIG. 6J, in response to determining that the one or more first criteria are satisfied, the electronic device 500 displays (704), via the display generation component, a content service collection user interface that includes a first representation 614a of a first content service collection and a first selectable option 642 that is selectable to initiate a process to subscribe to the first content service collection. In some embodiments, the content service collection is a bundle of a plurality of subscription services that enable the user to access content associated with each subscription. The first representation of the first content service collection optionally includes information about the content service collection (e.g., the services included in the collection, the subscription price, the renewal terms, etc.). In some embodiments, the content service collection user interface further includes a representation of a subscription to a respective one of the content services included in the content service collection, wherein the subscription only enables access to the respective one of the content services without enabling access to the other content services included in the content service collection. In some embodiments, the representation of the content service and the first representation of the first content service collection are each selectable. In response to detecting selection of the first selectable option, the electronic device optionally initiates a process to subscribe the user to the subscription corresponding to the selected representation, including scheduling reoccurring subscription payments and granting the user access to the content of each content service included in the content service collection. For example, in response to detecting selection of the first option while the first representation of the first content service collection is selected, the electronic device initiates a process to subscribe the user to the first content service collection. As another example, in response to detecting selection of the first option while the representation of the respective content service is selected, the electronic device initiates a process to subscribe to the respective content service without initiating a process to subscribe to the other content services included in the first content service collection.

In some embodiments, such as in FIG. 6J, the first content service collection includes at least a first content service and a second content service and the first representation 614a of the first content service collection includes at least a first representation 650a of the first content service and a second representation 650b of the second content service (706). In some embodiments, the first representation of the first content service collection includes representations of every service included in the content service collection. In some embodiments, the first representation of the first content service includes an image associated with the first content service (e.g., an application icon, a logo, etc.), the name of the first content service or application associated with the first content service, and/or a description of the first content service. In some embodiments, the second representation of the second content service includes an image associated with the second content service (e.g., an application icon, a logo, etc.), the name of the content service or application associated with the second content service, and/or a description of the second content service.

In some embodiments, such as in FIG. 6J, an order for displaying the first and second representations 650a-b is determined based on the application or service that initiated the trigger at the electronic device (708). In some embodiments, in accordance with a determination that the trigger is associated with the first content service (e.g., the one or more first criteria are satisfied while presenting a user interface related to the first content service), the first representation of the first content service is emphasized relative to (e.g., displayed in a respective position that has a higher prominence in the content service collection interface than) the second representation of the second content service (e.g., in the first representation of the first content service collection). In some embodiments, the first representation of the content service collection is an ordered list or hierarchy of representations of services included in the content service collection and the first representation is first in the order of representations of content services included in the content service collection. The first respective representation is optionally displayed in a primary position that is optionally at the topmost position of a vertical list or the leftmost position of a horizontal list for languages read left to right or the rightmost position of a horizontal list for languages read right to left. In some embodiments, one or more representations of other content services (e.g., including the second respective representation of the second content service) are displayed in a secondary position in the first representation of the first content service collection. The secondary position optionally is adjacent to the primary position, such as below the primary position or to the right of the primary position for languages read from left to right or the left of the primary position for languages read from right to left, for example. In some embodiments, in response to detecting that the one or more criteria are satisfied while the user is interacting with the first content service, the representation of the first content service is displayed with the highest priority in a list of services included in the content service collection in the first representation of the content service collection. In some embodiments, in accordance with a determination that the trigger is associated with the second service (e.g., the one or more first criteria are satisfied while displaying a user interface or content associated with the second service), the second representation of the second content service is emphasized relative to (e.g., displayed in the respective position in the content service collection interface) the first representation of the first content service (e.g., in the first representation of the first content service collection). In some embodiments, the first representation of the content service collection is an ordered list or hierarchy of representations of services included in the content service collection and the second respective representation is first in the order of representations of content services included in the content service collection. The second respective representation is optionally displayed in a primary position that is optionally at in the topmost position of a vertical list or the leftmost position of a horizontal list for languages read left to right or the rightmost position of a horizontal list for languages read right to left. In some embodiments, one or more representations of other content services are displayed in a secondary position in the first representation of the first content service collection. The secondary position optionally is adjacent to the primary position, such as below the primary position or to the right of the primary position for languages read from left to right or the left of the primary position for languages read from right to left, for example In some embodiments, in response to detecting that the one or more criteria are satisfied while the user is interacting with the second content service, the representation of the second content service (rather than the representation of the first content service) is displayed with the highest priority in a list of services included in the content service collection in the first representation of the content service collection.

The above-described manner of displaying the representations of the content services in an order based on the application or service that initiated the trigger provides an efficient way of indicating that the respective service is included in the first content service collection, which simplifies the interaction between the user and the electronic device and enhances the operability of the electronic device and makes the user-device interface more efficient (e.g., by reducing the time it takes the user to review the first representation of the first content service collection), which additionally reduces power usage and improves battery life of the electronic device by enabling the user to use the electronic device more quickly and efficiently.

In some embodiments, such as in FIG. 6I, the trigger corresponds to a request to subscribe to a respective content service (e.g., from within the content service) currently in use on the electronic device 500. In some embodiments, the respective content service is included in the collection of content services and/or applications. In some embodiments, the electronic device displays, via the display generation component, the content service collection user interface, wherein the content service collection user interface includes a respective representation of a respective content service collection and a respective selectable option that is selectable to initiate a process to subscribe to the respective content service collection, wherein the respective content service collection includes the respective content service. In some embodiments, the content service collection user interface face further includes a respective representation of the respective content service. In some embodiments, the respective representation of the content service collection and the respective representation of the respective content service each include checkboxes and the electronic device is able to select one checkbox at a time. In some embodiments, in response to detecting selection of the selectable option, the electronic device initiates a process to subscribe to the service corresponding to the checked checkbox. For example, in accordance with a determination that the checkbox included in the representation of the collection of content services and/or applications is selected while selection of the selectable option is detected, the electronic device initiates a process to subscribe to the collection of content services and/or applications. As another example, in accordance with a determination that the checkbox of the respective representation of the respective service is selected while the selection of the selectable option is detected, the electronic device initiates a process to subscribe to the respective service without subscribing to the other services included in the content service collection.

The above-described manner of displaying the content service collection user interface in response to receiving the request to subscribe to the respective content service provides an efficient way of subscribing to the content service collection when the user has indicated interest in subscribing to the respective content service, which simplifies the interaction between the user and the electronic device and enhances the operability of the electronic device and makes the user-device interface more efficient (e.g., by reducing the number of inputs needed to subscribe to the collection of content services and/or applications that includes the respective content service), which additionally reduces power usage and improves battery life of the electronic device by enabling the user to use the electronic device more quickly and efficiently.

In some embodiments, such as in FIGS. 6I-6J, the determination of the order for displaying the first 650a and second 650b representations includes, in accordance with a determination that the application or service that initiated the trigger is associated with the first content service, the first representation 650a of the first content service is emphasized relative to the second representation 650b of the second content service. In some embodiments, the first representation of the first content service is displayed first in the list of representations of content services included in the content service collection. In some embodiments, such as in FIG. 6O-6P, in accordance with a determination that the application or service that initiated the trigger is the second content service, the second representation 650b of the second content service is emphasized relative to the first representation 650a of the first content service. In some embodiments, the second representation of the second service is displayed first in a list of representations of services included in the content service collection. In some embodiments, emphasizing the representation of the respective content service includes displaying the representation of the respective content service first in a hierarchical/ordered list. In some embodiments, the other representations in the list that are not emphasized/displayed first are presented in a default order relative to one another. For example, if the input to subscribe to a music streaming service included in a collection of content services and/or applications is received while displaying a user interface associated with the music streaming service, the representation of the music streaming service is displayed first in an ordered list of content services included in the content service collection included in the respective representation of the content service collection. As another example, if the input to subscribe to a games service included in a collection of content services and/or applications is received while displaying a user interface associated with the games service, the representation of the games service is displayed first in an ordered list of content services included in the content service collection included in the respective representation of the content service collection. The above-described manner of emphasizing the representation of the content service associated with the trigger to display the content service collection user interface provides an efficient way of indicating to the user that the respective service is included in the content service collection, which simplifies the interaction between the user and the electronic device and enhances the operability of the electronic device and makes the user-device interface more efficient (e.g., by reducing the time it takes the user to determine that the respective service is included in the content service collection), which additionally reduces power usage and improves battery life of the electronic device by enabling the user to use the electronic device more quickly and efficiently.

In some embodiments, such as in FIGS. 6A-6B, the trigger corresponds to a request to subscribe to a respective content service that is not currently in use on the electronic device (e.g., outside of the respective content service), and wherein the determination of the order for displaying the first and second representations 622a includes using a predefined order. In some embodiments, the request to subscribe to the respective content service is a request to initiate a process to subscribe to the content service collection that includes the respective content service. In some embodiments, the respective representation of the content service collection is displayed in response to an input received while displaying a user interface not associated with a particular content service included in the content service collection. For example, a settings user interface includes a second representation of the content service collection, that when selected, causes the electronic device to display a user interface for subscribing to the content service collection, the user interface including the respective representation of the content service collection. In some embodiments, while displaying the user interface not associated with a particular one of the content services included in the content service collection, the respective representations of the content services included in the content service collection are displayed in a default order. As an example, if the respective content service is not first in the default order, the respective representation of the content service collection will include a representation of a different content service first in the order of representations of content services included in the collection. The above-described manner of presenting the first and second representations in the predefined order provides an efficient way of presenting the representations of the content services included in the bundle when no particular user input indicating a content service has been received, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIGS. 6E-6F, in accordance with a determination that the electronic device 500 is not associated with any subscriptions to any content services, determining that one or more of the first criteria are not satisfied and forgoing displaying the content service collection user interface. In some embodiments, the electronic device forgoes displaying the representation of the content service collection in response to the user input corresponding to a request to subscribe to the respective content service if the user is not already subscribed to one of the content services included in the collection of content services and/or applications. In some embodiments, in accordance with a determination that the user is already subscribed to at least one content service included in the content service collection when the input corresponding to a request to subscribe to the respective content service is received, the electronic device displays the representation of the collection of content services and/or applications. The above-described manner of forgoing display of the representation of the collection of content services and/or applications while the user is not subscribed to any other services included in the content service collection provides an efficient way of subscribing to the respective content service, which simplifies the interaction between the user and the electronic device and enhances the operability of the electronic device and makes the user-device interface more efficient (e.g., by reducing the time it takes the user to complete an interaction with the electronic device when the user is unlikely to want to subscribe to the collection of content services and/or applications because they are not subscribed to any content services included in the collection yet), which additionally reduces power usage and improves battery life of the electronic device by enabling the user to use the electronic device more quickly and efficiently.

In some embodiments, such as in FIGS. 6I-6J, the one or more first criteria include a criterion that is satisfied when the electronic device 500 is associated with subscriptions to a first number (e.g., 1 or 2 or 3, etc.) of content services and is not satisfied when the electronic device 500 is associated with subscriptions to a second number of content services, different from the first number. In some embodiments, the electronic device displays the representation of the collection of content services and/or applications while the electronic device is already subscribed to the first number of content services and forgoes displaying the representation of the collection of content services and/or applications in response to receiving the request to subscribe to the respective content service while the user is subscribed to fewer than the first number of services. The above-described manner of forgoing display of the representation of the collection of content services and/or applications while the user is subscribed to fewer than the first number of other services included in the content service collection provides an efficient way of continuing an interaction with the electronic device in situations in which the user is unlikely to wish to subscribe to the content service collection, which simplifies the interaction between the user and the electronic device and enhances the operability of the electronic device and makes the user-device interface more efficient (e.g., by reducing the time it takes the user to interact with the electronic device), which additionally reduces power usage and improves battery life of the electronic device by enabling the user to use the electronic device more quickly and efficiently.

In some embodiments, such as in FIG. 6P, in accordance with a determination that a value (e.g., subscription price) of the first content service collection is less than a combined value (e.g., subscription prices) of the application or service that initiated the trigger and one or more other content services with which the electronic device is already associated, the content service collection user interface includes a visual indication that the first content service collection is more cost effective (e.g., preferred/recommended) than maintaining individual subscriptions to the application or service that initiated the trigger and the one or more content services with which the electronic device is already associated. In some embodiments, the one or more other content services with which the electronic device is associated are also included in the content service collection. Thus, in some situations, it is less expensive to subscribe to the collection of content services and/or applications than pay for the services with which the electronic device is already associated and the respective content service separately because subscribing to the content service collection will replace the individual subscriptions to the services with which the electronic device is already associated and the respective content service, for example. In some embodiments, the electronic device is also associated with one or more other services not included in the content service collection and the determination whether or not to display the visual indication is irrespective of the status and price of these subscriptions.

In some embodiments, such as in FIG. 6J, in accordance with a determination that the value (e.g., subscription price) of the first content service collection is greater than or equal to the combined value (e.g., subscription prices) of the application or service that initiated the trigger and one or more other content services with which the electronic device is already associated, the content service collection user interface does not include the visual indication. In some embodiments, the content service collection user interface includes an indication of the total cost of subscribing to the one or more other content services and the respective content service without subscribing to the content service collection and an indication of the cost to subscribe to the content service collection, but does not include an indication that it would be less expensive to subscribe to the content service collection because it would not be less expensive to subscribe to the content service collection. In some embodiments, if it is more expensive to subscribe to the collection of content services and/or applications than it is to subscribe to the respective content service, the electronic device forgoes displaying the content service collection user interface in response to the request to subscribe to the respective content service. The above-described manner of presenting the visual indication that the respective content service collection is cheaper than maintaining individual subscriptions provides an efficient way of comparing the cost of content service collection to the cost of the individual subscriptions, which simplifies the interaction between the user and the electronic device and enhances the operability of the electronic device and makes the user-device interface more efficient (e.g., by reducing the time it takes the user to decide whether to subscribe to the content service collection or to the services separately, and reducing likelihood of erroneous subscription input that the user would then need to provide additional input to correct), which additionally reduces power usage and improves battery life of the electronic device by enabling the user to use the electronic device more quickly and efficiently.

In some embodiments, such as in FIG. 6J, in accordance with a determination that the electronic device 500 is associated with subscriptions to a first set of one or more content services, the content service collection user interface includes the first representation 614a of the first content service collection and the first selectable option 642 that is selectable to initiate the process to subscribe to the first content service collection. In some embodiments, the first set of one or more content services are included in the first content service collection. The electronic device optionally displays a representation of a content service collection that includes the services to which the user is already subscribed and a selectable option to initiate the process to subscribe to the content service collection and forgoes displaying a representation of a content service collection that does not include a respective content service to which the user is subscribed and the selectable option to subscribe to that content service collection if there are available content service collections that include the respective content service. In some embodiments, the electronic device 500 forgoes displaying representations of the content service collections other than the first content service collection. In some embodiments, such as in FIG. 6K, in accordance with a determination that the electronic device 500 is associated with subscriptions to a second set of one or more content services, different from the first set, the content service collection user interface includes a second representation 614c of a second content service collection, different from the first content service collection, and a second selectable option 642 that is selectable to initiate a process to subscribe to the second content service collection. In some embodiments, the second set of one or more content services are included in the second content service collection. The electronic device optionally displays a representation of a content service collection that includes the services to which the user is already subscribed and a selectable option to initiate the process to subscribe to the content service collection and forgoes displaying a representation of a content service collection that does not include a respective content service to which the user is subscribed and the selectable option to subscribe to that content service collection if there are available content service collections that include the respective content service. In some embodiments, the electronic device forgoes displaying representations of the content service collections other than the second content service collection. The above-described manner of displaying the representation and the selectable option associated with the content service collection including the content services to which the user is subscribed provides an efficient way of presenting a representation and option that are relevant to the user, which simplifies the interaction between the user and the electronic device and enhances the operability of the electronic device and makes the user-device interface more efficient (e.g., by reducing the time it takes the user to find the representation and option relevant to the services to which the user is already subscribed), which additionally reduces power usage and improves battery life of the electronic device by enabling the user to use the electronic device more quickly and efficiently.

In some embodiments, such as in FIG. 6J, the content service collection user interface does not include a second representation of a second content service collection and does not include a second selectable option that is selectable to initiate a process to subscribe to the second content service collection, different from the first content service collection, and the content service collection user interface includes a respective selectable option. In some embodiments, the second content service collection includes a different plurality of content services, including the respective content service. In some embodiments, the second content service collection does not include the respective content service. In some embodiments, the second selectable option is an option that, when selected, causes the electronic device to display a user interface including representations of the first content service collection and the second content service collection. In some embodiments, the user interface including the representations of the first and second content service collections further includes selectable options for subscribing to the first and second content service collections. The electronic device optionally receives, such as in FIG. 6L, via the one or more input devices, an input selecting the respective selectable option 652. In some embodiments, such as in FIG. 6M, in response to receiving the input selecting the respective selectable option, displaying, via the display generation component, a second content service collection user interface that includes the second representation 614a of the second content service collection and the second selectable option 628 that is selectable to initiate the process to subscribe to the second content service collection. In some embodiments, the second content service collection user interface includes a second representation of the first content service collection different from the first representation of the first content service collection. The second content service collection user interface optionally includes representations of all of the content service collections that include access to the respective content service. In some embodiments, each representation of a respective content service collection includes representations of the content services included in the respective collection, with a representation of the respective content service being displayed first in the list of representations of content services included in the content service collection. In some embodiments, the second content service collection user interface further includes a representation of a subscription to the respective content service that does not include access to any other content services. In some embodiments, each representation of a respective content service collection and the representation of the respective content service includes a checkbox and one representation can be selected at a time. In some embodiments, the user interface further includes a selectable option that, when selected, causes the electronic device to initiate a process to subscribe to the content service collection (or the subscription to the respective content service only) corresponding to the selected representation. In some embodiments, each representation of a respective collection of content services and/or applications includes a representation of the respective content service that is emphasized relative to the representations of the other services included in the respective content service collection. In some embodiments, the second content service collection user interface does not include a representation of the first content service collection. The above-described manner of displaying the second representation of the second content service provides an efficient way of presenting representations of an alternate collection of content services and/or applications that includes the respective content service, which simplifies the interaction between the user and the electronic device and enhances the operability of the electronic device and makes the user-device interface more efficient (e.g., by reducing the time it takes the user to compare all of the options for subscribing to the respective content service), which additionally reduces power usage and improves battery life of the electronic device by enabling the user to use the electronic device more quickly and efficiently.

In some embodiments, such as in FIG. 6N, in accordance with a determination that the electronic device 500 is associated with subscriptions to a first set of one or more content services, the second representation 614a of the second content service collection includes a visual indication 620 that the second content service collection is a recommended content service collection. In some embodiments, the second content service collection is recommended because it includes the first set of one or more content services to which the user is subscribed. For example, the electronic device indicates that a respective content service is recommended if it includes all of the content services to which the user is subscribed that are included in at least one content service collection. In some embodiments, if multiple content service collections include all of the content services to which the user is already subscribed that are included in any of the collections, the electronic device will select the recommended collection based on other criteria. For example, the electronic device may make the least expensive content collection service that includes all of the content services to which the user is subscribed that are included in at least one collection the recommended content service collection. As another example, in accordance with a determination that the user account of the electronic device is included in a family group of user accounts and has a family subscription to one or more services included in a content service collection, the electronic device optionally indicates that a content service collection subscription accessible to all user accounts in a family group is the recommended content service collection. In some embodiments, such as in FIG. 6M, in accordance with a determination that the electronic device 500 is associated with subscriptions to a second set of one or more content services, different from the first set, the second representation 614a of the second content service collection does not include the visual indication 620 that the second content service collection is the recommended content service collection. In some embodiments, the electronic device displays a representation of a respective other content service collection with an indication that the respective other content service collection is the recommended content service collection. In some embodiments, the electronic device indicates that the respective other collection of content services and/or applications is the recommended collection of content services and/or applications because the respective other collection of content services and/or applications includes access to the second set of one or more content services and the second collection of content services and/or applications does not include access to all of the services in the second set of one or more content services. The above-described manner of presenting a visual indication that the second collection of content services and/or applications is the recommended collection of content services and/or applications in accordance with a determination that the electronic device is associated with subscriptions to the first set of one or more content services provides an efficient way of subscribing to the collection of content services and/or applications to which the user is most likely to wish to subscribe, which simplifies the interaction between the user and the electronic device and enhances the operability of the electronic device and makes the user-device interface more efficient (e.g., by reducing the time it takes the user to subscribe to the recommended collection of content services and/or applications, and reducing likelihood of erroneous subscription input that the user would then need to provide additional input to correct), which additionally reduces power usage and improves battery life of the electronic device by enabling the user to use the electronic device more quickly and efficiently.

In some embodiments, such as in FIG. 6R, before subscribing to the first content service collection, the electronic device 500 is associated with a subscription to the first content service that has a first renewal date 612e (e.g., the renewal date is optionally the end of a period of time for which access to the first content service has been paid and payment for the next period of time will be due). In some embodiments, such as in FIG. 6S, after subscribing to the first content service collection that includes the first content service, the electronic device 500 is associated with a subscription to the first content service collection that has a second renewal date 612g, different from the first renewal date, and is no longer associated with the subscription to the first content service that has the first renewal date. In some embodiments, the electronic device will have access to the first content service through the subscription to the first collection of content services and/or applications and will be able to access the first content service without renewing a subscription, either to the first content service itself or the first collection of content services and/or applications until the second renewal date. In some embodiments, if the electronic device cancels the subscription to the first content service collection before the first renewal date, the renewal date of the subscription to the first content service will be reset to the first renewal date again. In some embodiments, the first content service continues to be associated with the first renewal date until the first renewal date passes, at which point the first content service is associated with the content service collection subscription and the second renewal date after the first renewal date passes. The above-described manner of no longer associating the electronic device with the subscription to the first content service with the first renewal date after subscribing to the first content service collection provides an efficient way of renewing all of the services included in the collection of content services and/or applications together, which simplifies the interaction between the user and the electronic device and enhances the operability of the electronic device and makes the user-device interface more efficient (e.g., by reducing the number of renewals the user has to review, and therefore reducing the number of user inputs required to renew/manage those subscriptions), which additionally reduces power usage and improves battery life of the electronic device by enabling the user to use the electronic device more quickly and efficiently.

In some embodiments, such as in FIG. 6P, the content service collection user interface further includes a respective representation 634c of the application or service that initiated the trigger, separate from the first representation 614a of the first content service collection, and a respective selectable option 642 that is selectable to initiate a process to subscribe to the application or service that initiated the trigger without subscribing to the first content service collection. In some embodiments, the representation of the application or service that initiated the trigger includes a checkbox and the content service collection user interface includes a selectable option that, when selected, causes the electronic device to initiate a process to subscribe to the subscription associated with the representation that is currently selected. In some embodiments, in response to detecting selection of the selectable option while the representation of the application or service that initiated the trigger is selected, the electronic device initiates the process to subscribe to the application or service that initiated the trigger without subscribing to first content service collection. In some embodiments, such as in FIG. 6Q, in accordance with a determination that the respective representation 634b of the application or service that initiated the trigger is currently selected (e.g., without receiving an input to reduce the representation of the application or service that initiated the trigger and/or without receiving an input to expand the representation of the content service collection), the respective representation 634b of the application or service that initiated the trigger is displayed with information 651e that indicates one or more other content services with which the electronic device is associated (e.g., subscribed) and information 651f that indicates a combined value of the application or service that initiated the trigger and the one or more other content services. In some embodiments, while the representation of the application or service that initiated the trigger is selected, the electronic device displays a list of the other content services to which the user is subscribed. In some embodiments, in response to detecting an input corresponding to selection of the representation of the first content service collection, the electronic device reduces the representation of the application or service that initiated the trigger, including ceasing to display the information that indicates the other content services to which the electronic device is subscribed and the combined cost of the application or service that initiated the trigger and the one or more other content services. In some embodiments, in response to detecting selection of the representation of the first collection of content services and/or applications, the electronic device displays an indication of the content services to which the electronic device is subscribed within the representation of the collection of content services and/or applications. The above-described manner of displaying the information that indicates the one or more other content services with which the electronic device is associated and information that indicates the combined cost of the application or service that initiated the trigger and the one or more other content services provides an efficient way of presenting the user with the information needed to choose between adding a subscription to the application or service that initiated the trigger and adding a subscription to the collection of content services and/or applications, which simplifies the interaction between the user and the electronic device and enhances the operability of the electronic device and makes the user-device interface more efficient (e.g., by reducing the inputs needed to view the information before making a selection, and reducing likelihood of erroneous subscription input that the user would then need to provide additional input to correct), which additionally reduces power usage and improves battery life of the electronic device by enabling the user to use the electronic device more quickly and efficiently.

In some embodiments, such as in FIG. 6T, a user of the electronic device 500 is subscribed to a respective storage service (e.g., a cloud data storage service). In some embodiments, such as in FIG. 6T, in accordance with a determination that remaining storage in the storage service is below a threshold storage, displaying, via the display generation component, a respective selectable option 660a. In some embodiments, the selectable option is displayed with or as part of a notification that the remaining storage is less than the threshold. In some embodiments, such as in FIG. 6T, in accordance with a determination that the electronic device 500 is associated with a subscription to the respective storage service as part of a subscription to a respective content service collection, the respective selectable option 660a is selectable to initiate a process to subscribe to a standalone storage service to increase the remaining storage in the respective storage service. In some embodiments, it is possible for the electronic device to be associated with (e.g., subscribed to) a standalone storage service and a collection of content services and/or applications that includes access to a storage service. Thus, in some embodiments, the total cloud storage available to the user of the electronic device is the combined total of the storage provided via the standalone storage service and the storage provided via the collection of content services and/or applications. In some embodiments, such as in FIG. 6U, in accordance with a determination that the electronic device 500 is associated with a subscription to the respective storage service as a standalone storage service, the respective selectable option 660a is selectable to initiate a process to subscribe to a respective content service collection that includes access to a respective amount of storage to increase the remaining storage in the respective storage service. In some embodiments, if the user is not yet subscribed to the collection of content services and/or applications that includes a storage plan, subscribing to the collection of content services and/or applications including the storage plan will increase the cloud storage capacity available to the user. In some embodiments, the electronic device displays a selectable option that, when selected, causes the electronic device to initiate a process to increase the storage capacity of the standalone storage service without subscribing to the collection of content services and/or applications. In some embodiments, the electronic device is able to be subscribed to no more than one content service collection and no more than one standalone storage service at one time. The above-described manner of displaying the respective selectable option provides an efficient way to increase the capacity of cloud storage available to the user of the electronic device, which simplifies the interaction between the user and the electronic device and enhances the operability of the electronic device and makes the user-device interface more efficient (e.g., by reducing the number of inputs needed to increase the capacity of the cloud storage), which additionally reduces power usage and improves battery life of the electronic device by enabling the user to use the electronic device more quickly and efficiently.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 900) are also applicable in an analogous manner to method 700 described above with respect to FIG. 7. For example, the ways of subscribing to content service collections described above with reference to method 700 optionally have one or more of the characteristics of the ways of unsubscribing from content service collections, etc., described herein with reference to other methods described herein (e.g., method 900). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIG. 7 are, optionally, implemented by components depicted in FIGS. 1A-1B. For example, displaying operation 704 is, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

User Interfaces for Unsubscribing from a Content Service Collection

Users interact with electronic devices in many different manners, including using an electronic device to access content through subscription services. In some circumstances, users may wish to unsubscribe from one or more content services to which they are subscribed. The embodiments described below provide ways in which an electronic device performs a process to unsubscribe from a collection of content services and/or applications. Providing efficient manners of unsubscribing from a collection of content services and/or applications enhances interactions with a device, thus reducing the power usage of the device, which increases battery life for battery-powered devices. It is understood that people use devices. When a person uses a device, that person is optionally referred to as a user of the device.

Figure 8B:
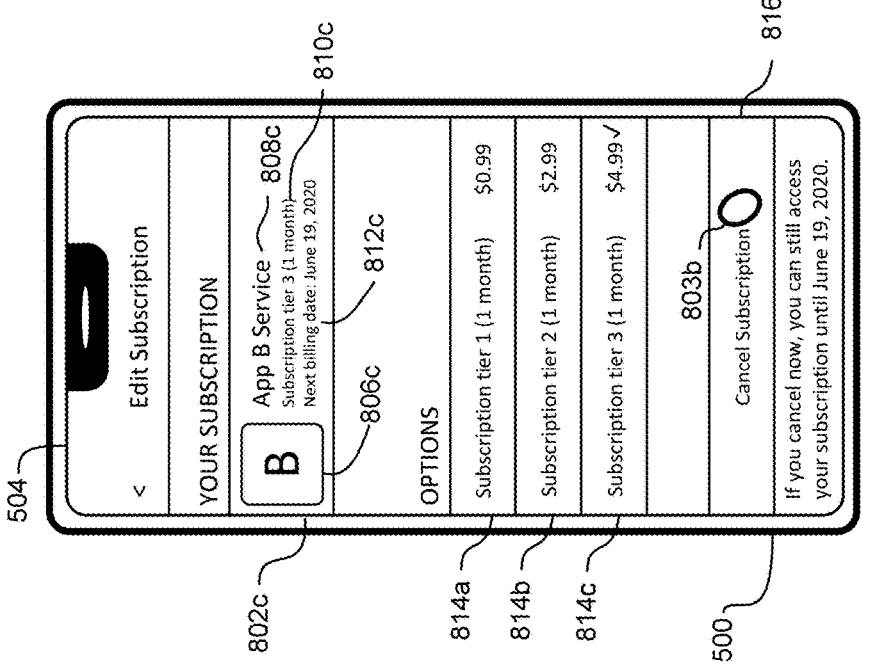
FIGS. 8A-8N illustrate exemplary ways in which the electronic device 500 facilitates unsubscribing from a collection of content services and/or applications according to some embodiments.
Figure 8A:
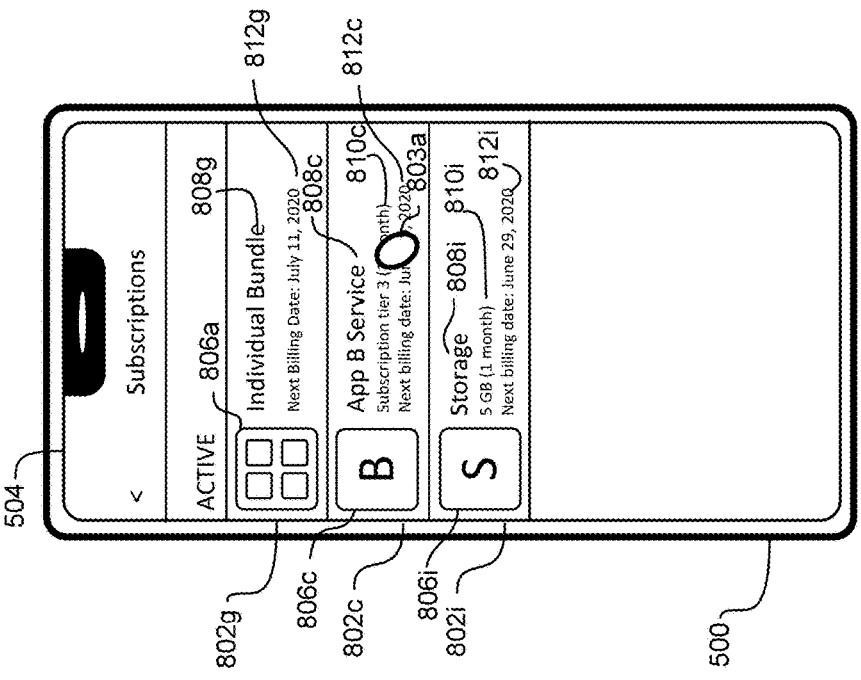
Figure 8D:
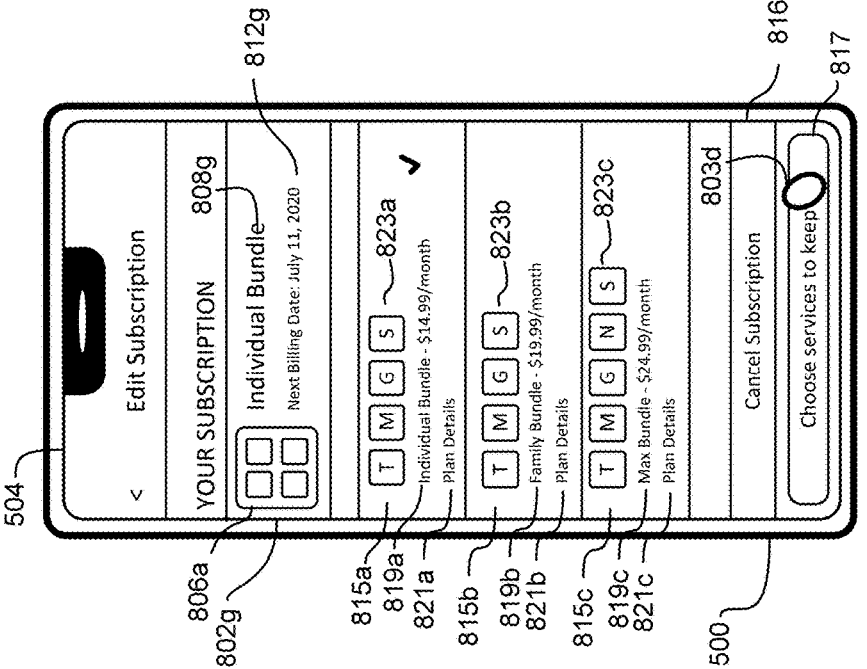
Figure 8C:
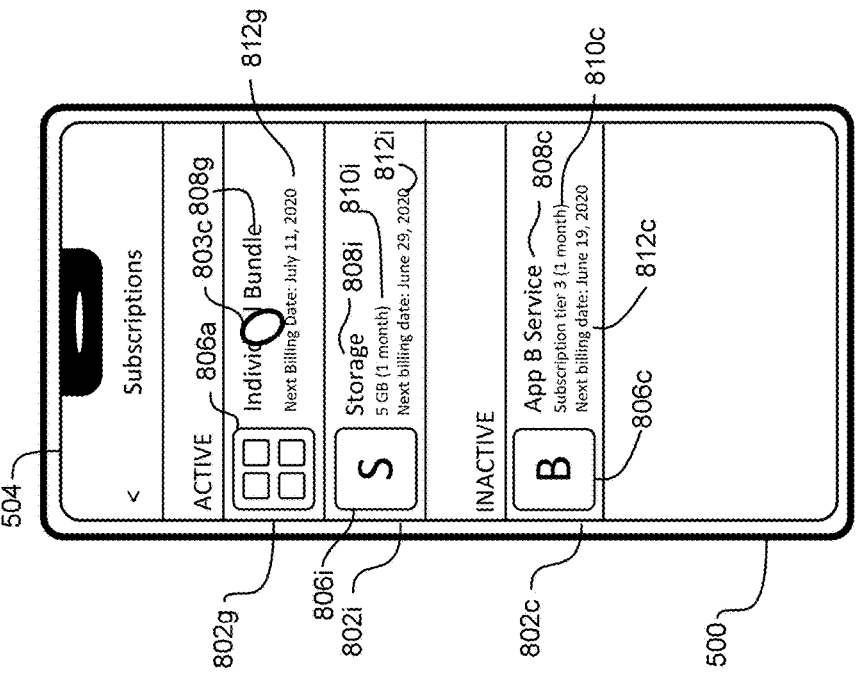
Figure 8F:
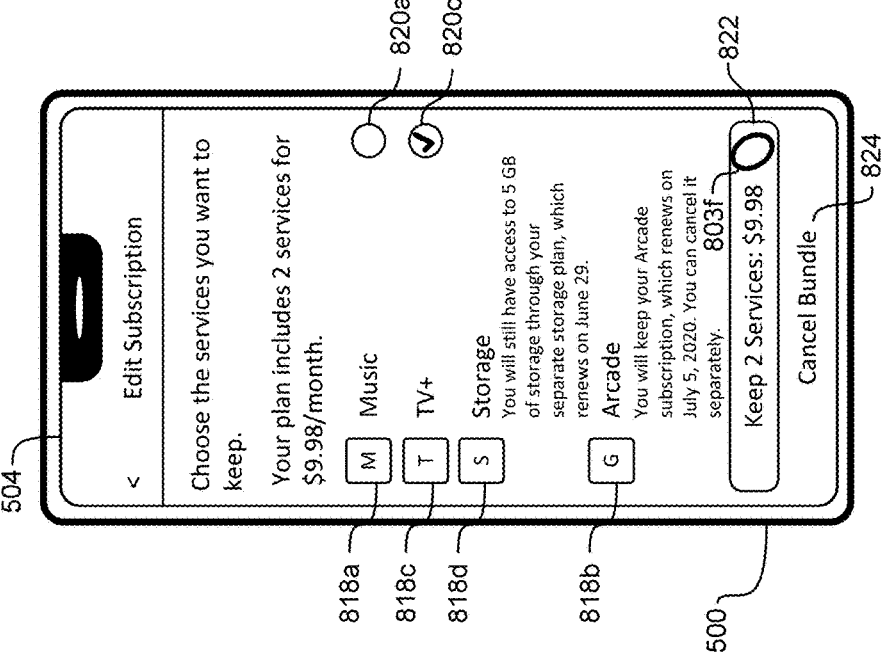
Figure 8E:
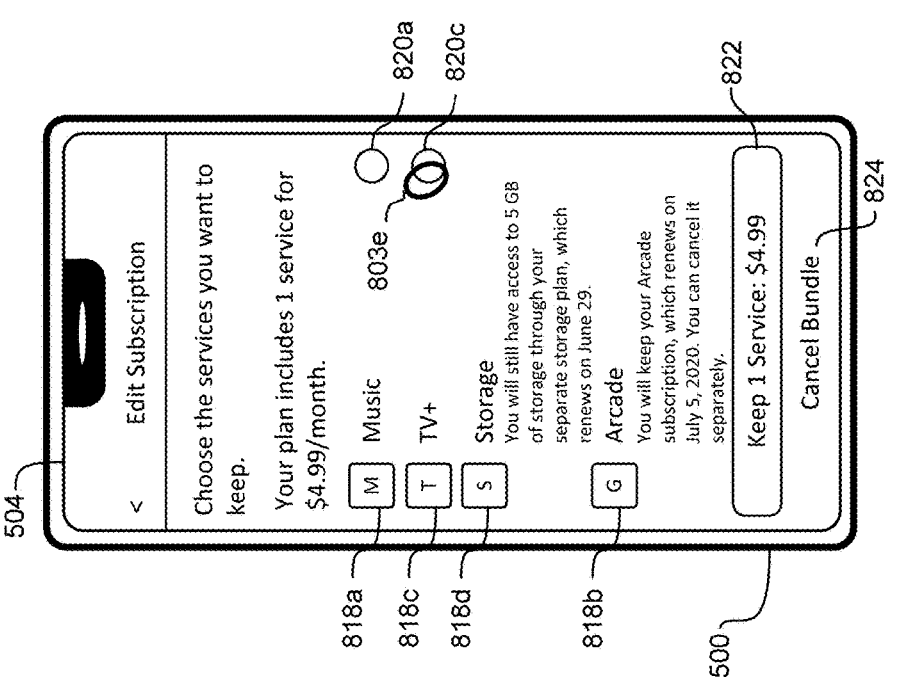
Figure 8H:
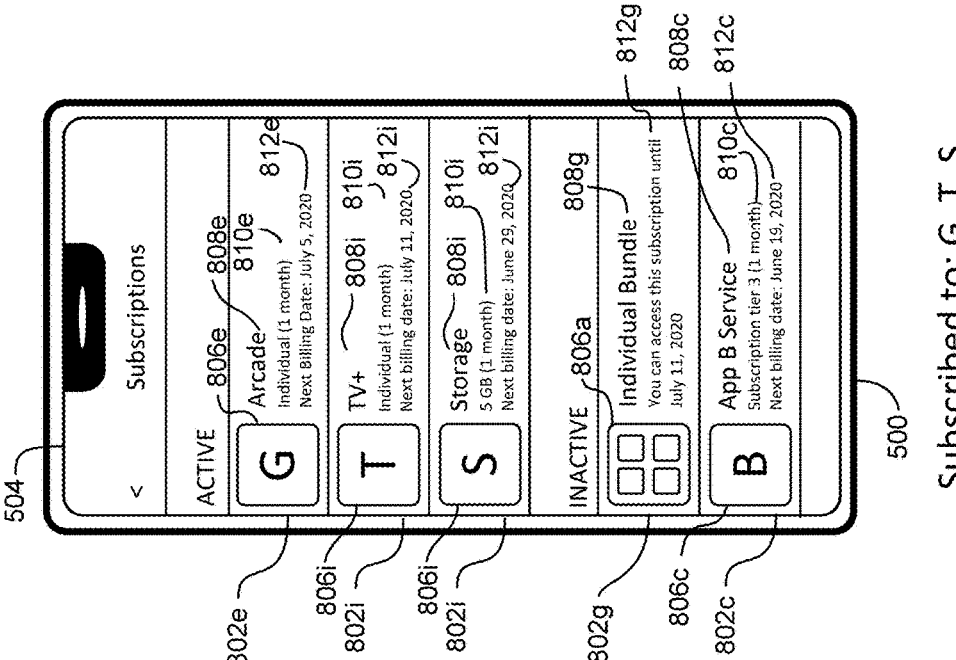
Figure 8G:
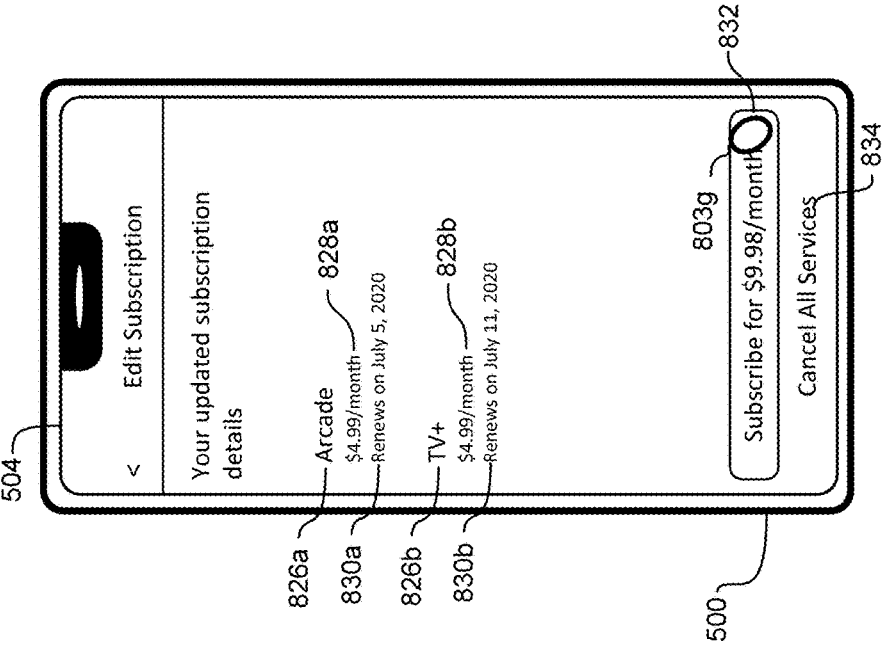
Figures 8I, 8J:
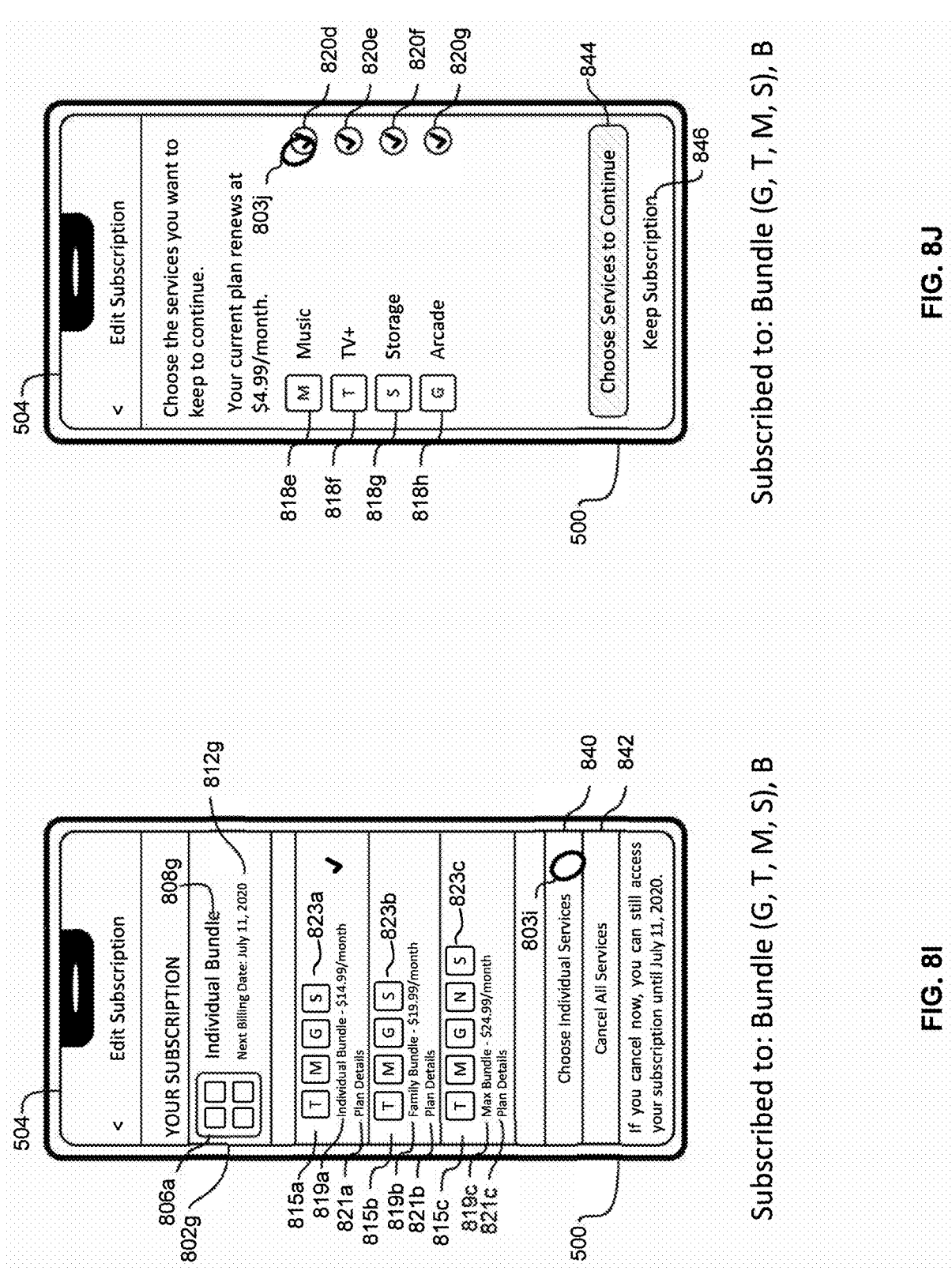
Figure 8L:
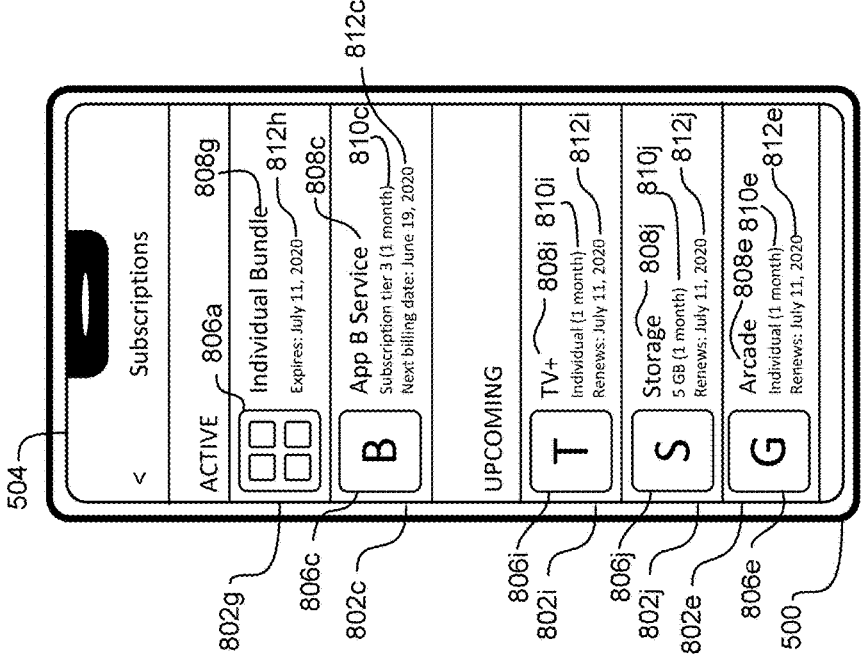
Figure 8K:
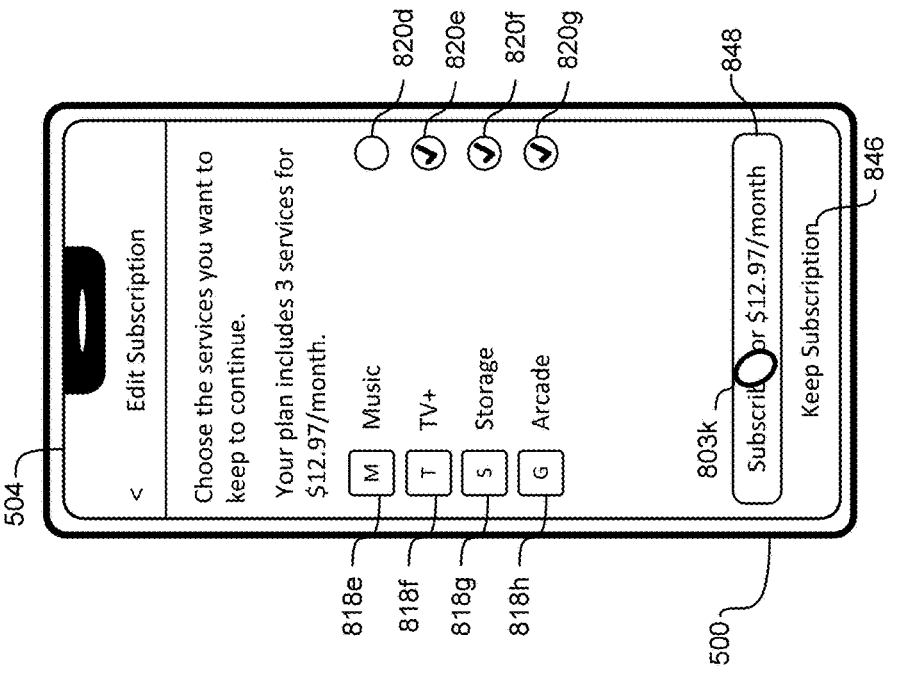
Figure 8N:
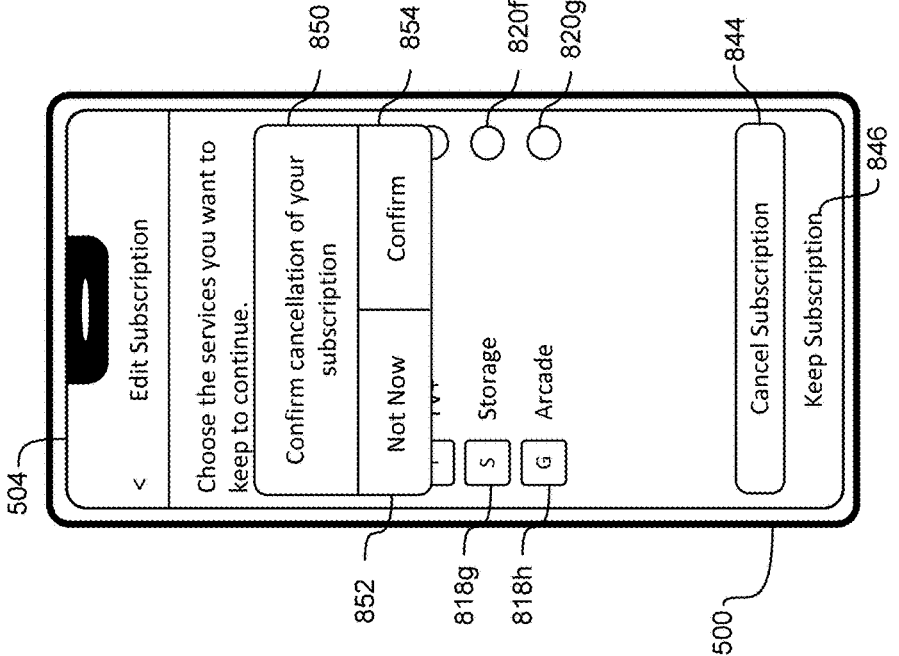

FIGS. 8A-8N illustrate exemplary ways in which the electronic device 500 facilitates unsubscribing from a collection of content services and/or applications according to some embodiments. The embodiments in these figures are used to illustrate the processes described below, including the processes described with reference to FIG. 9. Although FIGS. 8A-8N illustrate various examples of ways an electronic device is able to perform the processes described below with reference to FIG. 9, it should be understood that these examples are not meant to be limiting, and the electronic device is able to perform one or more processes described below with reference to FIG. 9 in ways not expressly described with reference to FIGS. 8A-8N.

FIG. 8A illustrates an exemplary subscription management user interface. In some embodiments, the electronic device 500 displays the user interface illustrated in FIG. 8A in response to detecting selection of an option to view the services to which the user is subscribed in a settings user interface of the electronic device 500. The user interface illustrated in FIG. 8A can include representations 802c, 802g, and 802i of the services to which the user is subscribed. As shown in FIG. 8A, in this example, the user is subscribed to services S and B and to a collection of content services and/or applications (e.g., "Bundle") including services G, T, M, and S.

In some embodiments, the representation 802g of the subscription to the collection of content services and/or applications can include an image 806a associated with the collection of content services and/or applications, an indication 808g of the name of the collection of content services and/or applications, and an indication 812g of the renewal date of the collection. In some embodiments, the representations 802c and 802i of the other services can include similar elements as the indication 802g of the subscription to the collection of content services and/or applications and can further include indications 810c and 810i of the tiers of the services and the renewal period of the subscriptions to which the user is subscribed. In some embodiments, the electronic device 500 previously subscribed to the collection of content services and/or applications according to one or more steps of method 700 described above with reference to FIGS. 6A-7.

Although not shown in FIG. 8A, in some embodiments, the subscription management user interface can further include indications of subscriptions to which the user used to be subscribed but is no longer subscribed, including expired subscriptions (e.g., subscriptions to which the user no longer has access because the subscription period has ended without paying for renewal) and inactive subscriptions (e.g., subscriptions that will not renew at the end of the subscription period to which the user still has access until the end of the subscription period is reached). In some embodiments, as will be discussed in more detail below with reference to FIG. 8L, the subscription management user interface can further include indications of upcoming subscriptions that are not currently active but will renew in the future. For example, the electronic device can display an indication of an upcoming subscription to a service that the user is currently able to access via a subscription bundle if the bundle has been cancelled (e.g., will not renew). In this example, the upcoming subscription to the service can renew on the date that the subscription to the bundle expires.

As shown in FIG. 8A, the user may select (e.g., with contact 803a) the representation 802c of the subscription to service B. In some embodiments, in response to the user's selection, the electronic device 500 displays a user interface for managing the subscription to service B, such as the user interface illustrated in FIG. 8B.

FIG. 8B illustrates an exemplary user interface for managing a subscription to a respective service. In some embodiments, the user interface illustrated in FIG. 8B can be displayed in response to detecting the user input illustrated in FIG. 8A. The user interface illustrated in FIG. 8B can be a user interface for editing the subscription to service B, for example.

In some examples, the user interface illustrated in FIG. 8B can include the representation 802c of the subscription to service B described above with reference to FIG. 8A. The user interface can further include a plurality of selectable options 814a-c associated with different tiers of the service, with the option 814c associated with the tier of the user's subscription including a check mark to indicate that it is the tier to which the user is subscribed. In some embodiments, in response to detecting selection of either of options 814a or 814b, the electronic device 500 can initiate a process to change the tier of the user's subscription from the current tier to the selected tier. In some embodiments, the user interface further includes an option 816 that, when selected, causes the electronic device 500 to initiate a process to unsubscribe from service B.

As shown in FIG. 8B, the user may select (e.g., with contact 803b) the option 816 to unsubscribe from service B. In some embodiments, in response to the selection, the electronic device 500 initiates a process to unsubscribe from the service, including displaying a user interface requesting confirmation that the subscription should be terminated.

In some embodiments, once the subscription to service B is canceled, the electronic device 500 updates the subscription management user interface as shown in FIG. 8C. For example, in FIG. 8C, the electronic device 500 displays the representation 802c of the subscription to service B in a region of the user interface in which representations of inactive subscriptions are displayed. In some embodiments, the user still has access to inactive subscriptions, but access will terminate if the user does not renew the subscription before the next renewal date. As shown in FIG. 8C, the representation 802c of the subscription service can include an indication 812c of the date on which access to the subscription will be terminated.

As shown in FIG. 8C, the user may select (e.g., with contact 803c) the representation 802g of the subscription to the collection of content services and/or applications. In some embodiments, in response to the user's selection in FIG. 8C, the electronic device 500 can display a user interface for editing the subscription to the collection of content services and/or applications, such as the user interface illustrated in FIG. 8D.

FIG. 8D illustrates an exemplary user interface for editing a subscription to a collection of content services and/or applications. In some embodiments, the electronic device 500 displays the user interface illustrated in FIG. 8D in response to detecting the user input illustrated in FIG. 8C. In some embodiments, the user interface for editing the subscription to the collection of content services and/or applications can include the representation 802g of the subscription to the collection of content services and/or applications described above with reference to FIG. 6A. The user interface can further include representations 815a-c of the available collections of content services and/or applications, including an Individual Bundle associated with representation 815a, a Family Bundle associated with representation 815b, and a Max Bundle associated with representation 815c. As shown in FIG. 8D, the representation 815a of the Individual Bundle can include a checkmark indicating that the user is subscribed to the Individual Bundle. In response to detecting selection of option 815b or 815c, the electronic device 500 can initiate a process to update the user's subscription from being subscribed to the Individual Bundle to being subscribed to a different collection of content services and/or applications in accordance with the user's selection.

As an example, the representation 815a of the Individual Bundle can include an indication 819a of the name and price of the subscription, indications 823a of the services included in the collection of content services and/or applications, and an option 821a that, when selected, causes the electronic device 500 to expand representation 815a to include further details about the collection of content services and/or applications. Examples of expanded representations of collections of content services and/or applications are described above with reference to FIGS. 6A-6U. Representations 815b and 815c can include elements similar to the elements of representation 815a.

In some embodiments, the user interface further includes a selectable option 816 that, when selected, causes the electronic device 500 to initiate a process to cancel the user's subscription to the collection of content services and/or applications, which optionally includes displaying one or more user interfaces related to the cancelation of the subscription, such as a confirmation user interface. In some embodiments, the user interface illustrated in FIG. 8D further includes a selectable option 817 that, when selected, causes the electronic device 500 to initiate a process to cancel the subscription to the collection of content services and/or applications and subscribe to one or more individual services included in the content service collection. As shown in FIG. 8D, the user may select (e.g., with contact 803d) the option 817 to select one or more services included in the collection to which to subscribe while canceling the subscription to the collection of content services and/or applications. In some embodiments, in response to the user's selection in FIG. 8D, the electronic device 500 displays a user interface including information and options for selecting one or more services to which to subscribe while canceling the subscription to the collection of content services and/or applications, such as the user interface illustrated in FIG. 8E.

FIG. 8E illustrates an exemplary user interface for selecting one or more subscription services to which to subscribe while canceling a subscription to a collection of content services and/or applications. In some embodiments, the user interface illustrated in FIG. 8E is displayed in response to the user input illustrated in FIG. 8D.

In some embodiments, the user interface includes representations 818*a-b* of the services included in the collection of content services and/or applications. The representations 818*a* and 818*c* of two respective services which the user is able to either cancel or subscribe can be displayed with checkboxes 820*a* and 820*c* that, when selected, causes the electronic device 500 to initiate a process to subscribe to the selected service(s) in response to detecting selection of option 822.

In some embodiments, the user interface includes a representation 818*d* of a storage service included in the collection of content services and/or applications. The representation 818*d* can be displayed without a checkmark because the user is already subscribed to a separate storage service and, in some embodiments, the electronic device 500 is not able to be subscribed to two storage plans that are separate from collections of content services and/or applications. In this example, then, the user does not have the option to continue to subscribe to the storage included in the collection of content services and/or applications because the user is already subscribed to a separate storage service. In some situations, the user may be able to upgrade their storage subscription to add additional space to the storage plan. In some embodiments, if the user was not already subscribed to a separate storage plan, the electronic device 500 would display a checkbox with the representation 818*d* of the storage plan and allow the user to initiate a process to subscribe to a storage service while canceling the subscription to the collection of content items.

In some embodiments, the user interface illustrated in FIG. 8E can include a representation 818*b* of a service from which the user is not able to unsubscribe because a free trial period of the service has not yet expired. For example, the user subscribed to a free trial of a games subscription service on Jun. 5, 2020 and subscribed to a collection of content services and/or applications on Jun. 11, 2020. On a date after Jun. 11, 2020 but before Jul. 5, 2020, the free trial period of the games subscription would not be expired. Therefore, the electronic device 500 displays an indication with the representation 818*b* of the subscription service that the service cannot be canceled in the user interface illustrated in FIG. 8E, though the user may be able to cancel the service from another user interface (e.g., by selecting a representation of the service in a subscription management user interface and canceling the service from a user interface for modifying the subscription to the service).

As shown in FIG. 8E, the electronic device 500 displays a selectable option 822 that, when selected, causes the electronic device 500 to initiate a process to cancel the subscription to the collection of content services and/or applications and subscribe separately to one or more services selected by the user and/or one or more services that cannot be canceled from the user interface illustrated in FIG. 8E. In some embodiments, the option 822 includes an indication of the number of services to which the user will be subscribed and the total cost to renew the services each billing cycle. In some embodiments, the user interface further includes a selectable option 824 that, when selected, causes the electronic device 500 to cancel the subscription to the collection of content services and/or applications without subscribing to any of the services that had been included in the collection of content services and/or applications. In some embodiments, the electronic device 500 cancels the service that is still in the free trial period in response to detecting selection of option 824. In some embodiments, the electronic device 500 subscribes to the service that is still in the free trial period in response to detecting selection of option 824.

As shown in FIG. 8E, the user may select (e.g., with contact 803*e*) the checkbox 820*c* associated with the representation 818*c*. In response to the user's selection, the electronic device 500 can update the user interface to indicate that the user will be subscribed to service T associated with representation 818*c* and checkbox 820*c* and service G (e.g., the service still in the free trial period) in response to detecting selection of option 822, such as the user interface illustrated in FIG. 8F, for example.

FIG. 8F illustrates an exemplary user interface updated in accordance with the user's selection in FIG. 8E. For example, the user interface illustrated in FIG. 8F includes a check in the checkbox 820*c* associated with service T and the option 822 is updated to reflect that, in response to detecting selection of option 822, the electronic device 500 will initiate a process to unsubscribe from the collection of content services and/or applications and subscribe to services T and G. As shown in FIG. 8F, the user may select (e.g., with contact 803*f*) the option 822. In response to the user's selection, for example, the electronic device 500 initiates the process to unsubscribe from the collection of content services and/or applications and subscribe to services T and G, which can include displaying a confirmation user interface, such as the user interface illustrated in FIG. 8G.

FIG. 8G illustrates an exemplary confirmation user interface that indicates the services to which the user will be subscribed when the subscription to the collection of content services and/or applications is canceled. In some embodiments, the user interface illustrated in FIG. 8G can be displayed in response to detecting the user input illustrated in FIG. 8F.

In FIG. 8G, the electronic device 500 can display an indication 826*a* of the games subscription, including the renewal price 828*a* of the subscription and the renewal date 830*a* of the subscription and an indication 826*b* of the video content streaming service, including an indication 828*b* of the renewal price 828*b* of the subscription and the renewal date 830*b* of the subscription. In this example, the electronic device 500 is initiating a process to subscribe to the games subscription service because the free trial period of the games subscription service is not over yet. For example, the date 830*a* on which the games subscription service is set to renew can be the date on which the free trial period ends. In this example, the electronic device 500 is initiating a process to subscribe to the video content streaming service because the user selected the service for renewal in FIG. 8E. The video content streaming service will renew on the date 830*b* on which the subscription to the collection of content services and/or applications will expire, for example.

The user interface can further include a selectable option 832 that, when selected, causes the electronic device 500 to cancel the subscription to the collection of content services and/or applications and subscribe to the games subscription and the video content streaming service and a selectable option 834 that, when selected, causes the electronic device 500 to unsubscribe from the collection of content services and/or applications without subscribing to any of the services included in the collection. As shown in FIG. 8G, the user can select (e.g., with contact 803g) the option 832 to unsubscribe from the collection of content services and/or applications and subscribe to the games subscription service and the video content streaming service.

FIG. 8H illustrates the exemplary subscription management user interface after the user has unsubscribed from the collection of content services and/or applications and subscribed to services T and G in response to the user input illustrated in FIG. 8G. The subscription management user interface illustrated in FIG. 8H can be the same as the subscription management user interface described above with reference to FIG. 8C, except the user interface can now include representations 802e and 802i of the games subscription and the video content streaming service, respectively, in the list of active subscriptions and can now include the representation 802g of the collection of content services and/or applications in the list of inactive subscriptions. In some embodiments, the user may still be able to access the services include in the collection of content services and/or applications until the expiration date of the subscription shown in indication 812g.

FIG. 8I illustrates another exemplary subscription management user interface according to some embodiments of the disclosure. In some embodiments, the electronic device displays the subscription management user interface illustrated in FIG. 8I in response to detecting selection of the representation 802g of the content service collection illustrated in FIG. 8C. The subscription management user interface illustrated in FIG. 8I can be the same as the subscription management user interface illustrated in FIG. 8D, except for the differences described below.

As shown in FIG. 8I, in some embodiments, the subscription management user interface for the collection of content services can include two selectable options 840 and 842 for initiating a process to cancel the subscription to the collection of content services. The user may select (e.g., with contact 803i) the option 840 to choose individual services included in the collection of content services to subscribe to individually as part of the process of cancelling the subscription to the collection of content services. If, instead of selecting option 840 as illustrated in FIG. 8I, the user were to select option 842, the electronic device could present the user interface illustrated in FIG. 8M.

In response to the user's selection in FIG. 8I, the electronic device can display the user interface illustrated in FIG. 8J. As shown in FIG. 8J, the electronic device can display a user interface for selecting one or more subscription services to which to subscribe while canceling a subscription to a collection of content services. The user interface illustrated in FIG. 8J can be similar to the user interface illustrated in FIG. 8E except for the differences described herein. For instance, in the example illustrated in FIG. 8J, the user is able to subscribe to or cancel any of the services included in the collection of content services because none of the services are in a free trial period and the user does not have a separate storage subscription, as was the case in the example illustrated in FIG. 8E.

As shown in FIG. 8J, all of the checkboxes 820d-820g associated with the representations of services 818e-818h can be checked when the electronic device initially displays the user interface illustrated in FIG. 8J in response to the user's selection in FIG. 8I. The user interface illustrated in FIG. 8J can further include an option 844 that, as will be shown in FIG. 8K, can be selectable to cancel the subscription to the collection of content services and subscribe to one or more of the subscription services associated with representations 818e-818h selected by the user. As shown in FIG. 8J, while all of the checkboxes 820d-820g are checked, the option 844 can be deactivated (e.g., option 844 cannot be selected and/or selection of option 844 does not case the electronic device to respond in any way) and can include an indication to de-select one or more checkboxes 820d-820g to continue the process to unsubscribe from the collection of content services and subscribe to one or more individual services included in the collection of content services. In some embodiments, while option 844 is deactivated, option 844 can be displayed with a different appearance (e.g., color, etc.) than the appearance of an activated option, such as the appearance of option 848 described below with reference to FIG. 8K. The user interface illustrated in FIG. 8J can further include an option 846 to forgo cancelling the subscription to the content service collection (e.g., an maintaining the subscription to the content service collection as active). In some embodiments, in response to detecting selection of option 846, the electronic device can display the user interface illustrated in FIG. 8I or the user interface illustrated in 8H and maintain the subscription to the collection of content services without subscribing, individually, to one or more individual services included in the content service collection.

As shown in FIG. 8J, the user can select (e.g., with contact 803j) one of the checkboxes 820d associated with a music service represented by representation 818e. In response to the user's selection in FIG. 8J, the electronic device can update the user interface as shown in FIG. 8K.

In FIG. 8J, the electronic device can display the user interface with checkbox 820d unchecked. In some embodiments, the user interface further includes an indication of the number of services to which the user will be subscribed and the total cost of the individual subscriptions. The electronic device can further update the user interface by displaying an option 848 to subscribe to the selected individual services (e.g., TV+, Storage, and Arcade). The option 848 can include an indication of the total cost per month of the individual subscriptions. In some embodiments, the electronic device can update the option 848 in response to the user selecting a different combination of services to reflect the cost of the updated combination of services in a manner similar to the manner described above with reference to FIGS. 8E-8F. In some embodiments, option 848 can be the same user interface element as option 844 illustrated in FIG. 8J with an updated appearance (e.g., different color) and functionality.

As shown in FIG. 8K, the user may select (e.g., with contact 803k) the option 848 to subscribe to the selected individual services (e.g., without subscribing to the services that are unchecked) and cancel the subscription to the collection of content services. In some embodiments, in response to the user's selection in FIG. 8K, the electronic device can display a confirmation user interface similar to the user interface illustrated in FIG. 8G. The confirmation user interface can include an indication of the renewal date of each individual subscription and the renewal price and period (e.g., a monthly price, a quarterly price, an annual price, etc.) of each individual subscription. In this example where none of the subscriptions are in a free trial period, the renewal date of each subscription (e.g., the date on which the individual subscription is activated) could be the same date on which the subscription to the collection of content services expires.

In some embodiments, after receiving the request to cancel the subscription to the collection of content services and subscribe to one or more individual services included in the collection, and before the subscription to the collection of content services ends and the subscriptions to the individual services begin, the electronic device can display indications of upcoming subscriptions in the subscription management user interface. FIG. 8L illustrates an exemplary subscription management user interface that includes indications 802*i*, 802*j*, and 802*e* of upcoming subscriptions according to some embodiments of the disclosure. The indications 802*i*, 802*j*, and 802*e* can be displayed in an upcoming subscriptions region of the user interface in which indication of subscriptions that are not yet active but will become active are displayed. Indications 802*g* and 802*c* can be displayed in an active subscriptions region of the user interface in which indications of subscriptions that are active (e.g., the user has access to the services associated with the active subscriptions).

In FIG. 8L, the representation 802*g* of the collection of content services can include an indication 812*h* of the date on which the subscription to the collection of content services will expire. In some embodiments, after the expiration date, the user will no longer have access to the individual services included in the collection of content services to which the user did not individually subscribe. In some embodiments, after the subscription to the collection of content services is expired, the electronic device can display the representation 802*g* of the collection of content services in a section of the subscription management user interface for inactive subscriptions (e.g., the region of the user interface illustrated in FIG. 8H in which indications 802*g* and 802*c* are displayed).

The subscription management user interface can further include a section that includes representations 802*i*, 802*j*, and 802*e* of the subscriptions to the individual services that will activate when the subscription to the collection of content services expires. The representations 802*i*, 802*j*, and 802*e* can each include an indication 812*i*, 812*j*, and 812*e* of the date on which the subscription will begin. For example, the subscriptions to the individual services can begin on the same date that the subscription to the collection of content services expires. In some embodiments, once the subscriptions to the individual services begin, the representations 802*i*, 802*j*, and 802*e* can be displayed in a region of the subscription management user interface for active subscriptions (e.g., the region in which representations 802*g* and 802*c* are displayed in FIG. 8L).

Figure 8M:
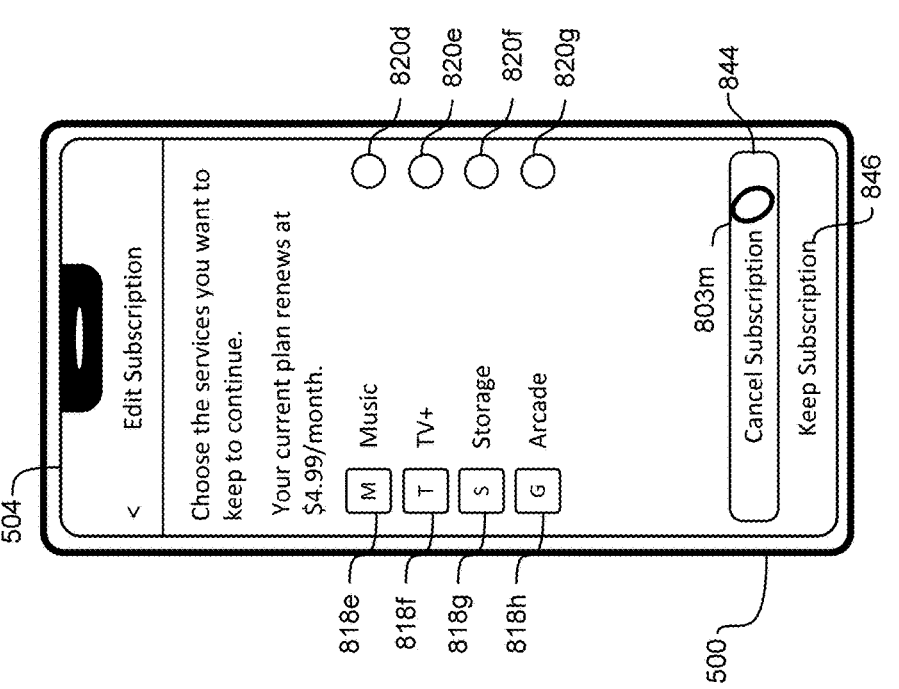

As described above with reference to FIG. 8I, in some embodiments, if the user were to select option 842 instead of option 840, the electronic device can display the user interface illustrated in FIG. 8M. The user interface illustrated in FIG. 8M can be the same as the user interface illustrated in FIG. 8J except for the differences described herein.

As shown in FIG. 8M, in response to selecting option 842 in FIG. 8I, the electronic device displays the user interface with all of the checkboxes 820*d*-820*g* unchecked and a selectable option 844 to cancel the subscription to the collection of content services without subscribing to any of the individual services included in the collection. The user interface can further include the option 846 that, when selected, causes the electronic device to forgo cancelling the subscription to the collection of content services. In some embodiments, in response to detecting selection of option 846, the electronic device can display the user interface illustrated in FIG. 8I or the user interface illustrated in 8H and maintain the subscription to the collection of content services without subscribing to one or more individual services included in the content service collection.

In some embodiments, the user is able to check one or more of the checkboxes 820*d*-820*g* in the user interface illustrated in FIG. 8M. In some embodiments, in response to detecting selection of one or more of the checkboxes 820*d*-820*g*, the electronic device can update the user interface to include the option 848 illustrated in FIG. 8K in place of option 844 illustrated in FIG. 8M. In some embodiments, option 844 and option 848 in FIG. 8K are the same user interface element that has updated functionality and text. It should be understood that option 848 can be modified to include the total cost of the selected subscriptions. Likewise, in some embodiments, if the user were to de-select all of the checkboxes 820*d*-820*g* in FIGS. 8J-8K, the electronic device could display the user interface illustrated in FIG. 8M.

As shown in FIG. 8M, the user may select (e.g., with contact 803*m*) the option 844 to cancel the subscription to the collection of content services without subscribing to any of the services individually. In response to the user's selection in FIG. 8M, the electronic device can display a pop-up user interface element 850 confirming that the subscription to the collection of content services is to be canceled (e.g., overlaid on the user interface of FIG. 8M), as shown in FIG. 8N. The user interface element 850 can include an option 852 that is selectable to forgo canceling the subscription to the collection of content services (e.g., and maintain the subscription) and an option 854 that is selectable to confirm the cancellation (e.g., and cancel the subscription).

FIG. 9 is a flow diagram illustrating a method of unsubscribing from a collection of content services and/or applications in accordance with some embodiments of the disclosure. The method 900 is optionally performed at an electronic device such as device 100, device 300, device 500 as described above with reference to FIGS. 1A-1B, 2-3, 4A-4B and 5A-5H. Some operations in method 900 are, optionally combined and/or order of some operations is, optionally, changed.

As described below, the method 900 provides ways in which an electronic device facilitates unsubscribing from collections of content services and/or applications. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 900 is performed at an electronic device 500 in communication with a display generation component and one or more input devices (e.g., a mobile device (e.g., a tablet, a smartphone, a media player), a computer (e.g., a desktop computer, a laptop computer), or a wearable device (e.g., a watch, a head-mounted device), or a set-top box in communication with a display generation component (e.g., a television screen) and one or more input devices (e.g., a remote control)). In some embodiments, the display generation component is a display integrated with the electronic device (optionally a touch screen display) and/or an external display such as a monitor, projector, television, etc.

In some embodiments, such as in FIG. 8C, while a subscription to a first content service collection is active, wherein the subscription is associated with the electronic device 500 and the first content service collection includes a first content service and a second content service, the electronic device 500 receives (902), via the one or more input devices, an input corresponding to a request to modify the subscription to the first content service collection. In some embodiments, a user account associated with the electronic device is subscribed to the first content service collection. In some embodiments, the first content service collection includes subscriptions to a plurality of content services included in the collection. For example, the content service collection includes subscriptions to one or more of a video streaming subscription, an audio streaming subscription, an application downloading subscription (e.g., a games subscription), a cloud storage subscription, and/or a news article subscription. In some embodiments, modifying the subscription to the collection includes changing the tier of the subscription (e.g., the number of user accounts that are able to access the subscription, the services included in the subscription, the renewal period of the subscription, etc.) or unsubscribing from the content service collection. In some embodiments, the input corresponding to the request to modify the subscription is selection of a selectable option to cancel the subscription. In some embodiments, the input corresponding to the request to modify the subscription is selection of a selectable option to choose services included in the collection to subscribe to individually and cancel the subscription to the collection.

In some embodiments, such as in FIG. 8D, in response to receiving the input corresponding to the request to modify the subscription to the first content service collection, the electronic device 500 displays (904), via the display generation component, a first user interface for modifying the subscription to the first content service collection. In some embodiments, in response to detecting the input corresponding to the request to modify the subscription to the first content service collection, the electronic device displays a user interface including a user interface element for changing the tier of the subscription, a user interface element that, when selected, causes the electronic device to initiate a process to unsubscribe from the first content service collection without subscribing to any of the services included in the first content service collection, and a user interface element that, when selected, causes the electronic device to display the first user interface. In some embodiments, the first user interface includes selectable options for selecting one or more content services included in the content service collection to which the user wishes to subscribe individually and canceling the subscription to the first content service collection. In some embodiments, the selectable options for selecting the one or more content services are toggleable. In some embodiments, in response to detecting selection of an option that is already selected, the electronic device de-selects the option. In some embodiments, if an option is de-selected, the electronic device forgoes subscribing to the service corresponding to the de-selected option in response to the input to subscribe to the selected content services.

In some embodiments, such as in FIG. 8E, the user interface includes (906) a first selectable option 822 that is selectable as part of a process to activate a first respective subscription associated with the electronic device 500 to the first content service independent of the subscription to the first content service collection (908). In some embodiments, the first user interface includes a first representation of the first content service (e.g., the first selectable option) and a selectable option that, when selected, causes the electronic device to initiate a process to subscribe to all of the content services selected by the user (e.g., by selecting one or more representations of (e.g., options corresponding to) one or more content services). For example, in response to detecting selection of the selectable option while the first representation of the first content service is selected, the electronic device initiates a process to unsubscribe from the first content service collection and subscribe to (and/or maintain a subscription to) the first content service (and any other selected content services).

In some embodiments, such as in FIG. 8E, the user interface includes (906) a second selectable option 822 that is selectable as part of a process to activate a second respective subscription associated with the electronic device 500 to the second content service independent of the subscription to the first content service collection (910). In some embodiments, the first user interface includes a second representation of the second content service (e.g., the second selectable option) and a selectable option that, when selected, causes the electronic device to initiate a process to subscribe to all of the content services selected by the user (e.g., by selecting one or more representations of (e.g., options corresponding to) one or more content services). For example, in response to detecting selection of the selectable option while the second representation of the second content service is selected, the electronic device initiates a process to unsubscribe from the first content service collection and subscribe to (and/or maintain a subscription to) the second content service (and any other selected content services). In some embodiments, the selectable options for selecting the one or more content services are toggleable. In some embodiments, in response to detecting selection of an option that is already selected, the electronic device de-selects the option. In some embodiments, if an option is de-selected, the electronic device forgoes subscribing to the service corresponding to the de-selected option in response to the input to subscribe to the selected content services.

The above-described manner of displaying selectable options for individually subscribing to the content services included in the content service collection provides an efficient way of remaining subscribed to one or more services of the user's choosing when unsubscribing from the content service collection, which simplifies the interaction between the user and the electronic device and enhances the operability of the electronic device and makes the user-device interface more efficient (e.g., by reducing the inputs needed to subscribe to one or more services after unsubscribing from the first content service collection), which additionally reduces power usage and improves battery life of the electronic device by enabling the user to use the electronic device more quickly and efficiently.

In some embodiments, the electronic device 500 displays, via the display generation component, a subscription management user interface that includes a representation of the first content service collection 802g to which a subscription is active and a representation 802c of a standalone content service to which a subscription is active, such as in FIG. 8A. In some embodiments, in response to detecting selection of the representation of the first content service collection, the electronic device presents a user interface for editing or canceling the subscription to the first content service collection. In some embodiments, in response to detecting selection of the representation of the standalone content service, the electronic device displays a user interface for editing or canceling the subscription to the standalone content service. In some embodiments, such as in FIG. 8C, the input corresponding to the request to modify the subscription to the first content service collection includes an input directed to the representation 802*g* of the first content service collection (e.g., selection of the representation of the first content service collection). In some embodiments, such as in FIG. 8A, while displaying the subscription management user interface, the electronic device 500 receives, via the one or more input devices, an input corresponding to a request to modify the subscription to the standalone content service, including an input directed to the representation 802*c* of the standalone content service (e.g., selection of the representation of the standalone content service). In some embodiments, in response to receiving the input corresponding to the request to modify the subscription to the standalone content service, the electronic device 500 initiates a process to modify the subscription to the standalone content service without displaying, via the display generation component, a respective user interface for modifying a subscription to a respective content service collection, such as in FIG. 8B. In some embodiments, the input corresponding to the request to modify the subscription to the standalone content service is selection of a selectable option associated with a tier of the subscription that is different from a respective subscription tier to which the electronic device is currently subscribed. In some embodiments, different subscription tiers include access to different features of the content service and/or have different renewal periods (e.g., one month vs. one year). In some embodiments, the process to modify the subscription to the respective content service collection does not include a process to select one or more other services to subscribe to.

The above-described manner of displaying a respective user interface for modifying the subscription to the respective standalone content service without displaying the user interface for modifying the subscription to the respective content service collection provides an efficient way of managing the subscription to the standalone content service which simplifies the interaction between the user and the electronic device and enhances the operability of the electronic device and makes the user-device interface more efficient (e.g., by reducing the time and inputs it takes to manage the subscription to the standalone content service), which additionally reduces power usage and improves battery life of the electronic device by enabling the user to use the electronic device more quickly and efficiently.

In some embodiments, while displaying the first user interface for modifying the subscription to the first content service collection, the electronic device 500 receives, via the one or more input devices, a respective input corresponding to a request to cancel the subscription to the first content service collection and activate the first respective subscription to the first content service included in the first content service collection, such as in FIG. 8G. In some embodiments, the user selects the first content service in a list of services included in the first content service collection and selects an option to cancel the subscription to the content service bundle and subscribe to the selected services. In some embodiments, after receiving the respective input, the electronic device 500 initiates a process to cancel the subscription to the first content service collection and activate the first respective subscription to the first content service, such as in FIG. 8G. In some embodiments, the electronic device is able to access the first content service collection until an expiration date of the subscription period for which the user already paid for access to the first content service collection. In some embodiments, such as in FIG. 8H, after receiving the respective input, the electronic device

500 displays, via the display generation component, the subscription management user interface, wherein the subscription management user interface does not include the representation of the first content service collection, and includes a representation 802*e* of the first content service. In some embodiments, the subscription management user interface did not include the representation of the first content service while the user was still subscribed to the first content service collection. In some embodiments, after unsubscribing from the first content service collection, the representation of the first content service collection ceases being displayed in a section of the subscription management user interface for active subscriptions and is instead displayed in a region of the subscription management user interface for inactive subscriptions (e.g., if the expiration date is upcoming) or a region of the subscription management user interface for expired subscriptions (e.g., if the expiration date has passed).

The above-described manner of the above described manner of displaying the representation of the first content service in the subscription management user interface provides an efficient way of presenting indications of all of the subscriptions associated with the electronic device, which simplifies the interaction between the user and the electronic device and enhances the operability of the electronic device and makes the user-device interface more efficient (e.g., by reducing the number of inputs needed to update or cancel one or more subscriptions), which additionally reduces power usage and improves battery life of the electronic device by enabling the user to use the electronic device more quickly and efficiently.

In some embodiments, such as in FIG. 8E, the first user interface includes a visual indication of a combined cost of one or more respective content services of the first content service collection that are selected to be activated independent of the subscription to the first content service collection. In some embodiments, the indication of the combined cost updates in response to detecting a change in which services are selected (e.g., selecting additional services causes the cost indicated by the indication to increase and de-selecting services causes the cost indicated by the indication to decrease). In some embodiments, the indication of the total cost of the one or more respective content services is included in a selectable option that, when selected, causes the electronic device to initiate a process to unsubscribe from the collection of content services and/or applications and subscribe to the selected services. In some embodiments, the first user interface further includes a cost of the subscription to the content service collection.

The above-described manner of displaying the visual indication of the combined cost of the one or more respective content services provides an efficient way of indicating to the user the combined costs of the content services to be kept after the subscription to the collection of content services and/or applications is canceled which simplifies the interaction between the user and the electronic device and enhances the operability of the electronic device and makes the user-device interface more efficient (e.g., by reducing the time it takes the user to determine the total cost of the subscriptions to which they are subscribing, and reducing likelihood of erroneous subscription input that the user would then need to provide additional input to correct), which additionally reduces power usage and improves battery life of the electronic device by enabling the user to use the electronic device more quickly and efficiently.

In some embodiments, such as in FIG. 8D, the first user interface includes a respective selectable option 815*b* that is selectable to initiate a process to activate a subscription to a second content service collection, different from the first content service collection. In some embodiments, the second content service collection includes access to a different group of content services than the group of content services accessible via the first content service collection. In some embodiments, the second content service collection provides access to a group of content services to a first one or more electronic devices and the first content service collection provides access to the group of content services to a second one or more electronic devices. For example, an individual content service collection provides access to the content services to one user account and a family content service collection provides access to the content services to a plurality of user accounts included in a family group of user accounts. In some embodiments, it is not possible to change the subscription from a subscription that provides access to a plurality of applications for all electronic devices included in a family group account to a subscription that only provides access to content applications for electronic devices associated with a single user account. In some embodiments, the process to activate the subscription to the second content service bundle includes deactivating the subscription to the first content service bundle.

The above-described manner of presenting the option to subscribe to the second content service collection provides an efficient way to subscribe to the second content service bundle while unsubscribing from the first content service bundle which simplifies the interaction between the user and the electronic device and enhances the operability of the electronic device and makes the user-device interface more efficient (e.g., by reducing the number of inputs needed to cancel one collection subscription and initiate another collection subscription), which additionally reduces power usage and improves battery life of the electronic device by enabling the user to use the electronic device more quickly and efficiently.

In some embodiments, such as in FIG. 8G, in accordance with a determination that the first respective subscription to the first content service is selected to be activated independent of the subscription to the first content service collection, the first user interface includes a visual indication 830a of an expiration date of the first respective subscription to the first content service. In some embodiments, the expiration date of the first respective subscription service is the expiration date of the collection of content services and/or applications. In some embodiments, the expiration date of the first respective subscription service is the renewal date of the subscription that was set before the electronic device was associated with the subscription to the collection of content services and/or applications. In some embodiments, in response to detecting selection of a second subscription service to which the user is to subscribe, the user interface includes an indication of the expiration date of the second subscription service. In some embodiments, such as in FIG. 8G, in accordance with a determination that the first respective subscription to the first content service is not selected to be activated independent of the subscription to the first content service collection, the first user interface does not include the visual indication of the expiration date of the first respective subscription to the first content service. In some embodiments, the user interface only includes indications of the renewal dates of the subscription services that are to be activated in response to detecting selection of the option to activate the selected subscriptions.

The above-described manner of displaying the renewal date of the first respective subscription to the first content service provides an efficient way of presenting information about the subscriptions to be initiated, which simplifies the interaction between the user and the electronic device and enhances the operability of the electronic device and makes the user-device interface more efficient (e.g., by reducing the number of inputs needed to view the information about the subscriptions to be activated, and reducing likelihood of erroneous subscription input that the user would then need to provide additional input to correct), which additionally reduces power usage and improves battery life of the electronic device by enabling the user to use the electronic device more quickly and efficiently.

In some embodiments, such as in FIG. 8F, the first user interface includes a respective representation 818b of a respective content service included in the first content service collection. In some embodiments, such as in FIG. 8F, in accordance with a determination that a respective subscription to the respective content service can be deactivated, the first user interface includes a respective selectable option 820a that is selectable as part of a process to deactivate the respective subscription to the respective content service. In accordance with a determination that the respective selectable option is selected, the electronic device is optionally configured to activate the respective subscription in response to an input to activate subscriptions to the selected content services. In accordance with a determination that the respective selectable option is not selected, the electronic device is optionally not configured to activate the respective subscription in response to the input to activate subscriptions to the selected content services. In some embodiments, such as in FIG. 8F, in accordance with a determination that the respective subscription to the respective content service cannot be deactivated, the first user interface includes a visual indication 818b that the respective subscription to the respective content service will remain active without including the respective selectable option. In some embodiments, a subscription cannot be deactivated if the first renewal period of the subscription has not passed at the time at which the user interface for managing the subscription to the collection of content items is displayed. In some embodiments, the representation of the respective content service is displayed in a region of the user interface different from the region of a user interface in which representations of content services from which the user is able to unsubscribe are displayed.

The above-described manner of forgoing including the respective selectable option if the respective subscription cannot be deactivated provides an efficient way of indicating to the user the status of the respective subscription while displaying the user interface for editing the subscription to the respective collection of content services and/or applications, which simplifies the interaction between the user and the electronic device and enhances the operability of the electronic device and makes the user-device interface more efficient (e.g., by and reducing likelihood of erroneous subscription input that the user would then need to provide additional input to correct), which additionally reduces power usage and improves battery life of the electronic device by enabling the user to use the electronic device more quickly and efficiently.

In some embodiments, such as in FIG. 8F, in accordance with a determination that the electronic device is associated with a subscription to a standalone storage service, the first user interface includes a visual indication 818d that the subscription to the standalone storage service will remain active as a result of deactivating the subscription to the first content service collection. In some embodiments, the first content service collection includes another storage plan, which will be deactivated when the subscription to the first content service collection is deactivated. In some embodiments, the user interface includes an indication of the size of the standalone storage service plan.

The above-described manner of displaying the indication that the subscription to the standalone storage service will not be deactivated provides an efficient way of presenting information about a subscription related to the subscription to the content service collection while displaying the user interface for managing the subscription to the content service collection, which simplifies the interaction between the user and the electronic device and enhances the operability of the electronic device and makes the user-device interface more efficient (e.g., by reducing the time needed to view the information about the storage plan while managing the subscription to the collection of content services and/or applications, and reducing likelihood of erroneous subscription input that the user would then need to provide additional input to correct), which additionally reduces power usage and improves battery life of the electronic device by enabling the user to use the electronic device more quickly and efficiently.

In some embodiments, such as in FIG. 8M, in accordance with a determination that the request to modify the subscription to the first content service collection corresponds to a request to cancel the first content service and the second content service, the first selectable option 820*d* is unselected and the second selectable option 820*d* is unselected in the first user interface in response to receiving the input corresponding to the request to modify the subscription to the first content service collection. In some embodiments, the electronic device displays a user interface that includes a first selectable option that, when selected, causes the electronic device to initiate a process to cancel the subscription to the collection of content services without subscribing to one or more services included in the collection individually. In response to detecting selection of the first selectable option, the electronic device displays the user interface for modifying the subscription to the first content service collection with one or more or all of the selectable options associated with individual services included in the content service collection unchecked. In some embodiments, while all of the selectable options associated with individual services in the content service collection in the user interface for modifying the subscription are unchecked, the electronic device displays, in the user interface, a selectable option that, when selected, causes the electronic device to initiate a process to cancel the subscription to the collection of content services without initiating a process to subscribe to one or more services included in the collection of content services. In some embodiments, such as in FIG. 8J, in accordance with a determination that the request to modify the subscription to the first content service collection corresponds to a request to maintain one or more of the first content service and the second content service, the first selectable option 820*d* is selected and the second selectable option 820*e* is selected in the first user interface in response to receiving the input corresponding to the request to modify the subscription to the first content service collection. In some embodiments, the electronic device displays a user interface that includes a second selectable option that, when selected, causes the electronic device to initiate a process to cancel the subscription to the collection of content services and subscribe individually to one or more services included in the collection. In response to detecting selection of the second selectable option, the electronic device displays the user interface for modifying the subscription to the first content service collection with one or more or all of the selectable options associated with individual services included in the content service collection selected. In some embodiments, while all of the selectable options associated with individual services in the content service collection in the user interface for modifying the subscription are selected, the electronic device displays, in the user interface, an indication to select one or more services to which the user does not wish to individually subscribe. In response to detecting de-selection of one or more selectable options associated with individual services in the content service collection, the electronic device initiates a process to unsubscribe from the collection of content services and subscribe to one or more content services that were selected in the user interface to modify the subscription to the collection of content services. The above-described manner of selecting or unselecting the first and second selectable options depending on whether a request to cancel the content services or a request to maintain at least one content service was received provides an efficient way of managing the subscription to the content service collection and subscriptions to one or more services in the collection, which simplifies the interaction between the user and the electronic device and enhances the operability of the electronic device and makes the user-device interface more efficient (e.g., by reducing the number of inputs needed to select or deselect services as desired), which additionally reduces power usage and improves battery life of the electronic device by enabling the user to use the electronic device more quickly and efficiently.

In some embodiments, such as in FIG. 8J, the first user interface includes a respective user interface element 844. In some embodiments, such as in FIG. 8J, in accordance with a determination that the first selectable option 820*d* and the second selectable option 820*e* are selected (e.g., all of the selectable options associated with subscribing to an individual service in the content service collection are selected), the respective user interface element 844 is not selectable and includes a visual indication requesting that the first selectable option or the second selectable option be deselected. In some embodiments, while one or more (or all) of the selectable options associated with services in the content service collection are selected, the respective user interface element is an indication to deselect one or more content services to continue the process to unsubscribe from the content service collection and subscribe to one or more selected services in the content service collection. In some embodiments, while at least one selectable option associated with the services in the content service collection is selected and at least one selectable option associated with services in the content service collection is unselected, the respective user interface element is a selectable option that, when selected, causes the electronic device to initiate a process to unsubscribe from the collection of content services and subscribe to one or more content services that are selected in the first user interface. In some embodiments, the respective user interface element is displayed at a same respective location in the first user interface regardless of whether or not the respective user interface element is selectable. In some embodiments, the electronic device displays the respective user interface element with a different appearance while it is selectable verses while it is not selectable. For example, while the respective user interface element is selectable, it is displayed with a first color and includes text indicating that selection of the respective user interface element will cause the electronic device to subscribe to the selected services individually (e.g., an indication of the total price of the selected subscriptions, such as "subscribe for $12.97/month"). As another example, while the respective user interface element is not selectable, it is displayed with a second color and includes text instructing the user to choose the services to keep by deselecting the services that to which the user does not wish to subscribe (e.g., "Choose services to continue"). In some embodiments, in response to the request to cancel the first and second service (e.g., a request to cancel the subscription to the collection), the first user interface includes a selectable option to cancel all services in the content service collection. In some embodiments, in response to the request to keep at least one of the first and second services (e.g., a request to modify the subscription to the collection), the first user interface includes an option to forgo unsubscribing from the collection of content services. The above-described manner of displaying a visual indication requesting at least one option be deselected when all of the options to keep the services are selected provides an efficient way of instructing the user how to indicate the services that should be subscribed to, which simplifies the interaction between the user and the electronic device and enhances the operability of the electronic device and makes the user-device interface more efficient (e.g., by reducing the time it takes the user to manage the subscription to the content service collection), which additionally reduces power usage and improves battery life of the electronic device by enabling the user to use the electronic device more quickly and efficiently.

In some embodiments, such as in FIG. 8M, the first user interface includes a respective user interface element 844. In some embodiments, in accordance with a determination that the first selectable option 820d and the second selectable option 820e are unselected (e.g., none of the selectable options associated with subscribing to an individual service in the content service collection are selected), the respective user interface element 844 is selectable to initiate a process to deactivate the subscription to the first content service collection (e.g., without subscribing to one or more of the services in the content service collection). In some embodiments, after receiving a request to keep one or more of the first service and the second service, the electronic device displays the first user interface and detects deselection of the first option and second option (e.g., or all options associated with subscribing to individual services in the content service collection) and, in response to detecting the deselections, the electronic device updates the respective user interface element to be selectable to cancel the subscription to the content service collection without subscribing to one or more services in the content service collection. In some embodiments, the first user interface further includes a selectable option that, when selected, causes the electronic device to forgo canceling the subscription to the content service collection. In some embodiments, in response to detecting selection of the option to deactivate the subscription to the first content service collection without subscribing to one or more services in the collection, the electronic device displays a pop-up user interface element in the first user interface requesting confirmation of unsubscribing. In some embodiments, in response to detecting selection of the option to deactivate the subscription to the first content service collection and subscribe to one or more services in the collection, the electronic device displays a second user interface requesting confirmation of the changes to the subscriptions. The above-described manner of displaying the respective user interface element as selectable to deactivate the subscription to the first content service collection provides an efficient way of unsubscribing from all services in the content service collection at once, which simplifies the interaction between the user and the electronic device and enhances the operability of the electronic device and makes the user-device interface more efficient (e.g., by reducing the inputs needed to unsubscribe from the content service collection) which additionally reduces power usage and improves battery life of the electronic device by enabling the user to use the electronic device more quickly and efficiently.

In some embodiments, the first user interface includes a respective user interface element 848. In some embodiments, in accordance with a determination that the first selectable option is selected 820e and the second selectable option 820d is unselected, the respective user interface element 848 is selectable to initiate a process to deactivate the subscription to the first content service collection. In some embodiments, access to the first content service collection is not terminated until the renewal date of the subscription to the content service collection. In some embodiments, in accordance with a determination that the first selectable option is selected 820e and the second selectable option 820d is unselected, the respective user interface element 848 is selectable to activate the first respective subscription associated with the electronic device to the first content service independent of the subscription to the first content service collection. In some embodiments, the subscription to the first respective subscription does not start until access to the collection of content services ends. In some embodiments, in accordance with a determination that the first selectable option 820d is unselected and the second selectable option 820e is selected, the respective user interface element is selectable to initiate the process to deactivate the subscription to the first content service collection. In some embodiments, access to the first content service collection is not terminated until the renewal date of the subscription to the content service collection. In some embodiments, in accordance with a determination that the first selectable option 820d is unselected and the second selectable option 820e is selected, the respective user interface element is selectable to activate the second respective subscription associated with the electronic device to the second content service independent of the subscription to the first content service collection. In some embodiments, the subscription to the second respective subscription does not start until access to the collection of content services ends. In some embodiments, the respective user interface element indicates the total cost of the subscriptions to the services that are selected in the first user interface. For example, if the first content service is selected, the user interface element includes an indication of the renewal price for the first content service and if the second content service is selected, the user interface includes an indication of the renewal price for the second content service. In some embodiments, if the first user interface is displayed in response to the request to cancel the first and second content services, the first user interface further includes an option to cancel the subscription to the content service collection without subscribing to one or more services in the collection. In some embodiments, if the first user interface is displayed in response to a request to subscribe to at least one of the first and second services, the first user interface further includes a selectable option that, when selected, causes the electronic device to forgo unsubscribing from the first content service collection. In some embodiments, in response to detecting selection of the respective user interface element while at least one content service is selected, the electronic device displays a second user interface confirming the user's subscription(s) to the selected content service(s). The above-described manner of displaying a respective user interface element that is selectable to subscribe to one or more selected services in the content service collection provides an efficient way of subscribing to one or more services while canceling the subscription to the content service collection in response to a single input, which simplifies the interaction between the user and the electronic device and enhances the operability of the electronic device and makes the user-device interface more efficient (e.g., by reducing the time and number of inputs needed to make the desired changes to the subscriptions), which additionally reduces power usage and improves battery life of the electronic device by enabling the user to use the electronic device more quickly and efficiently.

In some embodiments, after deactivating the subscription to the first content service collection and activating one or more of the first respective subscription associated with the electronic device to the first content service and the second respective subscription associated with the electronic device to the second content service (e.g., activating a subscription to the first and/or second content services), and before expiration of the subscription to the first content service collection (e.g., the date on which the subscription to the content service collection must be renewed to continue to access the first content service collection), the electronic device 500 displays, via the display generation component, a second user interface that includes information about a plurality of subscriptions associated with the electronic device, such as in FIG. 8L. In some embodiments, the second user interface includes indications of one or more (or all) subscriptions associated with the electronic device that are currently active, expired, and/or upcoming. In some embodiments, an active subscription is a subscription to which the user currently has access. In some embodiments, an expired subscription is a subscription to which the user used to have access but no longer has access. In some embodiments, an upcoming subscription is a subscription that is not yet active, but will become active on a predetermined date (e.g., upon expiration of a subscription to a content service collection). In some embodiments, the representations of the subscriptions are each selectable to display a respective user interface for revising the subscription (e.g., subscribing, unsubscribing, changing tier and/or renewal period. In some embodiments, such as in FIG. 8L, the second user interface includes a first region associated with active subscriptions associated with the electronic device (e.g., subscriptions the user is currently able to access), wherein the first region includes a visual indication 802g of the subscription to the first content service collection (e.g., the indication of the subscription to the first content service collection includes an indication of the date on which the subscription to the content service collection will expire). In some embodiments, once the subscription to the content service collection expires, the electronic device displays the indication of the subscription to the first content service collection in a third region of the second user interface associated with expired subscriptions with an indication of the date on which the subscription expired. In some embodiments, the indication of the subscription to the first content service collection is selectable to display a user interface for revising the subscription (e.g., subscribing, unsubscribing, changing tier and/or renewal period). In some embodiments, such as in FIG. 8L, the second user interface includes a second region associated with upcoming subscriptions associated with the electronic device 500, wherein the second region includes one or more visual indications 802i, 802j, and 802e of the one or more of the first respective subscription associated with the electronic device to the first content service and the second respective subscription associated with the electronic device to the second content service that were activated. In some embodiments, the indication(s) of the subscription(s) to the first and/or second content services include an indication of the date on which the subscription to the content service collection will be activated. In some embodiments, the subscription(s) to the first and/or second content services will activate on the date on which the subscription to the content service collection expires. In some embodiments, once the subscription(s) to the first and/or second content services activates, the electronic device displays the indication(s) of the subscription(s) to the first and/or second content services in the first region associated with active subscriptions. In some embodiments, the indication(s) of the subscription(s) to the first and/or second content services are selectable to display a respective user interface for revising the respective subscription (e.g., subscribing, unsubscribing, changing tier and/or renewal period).) The above-described manner of displaying the indication of the upcoming subscription(s) to the first and/or second content services provides an efficient way of viewing details about or making changes to the subscription(s) to the first and/or second content services, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

It should be understood that the particular order in which the operations in FIG. 9 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 900 described above with respect to FIG. 9. For example, the ways of unsubscribing from content service collections described above with reference to method 900 optionally have one or more of the characteristics of the ways of subscribing to content service collections, etc., described herein with reference to other methods described herein (e.g., methods 700). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIG. 9 are, optionally, implemented by components depicted in FIGS. 1A-1B. For example, displaying operation 904 is, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to present content of relevance to the user. The present disclosure contemplates that in some instances, this gathered data may include personal information data that uniquely identifies or can be used to identify a specific person. Such personal information data can include demographic data, location-based data, online identifiers, telephone numbers, e-mail addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, determining the subscriptions currently associated with a user account enables the electronic device to recommend collections of content services and/or applications that are relevant. Accordingly, use of such personal information data enables users to share and receive content with/from other electronic devices. Further, other uses for personal information data that benefit the user are also contemplated by the present disclosure. For instance, carrier information may be used to identify duplicate subscriptions.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. For example, users can select not to share information about their subscriptions or may only share subscription information with subscription providers.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, users are able to subscribe to collections of content services and/or applications without sharing their subscription information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:

at an electronic device in communication with a display generation component and one or more input devices:

detecting, via the one or more input devices, a request to subscribe to a respective content service currently in use on the electronic device;

in response to detecting the request, determining that one or more first criteria are satisfied; and in response to determining that the one or more first criteria are satisfied, displaying, via the display generation component, a content service collection user interface that includes a first representation of a first content service collection and a first selectable option that is selectable to initiate a process to subscribe to the first content service collection;

wherein:

the first content service collection includes at least a first content service and a second content service and the first representation of the first content service collection includes at least a first representation of the first content service and a second representation of the second content service, in accordance with a determination that a value of the first content service collection is less than a combined value of the respective content service and one or more other content services with which the electronic device is already associated, the content service collection user interface includes a visual indication that the first content service collection is more cost effective than maintaining individual subscriptions to the respective content service and the one or more content services with which the electronic device is already associated; and in accordance with a determination that the value of the first content service collection is greater than or equal to the combined value of the respective content service and one or more other content services with which the electronic device is already associated, the content service collection user interface does not include the visual indication.

2. The method of claim 1, wherein an order for displaying the first and second representations includes:

in accordance with a determination that the respective content service is associated with the first content service, the first representation of the first content service is emphasized relative to the second representation of the second content service; and in accordance with a determination that the respective content service is the second content service, the second representation of the second content service is emphasized relative to the first representation of the first content service.

3. The method of claim 1, wherein in accordance with a determination that the electronic device is not associated with any subscriptions to any content services, determining that one or more of the first criteria are not satisfied and forgoing displaying the content service collection user interface.

4. The method of claim 1, wherein the one or more first criteria include a criterion that is satisfied when the electronic device is associated with subscriptions to a first number of content services and is not satisfied when the electronic device is associated with subscriptions to a second number of content services, different from the first number.

5. The method of claim 1, wherein:

in accordance with a determination that the electronic device is associated with subscriptions to a first set of one or more content services, the content service collection user interface includes the first representation of the first content service collection and the first selectable option that is selectable to initiate the process to subscribe to the first content service collection, and in accordance with a determination that the electronic device is associated with subscriptions to a second set of one or more content services, different from the first set, the content service collection user interface includes a second representation of a second content service collection, different from the first content service collection, and a second selectable option that is selectable to initiate a process to subscribe to the second content service collection.

6. The method of claim 1, wherein the content service collection user interface does not include a second representation of a second content service collection and does not include a second selectable option that is selectable to initiate a process to subscribe to the second content service collection, different from the first content service collection, and the content service collection user interface includes a respective selectable option, the method further comprising:

receiving, via the one or more input devices, an input selecting the respective selectable option; and in response to receiving the input selecting the respective selectable option, displaying, via the display generation component, a second content service collection user interface that includes the second representation of the second content service collection and the second selectable option that is selectable to initiate the process to subscribe to the second content service collection.

7. The method of claim 6, wherein:

in accordance with a determination that the electronic device is associated with subscriptions to a first set of one or more content services, the second representation of the second content service collection includes a visual indication that the second content service collection is a recommended content service collection, and in accordance with a determination that the electronic device is associated with subscriptions to a second set of one or more content services, different from the first set, the second representation of the second content service collection does not include the visual indication that the second content service collection is the recommended content service collection.

8. The method of claim 1, wherein:

before subscribing to the first content service collection, the electronic device is associated with a subscription to the first content service that has a first renewal date, and after subscribing to the first content service collection that includes the first content service, the electronic device is associated with a subscription to the first content service collection that has a second renewal date, different from the first renewal date, and is no longer associated with the subscription to the first content service that has the first renewal date.

9. The method of claim 1, wherein:

the content service collection user interface further includes a respective representation of the respective content service, separate from the first representation of the first content service collection, and a respective selectable option that is selectable to initiate a process to subscribe to the respective content service without subscribing to the first content service collection, and in accordance with a determination that the respective content service is currently selected, the respective representation of the respective content service is displayed with information that indicates one or more other content services with which the electronic device is associated and information that indicates a combined value of the respective content service and the one or more other content services.

10. The method of claim 1, wherein a user of the electronic device is subscribed to a respective storage service, the method further comprising:

in accordance with a determination that remaining storage in the storage service is below a threshold storage, displaying, via the display generation component, a respective selectable option, wherein:

in accordance with a determination that the electronic device is associated with a subscription to the respective storage service as part of a subscription to a respective content service collection, the respective selectable option is selectable to initiate a process to subscribe to a standalone storage service to increase the remaining storage in the respective storage service; and in accordance with a determination that the electronic device is associated with a subscription to the respective storage service as a standalone storage service, the respective selectable option is selectable to initiate a process to subscribe to a respective content service collection that includes access to a respective amount of storage to increase the remaining storage in the respective storage service.

11. An electronic device, comprising:
one or more processors;
memory; and
one or more programs, wherein the one or more programs are stored in the memory and configured to be executed by the one or more processors, the one or more programs including instructions for:

detecting, via one or more input devices, a request to subscribe to a respective content service currently in use on the electronic device;

in response to detecting the request, determining that one or more first criteria are satisfied; and in response to determining that the one or more first criteria are satisfied, displaying, via a display generation component, a content service collection user interface that includes a first representation of a first content service collection and a first selectable option that is selectable to initiate a process to subscribe to the first content service collection;

wherein:

the first content service collection includes at least a first content service and a second content service and the first representation of the first content service collection includes at least a first representation of the first content service and a second representation of the second content service, in accordance with a determination that a value of the first content service collection is less than a combined value of the respective content service and one or more other content services with which the electronic device is already associated, the content service collection user interface includes a visual indication that the first content service collection is more cost effective than maintaining individual subscriptions to the respective content service and the one or more content services with which the electronic device is already associated; and in accordance with a determination that the value of the first content service collection is greater than or equal to the combined value of the respective content service and one or more other content services with which the electronic device is already associated, the content service collection user interface does not include the visual indication.

12. The electronic device of claim 11, wherein an order for displaying the first and second representations includes:

in accordance with a determination that the respective content service is associated with the first content service, the first representation of the first content service is emphasized relative to the second representation of the second content service; and in accordance with a determination that the respective content service is the second content service, the second representation of the second content service is emphasized relative to the first representation of the first content service.

13. The electronic device of claim 11, wherein in accordance with a determination that the electronic device is not associated with any subscriptions to any content services, determining that one or more of the first criteria are not satisfied and forgoing displaying the content service collection user interface.

14. The electronic device of claim 11, wherein the one or more first criteria include a criterion that is satisfied when the electronic device is associated with subscriptions to a first number of content services and is not satisfied when the electronic device is associated with subscriptions to a second number of content services, different from the first number.

15. The electronic device of claim 11, wherein:

in accordance with a determination that the electronic device is associated with subscriptions to a first set of one or more content services, the content service collection user interface includes the first representation of the first content service collection and the first selectable option that is selectable to initiate the process to subscribe to the first content service collection, and in accordance with a determination that the electronic device is associated with subscriptions to a second set of one or more content services, different from the first set, the content service collection user interface includes a second representation of a second content service collection, different from the first content service collection, and a second selectable option that is selectable to initiate a process to subscribe to the second content service collection.

16. The electronic device of claim 11, wherein the content service collection user interface does not include a second representation of a second content service collection and does not include a second selectable option that is selectable to initiate a process to subscribe to the second content service collection, different from the first content service collection, and the content service collection user interface includes a respective selectable option, the one or more programs further including instructions for:

receiving, via the one or more input devices, an input selecting the respective selectable option; and in response to receiving the input selecting the respective selectable option, displaying, via the display generation component, a second content service collection user interface that includes the second representation of the second content service collection and the second selectable option that is selectable to initiate the process to subscribe to the second content service collection.

17. The electronic device of claim 16, wherein:

in accordance with a determination that the electronic device is associated with subscriptions to a first set of one or more content services, the second representation of the second content service collection includes a visual indication that the second content service collection is a recommended content service collection, and in accordance with a determination that the electronic device is associated with subscriptions to a second set of one or more content services, different from the first set, the second representation of the second content service collection does not include the visual indication that the second content service collection is the recommended content service collection.

18. The electronic device of claim 11, wherein:

before subscribing to the first content service collection, the electronic device is associated with a subscription to the first content service that has a first renewal date, and after subscribing to the first content service collection that includes the first content service, the electronic device is associated with a subscription to the first content service collection that has a second renewal date, different from the first renewal date, and is no longer associated with the subscription to the first content service that has the first renewal date.

19. The electronic device of claim 11, wherein:

the content service collection user interface further includes a respective representation of the respective content service, separate from the first representation of the first content service collection, and a respective selectable option that is selectable to initiate a process to subscribe to the respective content service without subscribing to the first content service collection, and in accordance with a determination that the respective content service is currently selected, the respective representation of the respective content service is displayed with information that indicates one or more other content services with which the electronic device is associated and information that indicates a combined value of the respective content service and the one or more other content services.

20. The electronic device of claim 11, wherein a user of the electronic device is subscribed to a respective storage service, the one or more programs further including instructions for:

in accordance with a determination that remaining storage in the storage service is below a threshold storage, displaying, via the display generation component, a respective selectable option, wherein:

in accordance with a determination that the electronic device is associated with a subscription to the respective storage service as part of a subscription to a respective content service collection, the respective selectable option is selectable to initiate a process to subscribe to a standalone storage service to increase the remaining storage in the respective storage service; and in accordance with a determination that the electronic device is associated with a subscription to the respective storage service as a standalone storage service, the respective selectable option is selectable to initiate a process to subscribe to a respective content service collection that includes access to a respective amount of storage to increase the remaining storage in the respective storage service.

21. A non-transitory computer readable storage medium storing one or more programs, the one or more programs comprising instructions, which when executed by one or more processors of an electronic device, cause the electronic device to:

detecting, via one or more input devices, a request to subscribe to a respective content service currently in use on the electronic device;

in response to detecting the request, determining that one or more first criteria are satisfied; and in response to determining that the one or more first criteria are satisfied, display, via a display generation component, a content service collection user interface that includes a first representation of a first content service collection and a first selectable option that is selectable to initiate a process to subscribe to the first content service collection;

wherein:

the first content service collection includes at least a first content service and a second content service and the first representation of the first content service collection includes at least a first representation of the first content service and a second representation of the second content service, in accordance with a determination that a value of the first content service collection is less than a combined value of the respective content service and one or more other content services with which the electronic device is already associated, the content service collection user interface includes a visual indication that the first content service collection is more cost effective than maintaining individual subscriptions to the respective content service and the one or more content services with which the electronic device is already associated; and in accordance with a determination that the value of the first content service collection is greater than or equal to the combined value of the respective content service and one or more other content services with which the electronic device is already associated, the content service collection user interface does not include the visual indication.

22. The non-transitory computer readable storage medium of claim 21, wherein an order for displaying the first and second representations includes:

in accordance with a determination that the respective content service is associated with the first content service, the first representation of the first content service is emphasized relative to the second representation of the second content service; and in accordance with a determination that the respective content service is the second content service, the second representation of the second content service is emphasized relative to the first representation of the first content service.

23. The non-transitory computer readable storage medium of claim 21, wherein in accordance with a determination that the electronic device is not associated with any subscriptions to any content services, determining that one or more of the first criteria are not satisfied and forgoing displaying the content service collection user interface.

24. The non-transitory computer readable storage medium of claim 21, wherein the one or more first criteria include a criterion that is satisfied when the electronic device is associated with subscriptions to a first number of content services and is not satisfied when the electronic device is associated with subscriptions to a second number of content services, different from the first number.

25. The non-transitory computer readable storage medium of claim 21, wherein:

in accordance with a determination that the electronic device is associated with subscriptions to a first set of one or more content services, the content service collection user interface includes the first representation of the first content service collection and the first selectable option that is selectable to initiate the process to subscribe to the first content service collection, and in accordance with a determination that the electronic device is associated with subscriptions to a second set of one or more content services, different from the first set, the content service collection user interface includes a second representation of a second content service collection, different from the first content service collection, and a second selectable option that is selectable to initiate a process to subscribe to the second content service collection.

26. The non-transitory computer readable storage medium of claim 21, wherein the content service collection user interface does not include a second representation of a second content service collection and does not include a second selectable option that is selectable to initiate a process to subscribe to the second content service collection, different from the first content service collection, and the content service collection user interface includes a respective selectable option, wherein the instructions, when executed by the electronic device, further cause the electronic device to:

receive, via the one or more input devices, an input selecting the respective selectable option; and in response to receiving the input selecting the respective selectable option, display, via the display generation component, a second content service collection user interface that includes the second representation of the second content service collection and the second selectable option that is selectable to initiate the process to subscribe to the second content service collection.

27. The non-transitory computer readable storage medium of claim 26, wherein:

in accordance with a determination that the electronic device is associated with subscriptions to a first set of one or more content services, the second representation of the second content service collection includes a visual indication that the second content service collection is a recommended content service collection, and in accordance with a determination that the electronic device is associated with subscriptions to a second set of one or more content services, different from the first set, the second representation of the second content service collection does not include the visual indication that the second content service collection is the recommended content service collection.

28. The non-transitory computer readable storage medium of claim 21, wherein:

before subscribing to the first content service collection, the electronic device is associated with a subscription to the first content service that has a first renewal date, and after subscribing to the first content service collection that includes the first content service, the electronic device is associated with a subscription to the first content service collection that has a second renewal date, different from the first renewal date, and is no longer associated with the subscription to the first content service that has the first renewal date.

29. The non-transitory computer readable storage medium of claim 21, wherein:

the content service collection user interface further includes a respective representation of the respective content service, separate from the first representation of the first content service collection, and a respective selectable option that is selectable to initiate a process to subscribe to the respective content service without subscribing to the first content service collection, and in accordance with a determination that the respective content service is currently selected, the respective representation of the respective content service is displayed with information that indicates one or more other content services with which the electronic device is associated and information that indicates a combined value of the respective content service and the one or more other content services.

30. The non-transitory computer readable storage medium of claim 21, wherein a user of the electronic device is subscribed to a respective storage service, wherein the instructions, when executed by the electronic device, further cause the electronic device to:

in accordance with a determination that remaining storage in the storage service is below a threshold storage, displaying, via the display generation component, a respective selectable option, wherein:

in accordance with a determination that the electronic device is associated with a subscription to the respective storage service as part of a subscription to a respective content service collection, the respective selectable option is selectable to initiate a process to subscribe to a standalone storage service to increase the remaining storage in the respective storage service; and in accordance with a determination that the electronic device is associated with a subscription to the respective storage service as a standalone storage service, the respective selectable option is selectable to initiate a process to subscribe to a respective content service collection that includes access to a respective amount of storage to increase the remaining storage in the respective storage service.

* * * * *